US011307660B2

(12) United States Patent
Yang et al.

(10) Patent No.: US 11,307,660 B2
(45) Date of Patent: Apr. 19, 2022

(54) IMAGE RECOGNITION VIA BRAIN-COMPUTER COLLABRATION WITH VARIABLE IMAGE PRESENTATION TIMES

(71) Applicant: HUAWEI TECHNOLOGIES CO., LTD., Guangdong (CN)

(72) Inventors: Hui Yang, Beijing (CN); Peng Yuan, Beijing (CN); Weidong Tang, Shenzhen (CN); Shuaihua Peng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/007,869

(22) Filed: Aug. 31, 2020

(65) Prior Publication Data
US 2020/0401858 A1 Dec. 24, 2020

Related U.S. Application Data

(63) Continuation of application No. PCT/CN2019/076657, filed on Mar. 1, 2019.

(30) Foreign Application Priority Data

Mar. 2, 2018 (CN) .......................... 201810174915.2

(51) Int. Cl.
G06F 3/01 (2006.01)
G06K 9/00 (2006.01)
(Continued)

(52) U.S. Cl.
CPC ......... G06F 3/015 (2013.01); G06K 9/00496 (2013.01); G06K 9/4604 (2013.01);
(Continued)

(58) Field of Classification Search
CPC .... G06F 3/015; G06K 9/6293; G06K 9/6217; G06K 9/00496; G06K 9/4604; G06K 9/6289; G06T 1/0014
See application file for complete search history.

(56) References Cited

U.S. PATENT DOCUMENTS 7,466,872 B2   12/2008   Oh et al.
8,699,767 B1   4/2014    Khosla et al.
(Continued)

FOREIGN PATENT DOCUMENTS

CN   103780894 A   5/2014
CN   105868712 A   8/2016
(Continued)

OTHER PUBLICATIONS

Manor R et al,.Multimodal Neural Network for Rapid Serial Visual Presentation Brain Computer Interface, Original Research, Dec. 20, 2016.total 13 pages.
(Continued)

Primary Examiner — Casey L Kretzer
(74) Attorney, Agent, or Firm — Womble Bond Dickinson (US) LLP

(57) ABSTRACT

This application provides an image recognition method and device. The image recognition method includes: setting a presentation time sequence corresponding to an image sequence includes N images, the presentation time sequence includes unequal presentation times, a difference between any two presentation times of the unequal presentation times is $k \times \Delta$, k is a positive integer, and $\Delta$ is a preset time period value; processing the image sequence by using a computer vision algorithm, to obtain a computer vision signal corresponding to each image in the image sequence; obtaining a feedback signal that is corresponding to each image in the image sequence generated when an observation object watches the image sequence displayed in the presentation
(Continued)

time sequence; and fusing, for each image in the image sequence, a corresponding computer vision signal and a corresponding feedback signal to obtain a target recognition signal of each image in the image sequence.

20 Claims, 7 Drawing Sheets

(51) Int. Cl.
G06K 9/46 (2006.01)
G06K 9/62 (2006.01)
G06T 1/00 (2006.01)

(52) U.S. Cl.
CPC ......... *G06K 9/6217* (2013.01); *G06K 9/6289* (2013.01); *G06K 9/6293* (2013.01); *G06T 1/0014* (2013.01)

(56) References Cited

U.S. PATENT DOCUMENTS

| | | | |
|---|---|---|---|
| 9,269,027 B1 | 2/2016 | Khosla et al. | |
| 9,817,625 B1 | 11/2017 | Chun et al. | |
| 2018/0089531 A1* | 3/2018 | Geva | A61B 5/7264 |

FOREIGN PATENT DOCUMENTS

| | | |
|---|---|---|
| CN | 106691378 A | 5/2017 |
| CN | 107563115 A | 1/2018 |
| WO | 2016193979 A1 | 12/2016 |

OTHER PUBLICATIONS

N.Bigdely-Shamlo et al,. Brain activity-based image classification from rapid serial visual presentation. IEEE Transactions on Neural Systems and Rehabilitation Engineering, vol. 16, No. 5, Oct. 2008.pp. 432-441.

Masci J et al,. Stacked convolutional auto-encoders for hierarchical feature extraction. International Conference on Artificial Neural Networks (Berlin; Heidelberg: Springer; ), ICANN 2011, Part I, LNCS 6791, pp. 52 59, 2011.

Wang Y et al. A Collaborative Brain-Computer Interface for Improving Human Performance. May 2011, vol. 6, Issue 5, e20422. total 11 pages.

Ryan M. Robinson et al., Human-Autonomy Sensor Fusion for Rapid Object Detection. 2015 IEEE/RSJ International Conference on Intelligent Robots and Systems (IROS), Congress Center Hamburg, Sep. 28-Oct. 2, 2015. Hamburg, Germany, 8 pages.

Stephanie Lees et al., A review of rapid serial visual presentation-based brain computer interfaces. Journal of Neural Engineering, vol. 15, No. 2, Jan. 24, 2018, 24 pages.

* cited by examiner

IMAGE RECOGNITION VIA BRAIN-COMPUTER COLLABRATION WITH VARIABLE IMAGE PRESENTATION TIMES

CROSS-REFERENCE TO RELATED APPLICATIONS

This application is a continuation of International Application No. PCT/CN2019/076657, filed on Mar. 1, 2019, which claims priority to Chinese Patent Application No. 201810174915.2, filed on Mar. 2, 2018. The disclosures of the aforementioned applications are herein incorporated by reference in their entireties.

TECHNICAL FIELD

Embodiments of the present invention relate to the field of information technologies, and in particular, to an image recognition method and device, and an image presentation time adjustment method and device.

BACKGROUND

In the current information age, people share abundant information resources, but also often encounter the problem of "information overload" or "information explosion". How to efficiently select the most needed information from the massive information resources is an important topic in the coming information era. In the image field, image recognition is one of the most concerned problems. Image recognition may be implemented by using a computer vision algorithm. The computer vision algorithm may be a conventional image detection algorithm, or may be a deep learning algorithm based on an artificial neural network. The conventional image detection algorithm extracts image features from an image area, and classifies images based on whether an image is a target image according to the image classification algorithm. The deep learning algorithm based on the artificial neural network may train an initial convolutional neural network by using a training sample, adjust a parameter in the initial convolutional neural network to converge an error of image recognition, so as to construct a new convolutional neural network, and predict a probability that an image is a target image by using the new convolutional neural network, so as to perform image recognition.

Both the conventional target detection algorithm and the deep learning algorithm based on the artificial neural network have the following disadvantages: First, it may be difficult to obtain training data of a specific type, which causes unbalanced distribution of training samples. Second, noise of training data is large, which causes a large error of the algorithm. In addition, some features of the image, for example, a high-order semantic feature, is difficult to extract. Compared with the computer vision algorithm, human brain has abundant cognition and apriori knowledge. Extracting a feature by human brain can be independent of the problems such as an amount of training data and the unbalanced sample distribution. In addition, the human brain often exhibits strong stability even under the impact of noise. In addition, the human brain's experience, and high-level semantic understanding and inference ability can also be used to find some obscure high-level features. However, the human brain has some disadvantages in target image recognition, for example, relatively low efficiency. Therefore, persons skilled in the art can think of combining the advantages of the human brain and the computer, and performing image recognition through brain computer coordination, that is, collaboration between the human brain and the computer vision algorithm.

When the brain collaborates with the computer on target image recognition, an image sequence based on a rapid serial visual presentation (RSVP) paradigm may be used as an external stimulus of the human brain. When a person observes the image sequence, electroencephalogram (EEG) signals of the human brain that are obtained when the person observes the target image and a common image have different features. Electroencephalogram signals obtained when the human brain observes an image sequence can be collected and analyzed, and an image feature of an image in the image sequence can be collected by using the computer vision algorithm. For each image in the image sequence, whether the image is a target image may be recognized based on an electroencephalogram signal and an image feature. Currently, a time interval between images in an image sequence based on RSVP is determined according to experience or an experiment. However, because a human brain is prone to fatigue and attention resources of the human brain are limited, a miss detection rate of brain-computer collaboration image recognition is still relatively high, resulting in relatively low efficiency of brain-computer collaboration image recognition.

SUMMARY

Embodiments of this application disclose a brain-computer combination image recognition method and device based on image sequence presentation, and an image presentation time adjustment method and device, so as to improve efficiency of brain-computer combination image recognition.

According to a first aspect, an embodiment of this application provides a brain-computer combination image recognition method based on image sequence presentation, including: setting a presentation time sequence corresponding to an image sequence, where the image sequence includes N images, N is a positive integer, the presentation time sequence includes a presentation time of each image in the image sequence, a presentation time of an image i is used to indicate a time period from a presentation start moment of the image i to a presentation start moment of a next adjacent image, the image i is any image in the image sequence, the presentation time sequence includes at least two unequal presentation times, a difference between any two presentation times of the at least two unequal presentation times is $k \times \Delta$, k is a positive integer, and $\Delta$ is a preset time period value; processing the image sequence by using a computer vision algorithm, to obtain a computer vision signal corresponding to each image in the image sequence; obtaining a feedback signal that is generated when an observation object watches the image sequence displayed in the presentation time sequence and that corresponds to each image in the image sequence, where the feedback signal is used to indicate a reaction of the observation object to the watched image; and fusing, for each image in the image sequence, a corresponding computer vision signal and a corresponding feedback signal to obtain a target recognition signal of each image in the image sequence, where the target recognition signal is used for image recognition.

The at least two unequal presentation times are used to improve accuracy of recognizing each image in the image sequence by the observation object. $\Delta$ may be a value between 10 ms to 100 ms. In an embodiment, $\Delta$ may be a value between 50 ms to 100 ms.

In an embodiment, the image sequence may be from a camera device, and before the setting a presentation time sequence corresponding to an image sequence, the method further includes: receiving M images from the camera device, where M is an integer greater than 1; and selecting N images from the M images as the image sequence, where N is less than or equal to M.

In an embodiment, the setting a presentation time sequence corresponding to an image sequence includes: determining a corresponding presentation time for each image in the image sequence based on a duration impact parameter, to obtain the presentation time sequence corresponding to the image sequence; where the duration impact parameter includes at least one of the first recognition probability and a fatigue state parameter, the first recognition probability is used to indicate a probability, obtained by using the computer vision algorithm, that an image includes a preset image feature, the fatigue state parameter is used to indicate a fatigue degree of the observation object when the observation object observes an image, the presentation time is inversely correlated with the first recognition probability, and the presentation time is positively correlated with the fatigue state parameter. A presentation time of any image i in the image sequence is set based on at least one of a first recognition probability and a fatigue state parameter. A higher probability that the computer vision algorithm recognizes that the image i includes the preset image feature indicates that the image recognition device may set a longer brain recognition duration. More attention resources in a time dimension of the observation object are allocated to an image with greater uncertainty. This can reduce a miss detection rate of image recognition and improve efficiency of brain-computer collaboration image recognition. In addition, a larger fatigue state parameter of the observation object indicates that the observation object is more fatigued. The observation object needs a relatively long observation time to recognize whether the image i includes the preset image feature. Therefore, a relatively long presentation time of the image i is set. Determining the presentation time of the image i based on a fatigue degree of the observation object can reduce miss detection cases caused by brain fatigue of the observation object, thereby reducing the miss detection rate.

In an embodiment, before the determining a corresponding presentation time for each image in the image sequence based on a duration impact parameter, the method further includes: predicting, according to a fatigue rule, the fatigue state parameter corresponding to each image in the image sequence, where the fatigue rule is used to indicate a change rule of a fatigue degree of the observation object. A fatigue state parameter corresponding to any image i in the image sequence when the observation object observes the image i is predicted by using the fatigue rule, and the presentation time sequence corresponding to the image sequence may be preset. When the brain and the computer are combined to perform image recognition on the image, a process of determining a presentation time of the image in the image sequence does not need to be executed. This can reduce data load of parallel processing performed by the image recognition device during recognition of the image in the image sequence, thereby reducing a miss detection rate of brain-computer combination image recognition.

The fatigue state parameter corresponding to the image is a fatigue state parameter of the observation object when the observation object watches the image.

In an embodiment, the duration impact parameter includes the fatigue state parameter and the first recognition probability. Before the determining a corresponding presentation time for each image in the image sequence based on a duration impact parameter, to obtain the presentation time sequence corresponding to the image sequence, the method further includes: processing the image sequence by using the computer vision algorithm, to obtain the first recognition probability of each image in the image sequence; and predicting, according to a fatigue rule, the fatigue state parameter corresponding to each image in the image sequence, where the fatigue rule is used to indicate a change rule of a fatigue degree of the observation object. The determining a corresponding presentation time for each image in the image sequence based on a duration impact parameter, to obtain the presentation time sequence corresponding to the image sequence includes: for each image in the image sequence, determining a corresponding presentation time based on the first recognition probability and the fatigue state parameter, to obtain the presentation time sequence corresponding to the image sequence.

In an embodiment, the duration impact parameter includes the fatigue state parameter. Before the determining a corresponding presentation time for each image in the image sequence based on a duration impact parameter, to obtain the presentation time sequence corresponding to the image sequence, the method further includes: predicting, according to a fatigue rule, the fatigue state parameter corresponding to each image in the image sequence, where the fatigue rule is used to indicate a change rule of a fatigue degree of the observation object. The determining a corresponding presentation time for each image in the image sequence based on a duration impact parameter, to obtain the presentation time sequence corresponding to the image sequence includes: for each image in the image sequence, determining a corresponding presentation time based on the fatigue state parameter, to obtain the presentation time sequence corresponding to the image sequence.

In an embodiment, the duration impact parameter includes the first recognition probability. Before the determining a corresponding presentation time for each image in the image sequence based on a duration impact parameter, to obtain the presentation time sequence corresponding to the image sequence, the method further includes: processing the image sequence by using the computer vision algorithm, to obtain the first recognition probability of each image in the image sequence. The determining a corresponding presentation time for each image in the image sequence based on a duration impact parameter, to obtain the presentation time sequence corresponding to the image sequence includes: for each image in the image sequence, determining a corresponding presentation time based on the first recognition probability, to obtain the presentation time sequence corresponding to the image sequence.

In an embodiment, the obtaining a feedback signal that is generated when an observation object watches the image sequence displayed in the presentation time sequence and that corresponds to each image in the image sequence includes: in a process of displaying the image sequence in the presentation time sequence, obtaining the fatigue state parameter corresponding to an image j, and adjusting, based on the fatigue state parameter corresponding to the image j, a presentation time, in the presentation time sequence, corresponding to an image to be displayed after the image j in the image sequence, where the image j is any image in the image sequence. First, the presentation time sequence corresponding to the image sequence is determined according to the computer vision algorithm. When the image sequence is displayed in sequence according to the presentation time sequence, when the brain and the computer are combined to recognize the image in the image sequence, a process of determining the presentation time sequence of the image sequence does not need to be executed. This can reduce data load of parallel processing performed by the image recognition device during recognition of the image j, thereby reducing a miss detection rate of brain-computer combination image recognition. Second, a fatigue state parameter corresponding to the observation object when the observation object observes an image in the image sequence may be detected in real time by using a fatigue detection apparatus, and a presentation time of the image is adjusted based on the real-time fatigue state parameter. The fatigue state parameter can assist in correcting the presentation time of the image, and can reduce miss detection cases caused by brain fatigue of the observation object, thereby reducing the miss detection rate.

In an embodiment, the fatigue state parameter corresponding to the image j may be obtained through prediction according to the fatigue rule.

In an embodiment, the fatigue state parameter corresponding to the image j may be obtained in real time through prediction by using a sensor. The obtaining the fatigue state parameter corresponding to the image j includes: obtaining the fatigue state parameter based on fatigue state information that is sent by a sensor and that is obtained when the observation object watches the image j.

In an embodiment, the image recognition device may also obtain the presentation time sequence corresponding to the image sequence based on the fatigue state parameter, and then adjust the presentation time of the image in the image sequence in real time based on the first recognition probability. Specifically, the duration impact parameter includes the fatigue state parameter. The obtaining a feedback signal that is generated when an observation object watches the image sequence displayed in the presentation time sequence and that corresponds to each image in the image sequence includes: in a process of displaying the image sequence in the presentation time sequence, obtaining the first recognition probability corresponding to an image j, and adjusting, based on the first recognition probability corresponding to the image j, a presentation time, in the presentation time sequence, corresponding to an image to be displayed after the image j in the image sequence, where the image j is any image in the image sequence.

In an embodiment, the fatigue rule is used to indicate a change rule of a fatigue degree of the observation object based on a quantity of images observed by the observation object.

In an embodiment, the fatigue rule is used to indicate a change rule of the fatigue degree of the observation object based on duration spent by the observation object for image observation.

In an embodiment, the fatigue rule includes a second mapping table, and the predicting, according to a fatigue rule, the fatigue state parameter corresponding to each image in the image sequence includes: finding, from the second mapping table according to a quantity of images displayed before each image in the image sequence, the fatigue state parameter corresponding to each image in the image sequence. In the image sequence, a quantity of images displayed before a specific image is a quantity of observed images corresponding to the specific image, and the second mapping table includes a plurality of quantities of observed images and fatigue state parameters corresponding to the plurality of quantities of observed images.

In an embodiment, the fatigue rule includes a second mapping table, and the predicting, according to the fatigue rule, a fatigue state parameter corresponding to each image in the image sequence includes: predicting, according to a quantity S of images displayed before each image in the image sequence, a duration spent by the observation object for image observation when each image in the image sequence is being observed, where a duration spent by the observation object for image observation when an image is being observed is t=S×ts, ts is a predicted average presentation time of each image in the image sequence; and finding, from the second mapping table, the fatigue state parameter corresponding to each image in the image sequence according to the duration spent by the observation object for image observation when each image in the image sequence is being observed. The second mapping table includes a plurality of durations spent by the observation object for image observation and fatigue state parameters corresponding to the plurality of durations spent by the observation object for image observation.

In an embodiment, the fatigue rule is a fitting formula for the fatigue state parameter and the quantity of images observed by the observation object.

In an embodiment, the fatigue rule is a fitting formula for the fatigue state parameter and the duration spent by the observation object for image observation.

In an embodiment, the fatigue rule is an objective law related to the observation object.

In an embodiment, the fatigue rule is obtained by training one or more observation objects by using a plurality of samples, and each sample in the plurality of samples is a combination of a quantity of observed images and a fatigue state parameter; or each sample in the plurality of samples is a combination of a duration spent for image observation and a fatigue state parameter.

In an embodiment, the determining a corresponding presentation time for each image in the image sequence based on a duration impact parameter includes: for each image in the image sequence, finding a presentation time corresponding to the duration impact parameter from a first mapping table, where the first mapping table includes a plurality of duration impact parameters and presentation times respectively corresponding to the plurality of duration impact parameters.

In an embodiment, the duration impact parameter includes the first recognition probability. The determining a corresponding presentation time for each image in the image sequence based on a duration impact parameter includes: obtaining the presentation time of each image in the image sequence by using the following fitting formula:

$$T(c) = \sum_{t=0}^{n} a_j c^t;$$

where

T(c) is the presentation time, c is the first recognition probability, c is a real number satisfying 0≤c≤1, n is an order at which T(c) fits c, n is an integer greater than 0, t is an integer satisfying −n≤t≤n, and $a_t$ is a coefficient of $c^t$.

In an embodiment, T(c) is obtained after n-order linear fitting is performed on c by using (c1, T2) and (c2, T1). T1 is a minimum presentation time threshold, T2 is a maximum presentation time threshold, c1 is a minimum probability threshold of a recognition probability determined by using the computer vision algorithm, and c2 is a maximum probability threshold of a recognition probability determined by using the computer vision algorithm.

In an embodiment, when the first recognition probability of any image i in the image sequence is greater than or equal to c2, the first recognition probability is used to determine that the image i includes the preset image feature. When the first recognition probability of the image i is less than or equal to c1, the first recognition probability is used to determine that the image i does not include the preset image feature.

In an embodiment, the duration impact parameter includes the fatigue state parameter. The determining a corresponding presentation time for each image in the image sequence based on a duration impact parameter includes: obtaining the presentation time of each image in the image sequence by using the following fitting formula:

$$T(f) = \sum_{k=0}^{m} a_k f^k;$$

where

T(f) is the presentation time, f is the fatigue state parameter, m is an order at which T(f) fits f, m is a positive integer greater than 0, k is an integer satisfying $-m \leq k \leq m$, and $a_k$ is a coefficient of $f^k$.

In an embodiment, T(f) is obtained after n-order linear fitting is performed on f by using (f1, T1) and (f2, T2). T1 is a minimum presentation time threshold, T2 is a maximum presentation time threshold, f1 is a minimum fatigue threshold, and f2 is a maximum fatigue threshold.

In an embodiment, when a fatigue state parameter corresponding to any image i in the image sequence is greater than or equal to f2, display of the image sequence is controlled to be stopped. After the observation object has a rest for a period of time, in when the fatigue state parameter corresponding to the image i is less than or equal to f1, display the image sequence starts again.

In an embodiment, the duration impact parameter includes the first recognition probability. The determining a corresponding presentation time for each image in the image sequence based on a duration impact parameter includes: obtaining the presentation time of each image in the image sequence by using the following fitting formula:

$$T(c, f) = \sum_{t=0}^{n} \sum_{k=0}^{m} a_{t,k} c^t f^k;$$

where

T(c, f) is the presentation time, c is the first recognition probability, f is the fatigue state parameter, m is an order at which T(c, f) fits f, n is an order at which T(c, f) fits c, both n and m are positive integers greater than 0, t is an integer satisfying $-n \leq t \leq n$, k is an integer satisfying $-m \leq k \leq m$, c is a real number satisfying $0 \leq c \leq 1$, and $a_{t,k}$ is a coefficient of $c^t f^k$.

In an embodiment, T(c, f) is obtained after linear fitting is performed on c and f by using (c1, T2), (c2, T1), (f1, T1), and (c2, T2). T1 is a minimum presentation time threshold, T2 is a maximum presentation time threshold, c1 is a minimum probability threshold of a recognition probability determined by using the computer vision algorithm, c2 is a maximum probability threshold of a recognition probability determined by using the computer vision algorithm, f1 is a minimum fatigue threshold, and f2 is a maximum fatigue threshold.

In an embodiment, when the first recognition probability of any image i in the image sequence is greater than or equal to c2, the first recognition probability is used to determine that the image i includes the preset image feature. When the first recognition probability of the image i is less than or equal to c1, the first recognition probability is used to determine that the image i does not include the preset image feature. When a fatigue state parameter corresponding to the image i is greater than or equal to f2, display of the image sequence is stopped. When the fatigue state parameter corresponding to the image i is less than or equal to f1, display the image sequence starts again.

In an embodiment, when it is detected that a corresponding fatigue state parameter obtained when the observation object observes an image q is greater than or equal to a first fatigue threshold, images to be displayed after the image q in the image sequence are controlled not to be displayed, and an image whose corresponding first recognition probability is greater than or equal to a first probability threshold in the images to be displayed after the image q is obtained, where the image q is any image in the image sequence. When it is detected that the fatigue state parameter of the observation object is less than or equal to a second fatigue threshold, the image whose first recognition probability is greater than or equal to the first probability threshold in the images to be displayed after the image q is controlled to be sequentially displayed. When the fatigue state parameter of the observation object is greater than or equal to the first fatigue threshold, that is, when it is detected that the observation object is already fatigued, image display is suspended, so that the observation object rests, and images with a relatively high first recognition probability are selected in this period. When the observation object has finished rest, brain-computer combination image recognition is performed on these images again. After the foregoing process, image recognition efficiency can be improved.

In an embodiment, there are at least two observation objects. The fusing, for each image in the image sequence, a corresponding computer vision signal and a corresponding feedback signal to obtain a target recognition signal of each image in the image sequence includes: fusing, for each image in the image sequence, a corresponding computer vision signal and at least two corresponding feedback signals to obtain a target recognition signal of each image in the image sequence. A plurality of observation objects simultaneously perform brain-computer combination image recognition on an image in the image sequence. This can reduce a random error caused by a subjective reason of an observation object in a case of one observation object, thereby improving accuracy of brain-computer combination image recognition.

In an embodiment, the fatigue state parameter includes at least two fatigue state parameters respectively generated when the at least two observation objects observe a same image. Fatigue state parameters of a plurality of observation objects are measured and an image presentation time is determined by using the plurality of fatigue state parameters. In this way, a random error caused by a subjective reason of an observation object in a case of one observation object can be reduced, and determining of the image presentation time is more accurate. Therefore, the accuracy of brain-computer combination image recognition can be improved.

In an embodiment, the fusing, for each image in the image sequence, a corresponding computer vision signal and a corresponding feedback signal to obtain a target recognition signal of each image in the image sequence includes: determining, for each image in the image sequence based on at least one of the first recognition probability, the fatigue state parameter, and the presentation time, a first weight corresponding to each image in the image sequence, where the first weight is a weight used when the corresponding feedback signal is used to determine the target recognition signal, the first weight is inversely correlated with the first recognition probability, the first weight is inversely correlated with the fatigue state parameter, and the first weight is positively correlated with the presentation time; and fusing, for each image in the image sequence based on a corresponding first weight, a corresponding computer vision signal and a corresponding feedback signal to obtain the target recognition signal of each image in the image sequence. When recognition accuracy of the computer vision algorithm is higher, a fusion weight used by recognition by using the computer vision algorithm may be increased, and a fusion weight used by brain recognition of the observation object may be reduced, thereby reducing a miss detection rate. When the fatigue state parameter of the observation object is larger, the weight of brain recognition of the observation object may be reduced, and therefore the miss detection rate can be reduced. When an image presentation time is longer, a time for observation by the observation object is longer, and therefore accuracy of brain recognition of the observation object is higher. In this case, the weight of brain recognition of the observation object may be increased, so as to reduce a miss detection rate.

In an embodiment, the computer vision signal is a first recognition probability determined by using the computer vision algorithm. Before the fusing, for each image in the image sequence, a corresponding computer vision signal and a corresponding feedback signal to obtain a target recognition signal of each image in the image sequence, the method further includes: calculating, for each image in the image sequence, a second recognition probability of each image in the image sequence based on a corresponding feedback signal, where the second recognition probability is used to indicate a probability that the observation object determines that the image includes the preset image feature; and the fusing, for each image in the image sequence, a corresponding computer vision signal and a corresponding feedback signal to obtain a target recognition signal of each image in the image sequence includes: calculating, for each image in the image sequence, a target recognition probability of each image in the image sequence based on the corresponding first recognition probability and the corresponding second recognition probability.

In an embodiment, the computer vision signal is an image feature determined by using the computer vision algorithm. Before the fusing, for each image in the image sequence, a corresponding computer vision signal and a corresponding feedback signal to obtain a target recognition signal of each image in the image sequence, the method further includes: determining, for each image in the image sequence based on a corresponding feedback signal, a feedback signal feature corresponding to each image in the image sequence; and the fusing, for each image in the image sequence, a corresponding computer vision signal and a corresponding feedback signal to obtain a target recognition signal of each image in the image sequence includes: performing, for each image in the image sequence, feature fusion on the corresponding image feature and the corresponding feedback signal feature, to obtain a fused feature corresponding to each image in the image sequence; and determining, for each image in the image sequence, a target recognition probability of each image in the image sequence based on the corresponding fused feature.

In an embodiment, S images are determined, from the image sequence based on the target recognition probability of each image in the image sequence, as images including the preset image feature, where the target recognition probabilities of the S images meet a preset condition, and S is an integer less than or equal to N. The preset condition may be that the target recognition probability is greater than or equal to a threshold, or the preset condition may be that the S images are the first S images sorted in descending order according to the target recognition probabilities when target recognition probabilities of images in the image sequence are sorted in descending order.

In an embodiment, images whose corresponding target recognition probabilities are between a second probability threshold and a third probability threshold in the image sequence are used as a new image sequence. The new image sequence may be used to re-execute the method described in any one of the first aspect and the embodiments of the first aspect. Images, in the image sequence, with relatively great uncertainty of whether the preset image feature is included are re-used, for a plurality of times, as a new image sequence for brain computer combination image recognition. In this way, a suspicious object in the image sequence can be filtered out, a probability of misjudgment of the image recognition device is reduced, and accuracy of brain computer combination image recognition can be improved.

In an embodiment, when a target recognition probability of any image in the image sequence is less than or equal to the second probability threshold, the image recognition device predicts that the image is not an image that includes the preset image feature. When a target recognition probability of any image in the image sequence is greater than or equal to the third probability threshold, the image recognition device predicts that the image is an image that includes the preset image feature. The second probability threshold is less than or equal to the third probability threshold.

In an embodiment, the feedback signal is an electroencephalogram signal.

According to a second aspect, an embodiment of this application provides an image presentation time determining method, including: obtaining a plurality of images; setting a corresponding presentation time for each image in the plurality of images based on a duration impact parameter, to obtain a presentation time sequence corresponding to the plurality of images, where the duration impact parameter includes at least one of a first recognition probability and a fatigue state parameter, the presentation time is inversely correlated with the first recognition probability, the presentation time is positively correlated with the fatigue state parameter, the first recognition probability is used to indicate a probability, obtained by using a computer vision algorithm, that an image includes a preset image feature, the fatigue state parameter is used to indicate a fatigue degree of the observation object when the observation object observes an image, a presentation time of an image i is used to indicate a time period from a presentation start moment of the image i to a presentation start moment of a next adjacent image, and the image i is any image in the plurality of images; and outputting or storing the plurality of images and the presentation time sequence corresponding to the plurality of images.

The plurality of images may form an image sequence.

In an embodiment, the obtaining a plurality of images includes: receiving M images from a camera device, where M is an integer greater than 1; and selecting N images from the M images as the image sequence, where N is less than or equal to M.

In an embodiment, the fatigue state parameter corresponding to each image in the image sequence is obtained through prediction according to a fatigue rule, and the fatigue rule is used to indicate a change rule of a fatigue degree of the observation object.

The fatigue state parameter corresponding to the image is a fatigue state parameter of the observation object when the observation object watches the image.

In an embodiment, after the outputting or storing the plurality of images and the presentation time sequence corresponding to the plurality of images, the method further includes: obtaining a feedback signal that is generated when the observation object watches the plurality of images displayed in the presentation time sequence and that corresponds to each image in the plurality of images, where the feedback signal is used to indicate a reaction of the observation object to the watched image; and fusing, for each image in the image sequence, a corresponding computer vision signal and a corresponding feedback signal to obtain a target recognition signal of each image in the plurality of images, where the target recognition signal is used for image recognition. The presentation time of each image in the image sequence is set based on at least one of a first recognition probability and a fatigue state parameter. A computer vision signal corresponding to an image is a first recognition probability of the image or an image feature of the image that is obtained by processing the image by using a computer vision algorithm. A higher probability that the computer vision algorithm recognizes that an image includes the preset image feature indicates that an image recognition device may set a longer brain recognition duration. More attention resources in a time dimension of the observation object are allocated to an image with greater uncertainty. This can reduce a miss detection rate of image recognition and improve efficiency of brain-computer collaboration image recognition. In addition, a larger fatigue state parameter of the observation object indicates that the observation object is more fatigued, and the observation object needs a relatively long observation time to recognize whether an image includes the preset image feature. Therefore, a relatively long presentation time of the image is set. Determining the presentation time of the image based on a fatigue degree of the observation object can reduce miss detection cases caused by brain fatigue of the observation object, thereby reducing the miss detection rate.

In an embodiment, the duration impact parameter includes the first recognition probability. The obtaining a feedback signal that is generated when the observation object watches the plurality of images displayed in the presentation time sequence and that corresponds to each image in the plurality of images includes: in a process of displaying the plurality of images in the presentation time sequence, obtaining the fatigue state parameter corresponding to an image j, and adjusting, based on the fatigue state parameter corresponding to the image j, a presentation time, in the presentation time sequence, corresponding to an image to be displayed after the image j in the plurality of images, where the image j is any image in the image sequence.

In an embodiment, the fatigue state parameter corresponding to the image j may be obtained through prediction according to the fatigue rule.

In an embodiment, the fatigue state parameter corresponding to the image j may be obtained in real time through prediction by using a sensor.

In an embodiment, the fatigue rule is used to indicate a change rule of a fatigue degree of the observation object based on a quantity of images observed by the observation object.

In an embodiment, the fatigue rule is used to indicate a change rule of the fatigue degree of the observation object based on a duration spent by the observation object for image observation.

In an embodiment, the fatigue rule includes a second mapping table.

In an embodiment, the fatigue rule includes a fitting formula for the fatigue state parameter and the quantity of images observed by the observation object.

In an embodiment, the fatigue rule is a fitting formula for the fatigue state parameter and the duration spent by the observation object for image observation.

In an embodiment, the fatigue rule is an objective law related to the observation object.

A fatigue state parameter corresponding to any image i in the plurality of images when the observation object observes the image i is predicted by using the fatigue rule, and the presentation time sequence corresponding to the image sequence may be preset. When the brain and the computer are combined to perform image recognition on the image, a process of determining a presentation time of the image in the image sequence does not need to be executed. This can reduce data load of parallel processing performed by the image recognition device during recognition of the image in the image sequence, thereby reducing a miss detection rate of brain-computer combination image recognition.

In an embodiment, the fatigue rule is obtained by training one or more observation objects by using a plurality of samples, and each sample in the plurality of samples is a combination of a quantity of observed images and a fatigue state parameter; or each sample in the plurality of samples is a combination of a duration spent for image observation and a fatigue state parameter.

In an embodiment, the determining a corresponding presentation time for each image in the image sequence based on a duration impact parameter includes: for each image in the image sequence, finding a presentation time corresponding to the duration impact parameter from a first mapping table, where the first mapping table includes a plurality of duration impact parameters and presentation times respectively corresponding to the plurality of duration impact parameters.

In an embodiment, the duration impact parameter includes the first recognition probability. The setting a corresponding presentation time for each image in the plurality of images based on a duration impact parameter includes: obtaining the presentation time of each image in the plurality of images by using the following fitting formula:

$$T(c) = \sum_{t=0}^{n} a_j c^t;$$

where

T(c) is the presentation time, c is the first recognition probability, c is a real number satisfying $0 \leq c \leq 1$, n is an order at which T(c) fits c, n is an integer greater than 0, t is an integer satisfying $-n \leq t \leq n$, and $a_t$ is a coefficient of $c^t$.

In an embodiment, T(c) is obtained after n-order linear fitting is performed on c by using (c1, T2) and (c2, T1). T1 is a minimum presentation time threshold, T2 is a maximum presentation time threshold, c1 is a minimum probability threshold of a recognition probability determined by using the computer vision algorithm, and c2 is a maximum probability threshold of a recognition probability determined by using the computer vision algorithm.

In an embodiment, the duration impact parameter includes the fatigue state parameter. The determining a corresponding presentation time for each image in the plurality of images based on a duration impact parameter includes: obtaining the presentation time of each image in the plurality of images by using the following fitting formula:

$$T(f) = \sum_{k=0}^{m} a_k f^k;$$

where

T(f) is the presentation time, f is the fatigue state parameter, m is an order at which T(f) fits f, m is a positive integer greater than 0, k is an integer satisfying $-m \le k \le m$, and $a_k$ is a coefficient of $f^k$.

In an embodiment, T(f) is obtained after n-order linear fitting is performed on f by using (f1, T1) and (f2, T2). T1 is a minimum presentation time threshold, T2 is a maximum presentation time threshold, f1 is a minimum fatigue threshold, and f2 is a maximum fatigue threshold.

In an embodiment, the duration impact parameter includes the first recognition probability and the fatigue state parameter. The determining a corresponding presentation time for each image in the plurality of images based on a duration impact parameter includes: obtaining the presentation time of each image in the plurality of images by using the following fitting formula:

$$T(c, f) = \sum_{t=0}^{n} \sum_{k=0}^{m} a_{t,k} c^t f^k;$$

where

T(c, f) is the presentation time, c is the first recognition probability, f is the fatigue state parameter, m is an order at which T(c, f) fits f, n is an order at which T(c, f) fits c, both n and m are positive integers greater than 0, t is an integer satisfying $-n \le t \le n$, k is an integer satisfying $-m \le k \le m$, c is a real number satisfying $0 \le c \le 1$, and $a_{t,k}$ is a coefficient of $c^t f^k$.

In an embodiment, T(c, f) is obtained after linear fitting is performed on c and f by using (c1, T2), (c2, T1), (f1, T1), and (c2, T2). T1 is a minimum presentation time threshold, T2 is a maximum presentation time threshold, c1 is a minimum probability threshold of a recognition probability determined by using the computer vision algorithm, c2 is a maximum probability threshold of a recognition probability determined by using the computer vision algorithm, f1 is a minimum fatigue threshold, and f2 is a maximum fatigue threshold.

In an embodiment, when it is detected that a corresponding fatigue state parameter obtained when the observation object observes an image q is greater than or equal to a first fatigue threshold, images to be displayed after the image q in the plurality of images are controlled not to be displayed, and an image whose corresponding first recognition probability is greater than or equal to a first probability threshold in the images to be displayed after the image q is obtained, where the image q is any image in the plurality of images. When it is detected that the fatigue state parameter of the observation object is less than or equal to a second fatigue threshold, the image whose first recognition probability is greater than or equal to the first probability threshold in the images to be displayed after the image q is controlled to be sequentially displayed. When the fatigue state parameter of the observation object is greater than or equal to the first fatigue threshold, that is, when it is detected that the observation object is already fatigued, image display is suspended, so that the observation object rests, and images with a relatively high first recognition probability are selected in this period. When the observation object has finished rest, brain-computer combination image recognition is performed on these images again. After the foregoing process, image recognition efficiency can be improved.

In an embodiment, there are at least two observation objects. The fusing, for each image in the plurality of images, a corresponding computer vision signal and a corresponding feedback signal to obtain a target recognition signal of each image in the plurality of images includes: fusing, for each image in the image sequence, a corresponding computer vision signal and at least two corresponding feedback signals to obtain a target recognition signal of each image in the plurality of images. A plurality of observation objects simultaneously perform brain-computer combination image recognition on an image in the image sequence. This can reduce a random error caused by a subjective reason of an observation object in a case of one observation object, thereby improving accuracy of brain-computer combination image recognition.

In an embodiment, the fatigue state parameter includes at least two fatigue state parameters respectively generated when the at least two observation objects observe a same image. Fatigue state parameters of a plurality of observation objects are measured and an image presentation time is determined by using the plurality of fatigue state parameters. In this way, a random error caused by a subjective reason of an observation object in a case of one observation object can be reduced, and determining of the image presentation time is more accurate. Therefore, the accuracy of brain-computer combination image recognition can be improved.

In an embodiment, the fusing, for each image in the plurality of images, a corresponding computer vision signal and a corresponding feedback signal to obtain a target recognition signal of each image in the plurality of images includes: determining, for each image in the plurality of images based on at least one of the first recognition probability, the fatigue state parameter, and the presentation time, a first weight corresponding to each image in the plurality of images, where the first weight is a weight used when the corresponding feedback signal is used to determine the target recognition signal, the first weight is inversely correlated with the first recognition probability, the first weight is inversely correlated with the fatigue state parameter, and the first weight is positively correlated with the presentation time; and fusing, for each image in the plurality of images based on a corresponding first weight, a corresponding computer vision signal and a corresponding feedback signal to obtain the target recognition signal of each image in the image sequence. When recognition accuracy of the computer vision algorithm is higher, a fusion weight used by recognition by using the computer vision algorithm may be increased, and a fusion weight used by brain recognition of the observation object may be reduced, thereby reducing a miss detection rate. When the fatigue state parameter of the observation object is larger, the weight of brain recognition of the observation object may be reduced, and therefore the miss detection rate can be reduced. When an image presentation time is longer, a time for observation by the observation object is longer, and therefore accuracy of brain recognition of the observation object is higher. In this case, the weight of brain recognition of the observation object may be increased, so as to reduce a miss detection rate.

In an embodiment, the computer vision signal is a first recognition probability determined by using the computer vision algorithm. Before the fusing, for each image in the plurality of images, a corresponding computer vision signal and a corresponding feedback signal to obtain a target recognition signal of each image in the plurality of images, the method further includes: calculating, for each image in the plurality of images, a second recognition probability of each image in the plurality of images based on a corresponding feedback signal, where the second recognition probability is used to indicate a probability that the observation object determines that the image includes the preset image feature; and the fusing, for each image in the plurality of images, a corresponding computer vision signal and a corresponding feedback signal to obtain a target recognition signal of each image in the plurality of images includes: calculating, for each image in the plurality of images, a target recognition probability of each image in the plurality of images based on the corresponding first recognition probability and the corresponding second recognition probability.

In an embodiment, the computer vision signal is an image feature determined by using the computer vision algorithm. Before the fusing, for each image in the plurality of images, a corresponding computer vision signal and a corresponding feedback signal to obtain a target recognition signal of each image in the plurality of images, the method further includes: determining, for each image in the plurality of images based on a corresponding feedback signal, a feedback signal feature corresponding to each image in the plurality of images; and the fusing, for each image in the plurality of images, a corresponding computer vision signal and a corresponding feedback signal to obtain a target recognition signal of each image in the plurality of images includes: performing, for each image in the image sequence, feature fusion on the corresponding image feature and the corresponding feedback signal feature, to obtain a fused feature corresponding to each image in the plurality of images; and determining, for each image in the plurality of images, a target recognition probability of each image in the plurality of images based on the corresponding fused feature.

In an embodiment, S images are determined, from the plurality of images based on the target recognition probability of each image in the plurality of images, as images including the preset image feature, where the target recognition probabilities of the S images meet a preset condition, and S is an integer less than or equal to N. The preset condition may be that the target recognition probability is greater than or equal to a threshold, or the preset condition may be that the S images are the first S images sorted in descending order according to the target recognition probabilities when target recognition probabilities of images in the image sequence are sorted in descending order.

In an embodiment, images whose corresponding target recognition probabilities are between a second probability threshold and a third probability threshold in the plurality of images are used as a new group of a plurality of images, and the new group of a plurality of images may be used to re-execute the method described in any one of the second aspect and the embodiments of the second aspect. Images, in the image sequence, with relatively great uncertainty of whether the preset image feature is included are re-used, for a plurality of times, as a new image sequence for brain computer combination image recognition. In this way, a suspicious object in the image sequence can be filtered out, a probability of misjudgment of the image recognition device is reduced, and accuracy of brain computer combination image recognition can be improved.

In an embodiment, when a target recognition probability of any image in the plurality of images is less than or equal to the second probability threshold, the image recognition device predicts that the image is not an image that includes the preset image feature. When a target recognition probability of any image in the plurality of images is greater than or equal to the third probability threshold, the image recognition device predicts that the image is an image that includes the preset image feature. The second probability threshold is less than or equal to the third probability threshold.

In an embodiment, the feedback signal is an electroencephalogram signal.

According to a third aspect, an embodiment of this application provides an image presentation time adjustment method, including: obtaining an image sequence based on a rapid serial visual presentation RSVP paradigm, where the image sequence includes a plurality of images, a presentation time is configured for each image in the plurality of images, a presentation time of an image i is used to indicate a time period from a presentation start moment of the image i to a presentation start moment of a next adjacent image, and the image i is any image in the plurality of images; adjusting the presentation time corresponding to each image in the image sequence based on a corresponding duration impact parameter for each image in the image sequence, where the duration impact parameter includes at least one of a first recognition probability and a fatigue state parameter, the first recognition probability is used to indicate a probability, obtained by using a computer vision algorithm, that an image includes a preset image feature, the fatigue state parameter is used to indicate a fatigue degree of the observation object when the observation object observes an image, the first recognition probability is inversely correlated with the presentation time, and the fatigue state parameter is positively correlated with the presentation time; and controlling display of the image sequence based on an adjusted presentation time corresponding to each image in the image sequence.

In an embodiment, presentation times of the plurality of images before the presentation time adjustment starts are equal.

In an embodiment, the obtaining an image sequence based on a rapid serial visual presentation RSVP paradigm includes: receiving M images from a camera device, where M is an integer greater than 1; and selecting N images from the M images as the image sequence, where N is less than or equal to M.

In an embodiment, the fatigue state parameter corresponding to each image in the image sequence is obtained through prediction according to a fatigue rule, and the fatigue rule is used to indicate a change rule of a fatigue degree of the observation object.

In an embodiment, the fatigue state parameter corresponding to the image is a fatigue state parameter of the observation object when the observation object watches the image.

In an embodiment, after the controlling display of the image sequence based on an adjusted presentation time corresponding to each image in the image sequence, the method further includes: obtaining a feedback signal that is generated when the observation object watches the image sequence displayed in the presentation time sequence and that corresponds to each image in the image sequence, where the feedback signal is used to indicate a reaction of the observation object to the watched image; and fusing, for each image in the image sequence, a corresponding computer vision signal and a corresponding feedback signal to obtain a target recognition signal of each image in the image sequence, where the target recognition signal is used for image recognition. A computer vision signal corresponding to an image is a first recognition probability of the image or an image feature of the image that is obtained by processing the image by using a computer vision algorithm. A higher probability that the computer vision algorithm recognizes that an image includes the preset image feature indicates that an image recognition device may set a longer brain recognition duration. More attention resources in a time dimension of the observation object are allocated to an image with greater uncertainty. This can reduce a miss detection rate of image recognition and improve efficiency of brain-computer collaboration image recognition. In addition, a larger fatigue state parameter of the observation object indicates that the observation object is more fatigued. The observation object needs a relatively long observation time to recognize whether an image includes the preset image feature. Therefore, a relatively long presentation time of the image is set. Determining the presentation time of the image based on a fatigue degree of the observation object can reduce miss detection cases caused by brain fatigue of the observation object, thereby reducing the miss detection rate.

In an embodiment, the duration impact parameter includes the fatigue state parameter and the first recognition probability. Before the adjusting the presentation time corresponding to each image in the image sequence based on a corresponding duration impact parameter for each image in the image sequence, the method further includes: processing the image sequence by using the computer vision algorithm, to obtain the first recognition probability of each image in the image sequence; and predicting, according to a fatigue rule, the fatigue state parameter corresponding to each image in the image sequence, where the fatigue rule is used to indicate a change rule of a fatigue degree of the observation object. The adjusting the presentation time corresponding to each image in the image sequence based on a corresponding duration impact parameter for each image in the image sequence includes: for each image in the image sequence, adjusting a presentation time of a corresponding image based on the corresponding first recognition probability and the corresponding fatigue state parameter, to obtain an adjusted presentation time sequence corresponding to the image sequence. The presentation time sequence corresponding to the image sequence may be adjusted in advance. When the brain and the computer are combined to perform image recognition on the image, a process of adjusting a presentation time of the image in the image sequence does not need to be executed. This can reduce data load of parallel processing performed by the image recognition device during recognition of the image in the image sequence, thereby reducing a miss detection rate of brain-computer combination image recognition.

In an embodiment, the duration impact parameter includes the first recognition probability. Before the adjusting the presentation time corresponding to each image in the image sequence based on a corresponding duration impact parameter for each image in the image sequence, the method further includes: processing the image sequence by using the computer vision algorithm, to obtain the first recognition probability of each image in the image sequence. The adjusting the presentation time corresponding to each image in the image sequence based on a corresponding duration impact parameter for each image in the image sequence includes: for each image in the image sequence, adjusting the presentation time corresponding to each image in the image sequence based on the corresponding first recognition probability.

In an embodiment, the duration impact parameter includes the fatigue state parameter. Before the adjusting the presentation time corresponding to each image in the image sequence based on a corresponding duration impact parameter for each image in the image sequence, the method further includes: predicting, according to a fatigue rule, the fatigue state parameter corresponding to each image in the image sequence, where the fatigue rule is used to indicate a change rule of a fatigue degree of the observation object. The adjusting the presentation time corresponding to each image in the image sequence based on a corresponding duration impact parameter for each image in the image sequence includes: for each image in the image sequence, adjusting the presentation time corresponding to each image in the image sequence based on the corresponding fatigue state parameter.

In an embodiment, the adjusting the presentation time corresponding to each image in the image sequence based on a corresponding duration impact parameter for each image in the image sequence includes: finding, for an image j, a presentation time offset of the image j from a third mapping table based on a duration impact parameter of the image j, where the third mapping table includes a plurality of duration impact parameters and presentation time offsets respectively corresponding to the plurality of duration impact parameters; and adjusting a presentation time of the image j based on the presentation time offset of the image j; where the image j is any image in the image sequence.

In an embodiment, the duration impact parameter includes the first recognition probability. The adjusting the presentation time corresponding to each image in the image sequence based on a corresponding duration impact parameter for each image in the image sequence includes: obtaining a presentation time offset of each image in the image sequence by using the following fitting formula:

$$\Delta T(c) = \sum_{t=0}^{n} a_j c^t;$$

where $\Delta T(c)$ is the presentation time offset, c is the first recognition probability, c is a real number satisfying $0 \le c \le 1$, n is an order at which $\Delta T(c)$ fits c, n is an integer greater than 0, t is an integer satisfying $-n \le t \le n$, and $a_t$ is a coefficient of $c^t$; and adjusting the presentation time of each image in the image sequence based on the presentation time offset of each image in the image sequence.

In an embodiment, ΔT(c) is obtained after n-order linear fitting is performed on c by using (c1, T2) and (c2, T1). T1 is a minimum presentation time threshold, T2 is a maximum presentation time threshold, c1 is a minimum probability threshold of a recognition probability determined by using the computer vision algorithm, and c2 is a maximum probability threshold of a recognition probability determined by using the computer vision algorithm.

In an embodiment, when the first recognition probability of the image q is greater than or equal to c2, the first recognition probability is used to determine that the image q includes the preset image feature. When the first recognition probability of the image q is less than or equal to c1, the first recognition probability is used to determine that the image q does not include the preset image feature. The image q is any image in the image sequence.

In an embodiment, the duration impact parameter includes the fatigue state parameter. The adjusting the presentation time corresponding to each image in the image sequence based on a corresponding duration impact parameter for each image in the image sequence includes: obtaining a presentation time offset of each image in the image sequence by using the following fitting formula:

$$\Delta T(f) = \sum_{k=0}^{m} a_k f^k;$$

where
ΔT(f) is the presentation time offset, f is the fatigue state parameter, m is an order at which ΔT(f) fits f, m is a positive integer greater than 0, k is an integer satisfying $-m \leq k \leq m$, and $a_k$ is a coefficient of $f^k$; and adjusting the presentation time of each image in the image sequence based on the presentation time offset of each image in the image sequence.

In an embodiment, the duration impact parameter includes the first recognition probability and the fatigue state parameter. The adjusting the presentation time corresponding to each image in the image sequence based on a corresponding duration impact parameter for each image in the image sequence includes: obtaining a presentation time offset of each image in the image sequence by using the following fitting formula:

$$\Delta T(c, f) = \sum_{t=0}^{n} \sum_{k=0}^{m} a_{t,k} c^t f^k;$$

where ΔT(c, f) is the presentation time offset, c is the first recognition probability, f is the fatigue state parameter, m is an order at which ΔT(c, f) fits f, n is an order at which ΔT(c, f) fits c, both n and m are positive integers greater than 0, t is an integer satisfying $-n \leq t \leq n$, k is an integer satisfying $-m \leq k \leq m$, c is a real number satisfying $0 \leq c \leq 1$, and $a_{t,k}$ is a coefficient of $c^t f^k$; and adjusting the presentation time corresponding to each image in the image sequence based on the corresponding presentation time offset of each image in the image sequence.

In an embodiment, f is a normalized value, and f is a value between [0, 1].

In an embodiment, the method further includes: for an image q, obtaining a fatigue state parameter of the image q based on fatigue state information that is sent by a sensor and that is obtained when the observation object watches the image p, where the image q is any image in the image sequence other than the first image, and the image p is a previous image of the image q.

In an embodiment, a fatigue state parameter of the first image is preset to 0.

In an embodiment, when it is detected that a corresponding fatigue state parameter obtained when the observation object observes the image r is greater than or equal to a first fatigue threshold, images to be displayed after the image r in the image sequence are controlled not to be displayed, and an image whose first recognition probability is greater than or equal to a first probability threshold in the images to be displayed after the image r is obtained. When it is detected that the fatigue state parameter of the observation object is less than or equal to a second fatigue threshold, the image whose first recognition probability is greater than or equal to the first probability threshold in the images to be displayed after the image r is controlled to be sequentially displayed. When the fatigue state parameter of the observation object is greater than or equal to the first fatigue threshold, that is, when it is detected that the observation object is already fatigued, image display is suspended, so that the observation object rests, and images with a relatively high first recognition probability are selected in this period. When the observation object has finished rest, brain-computer combination image recognition is performed on these images again. After the foregoing process, image recognition efficiency can be improved.

In an embodiment, there are at least two observation objects, and the fatigue state parameter is at least two fatigue state parameters respectively generated when the at least two observation objects observe a same image. A presentation time of an image u is positively correlated with a weighted sum of the at least two fatigue state parameters, where the image u is any image in the image sequence. A plurality of observation objects simultaneously perform brain-computer combination image recognition on an image in the image sequence. This can reduce a random error caused by a subjective reason of an observation object in a case of one observation object, thereby improving accuracy of brain-computer combination image recognition.

In an embodiment, the fatigue state parameter includes at least two fatigue state parameters respectively generated when the at least two observation objects observe a same image. Fatigue state parameters of a plurality of observation objects are measured and an image presentation time is determined by using the plurality of fatigue state parameters. In this way, a random error caused by a subjective reason of an observation object in a case of one observation object can be reduced, and determining of the image presentation time is more accurate. Therefore, the accuracy of brain-computer combination image recognition can be improved.

In an embodiment, the fusing, for each image in the image sequence, a corresponding computer vision signal and a corresponding feedback signal to obtain a target recognition signal of each image in the image sequence includes: determining, for each image in the image sequence based on at least one of the first recognition probability, the fatigue state parameter, and the presentation time, a first weight corresponding to each image in the image sequence, where the first weight is a weight used when the corresponding feedback signal is used to determine the target recognition signal, the first weight is inversely correlated with the first recognition probability, the first weight is inversely correlated with the fatigue state parameter, and the first weight is positively correlated with the presentation time; and fusing, for each image in the image sequence based on a corresponding first weight, a corresponding computer vision signal and a corresponding feedback signal to obtain the target recognition signal of each image in the image sequence. When recognition accuracy of the computer vision algorithm is higher, a fusion weight used by recognition by using the computer vision algorithm may be increased, and a fusion weight used by brain recognition of the observation object may be reduced, thereby reducing a miss detection rate. When the fatigue state parameter of the observation object is larger, the weight of brain recognition of the observation object may be reduced, and therefore the miss detection rate can be reduced. When an image presentation time is longer, a time for observation by the observation object is longer, and therefore accuracy of brain recognition of the observation object is higher. In this case, the weight of brain recognition of the observation object may be increased, so as to reduce a miss detection rate.

In an embodiment, the computer vision signal is a first recognition probability determined by using the computer vision algorithm. Before the fusing, for each image in the image sequence, a corresponding computer vision signal and a corresponding feedback signal to obtain a target recognition signal of each image in the image sequence, the method further includes: calculating, for each image in the image sequence, a second recognition probability of each image in the image sequence based on a corresponding feedback signal, where the second recognition probability is used to indicate a probability that the observation object determines that the image includes the preset image feature; and the fusing, for each image in the image sequence, a corresponding computer vision signal and a corresponding feedback signal to obtain a target recognition signal of each image in the image sequence includes: calculating, for each image in the image sequence, a target recognition probability of each image in the image sequence based on the corresponding first recognition probability and the corresponding second recognition probability.

In an embodiment, the computer vision signal is an image feature determined by using the computer vision algorithm. Before the fusing, for each image in the image sequence, a corresponding computer vision signal and a corresponding feedback signal to obtain a target recognition signal of each image in the image sequence, the method further includes: determining, for each image in the image sequence based on a corresponding feedback signal, a feedback signal feature corresponding to each image in the image sequence; and the fusing, for each image in the image sequence, a corresponding computer vision signal and a corresponding feedback signal to obtain a target recognition signal of each image in the image sequence includes: performing, for each image in the image sequence, feature fusion on the corresponding image feature and the corresponding feedback signal feature, to obtain a fused feature corresponding to each image in the image sequence; and determining, for each image in the image sequence, a target recognition probability of each image in the image sequence based on the corresponding fused feature.

In an embodiment, S images are determined, from the image sequence based on the target recognition probability of each image in the image sequence, as images including the preset image feature, where the target recognition probabilities of the S images meet a preset condition, and S is an integer less than or equal to N. The preset condition may be that the target recognition probability is greater than or equal to a threshold, or the preset condition may be that the S images are the first S images sorted in descending order according to the target recognition probabilities when target recognition probabilities of images in the image sequence are sorted in descending order.

In an embodiment, images whose corresponding target recognition probabilities are between a second probability threshold and a third probability threshold in the image sequence are used as a new image sequence. The new image sequence may be used to re-execute the method described in any one of the first aspect and the embodiments of the first aspect. Images, in the image sequence, with relatively great uncertainty of whether the preset image feature is included are re-used, for a plurality of times, as a new image sequence for brain computer combination image recognition. In this way, a suspicious object in the image sequence can be filtered out, a probability of misjudgment of the image recognition device is reduced, and accuracy of brain computer combination image recognition can be improved.

In an embodiment, when a target recognition probability of any image in the image sequence is less than or equal to the second probability threshold, the image is not an image that includes the preset image feature. When a target recognition probability of any image in the image sequence is greater than or equal to the third probability threshold, the image is an image that includes the preset image feature. The second probability threshold is less than or equal to the third probability threshold.

In an embodiment, the feedback signal is an electroencephalogram signal.

According to a fourth aspect, an embodiment of this application provides an image recognition method, including: setting a presentation time of a target image based on a duration impact parameter of the target image, where the presentation time of the target image is used to indicate a time period from a presentation start moment of the target image to a presentation start moment of a next adjacent image, the duration impact parameter includes at least one of a first recognition probability and a fatigue state parameter, the first recognition probability is used to indicate a probability, obtained by using a computer vision algorithm, that an image includes a preset image feature, the fatigue state parameter is used to indicate a fatigue degree of an observation object when the observation object observes an image, the presentation time is inversely correlated with the first recognition probability, and the presentation time is positively correlated with the fatigue state parameter; obtaining a feedback signal generated when the observation object observes the target image within the presentation time of the target image; and determining a target recognition probability of the target image based on a computer vision signal and the feedback signal of the target image, where the computer vision signal is the first recognition probability or an image feature that is of the target image and that is determined by using the computer vision algorithm. A higher probability that the computer vision algorithm recognizes that an image includes the preset image feature indicates that an image recognition device may set a longer brain recognition duration. More attention resources in a time dimension of the observation object are allocated to an image with greater uncertainty. This can reduce a miss detection rate of image recognition and improve efficiency of brain-computer collaboration image recognition. In addition, a larger fatigue state parameter of the observation object indicates that the observation object is more fatigued, and the observation object needs a relatively long observation time to recognize whether an image includes the preset image feature. Therefore, a relatively long presentation time of the image is set, and an image presentation time is set more properly. Determining the presentation time of the image based on a fatigue degree of the observation object can reduce miss detection cases caused by brain fatigue of the observation object, thereby reducing the miss detection rate.

In an embodiment, before the setting a presentation time of a target image based on a duration impact parameter of the target image, the method further includes: receiving M images from a camera device, where M is an integer greater than 1; and selecting N images from the M images as the image sequence, where N is less than or equal to M. The target image is any image in the image sequence.

In an embodiment, before the obtaining a feedback signal generated when the observation object observes the target image within the presentation time of the target image, the method further includes: obtaining, based on the presentation time of each image in the image sequence, a presentation time sequence corresponding to the image sequence; and controlling, based on the presentation time sequence, to sequentially display the image sequence.

In an embodiment, the duration impact parameter includes the first recognition probability. The setting a presentation time of a target image based on a duration impact parameter of the target image includes: setting the presentation time of the target image based on a first recognition probability of the target image. Before the obtaining a feedback signal generated when the observation object observes the target image within the presentation time of the target image, the method further includes: in a process of controlling to sequentially display the image sequence based on the presentation time sequence, obtaining a fatigue state parameter corresponding to the target image; and adjusting, based on the fatigue state parameter corresponding to the target image, a presentation time of an image displayed after the target image in the image sequence. First, the presentation time sequence corresponding to the image sequence is determined according to the computer vision algorithm. When the image sequence is displayed in sequence according to the presentation time sequence, when the brain and the computer are combined to recognize the image in the image sequence, a process of determining the presentation time sequence of the image sequence does not need to be executed. This can reduce data load of parallel processing performed by the image recognition device during recognition of the target image, thereby reducing a miss detection rate of brain-computer combination image recognition. Second, a fatigue state parameter corresponding to the observation object when the observation object observes an image in the image sequence may be detected in real time by using a fatigue detection apparatus, and a presentation time of the image is adjusted based on the real-time fatigue state parameter. The fatigue state parameter can assist in correcting the presentation time of the image, and can reduce miss detection cases caused by brain fatigue of the observation object, thereby reducing the miss detection rate.

In an embodiment, before the obtaining a feedback signal generated when the observation object observes the target image within the presentation time of the target image, the method further includes: displaying the target image based on the presentation time of the target image. The fatigue state parameter of the observation object is detected in real time, and the presentation time of the image is determined based on the fatigue state parameter detected in real time. In this way, the fatigue state parameter of the observation object is more accurate, the determined presentation time is more proper, and a miss detection rate can be reduced.

In an embodiment, the setting a presentation time of a target image based on a duration impact parameter of the target image includes: finding, from a first mapping table based on the duration impact parameter of the target image, a presentation time corresponding to the duration impact parameter of the target image, where the first mapping table includes a plurality of duration impact parameters and presentation times respectively corresponding to the plurality of duration impact parameters; and setting the presentation time of the target image to the presentation time corresponding to the duration impact parameter of the target image.

In an embodiment, the duration impact parameter includes the first recognition probability. The setting a presentation time of the target image based on a duration impact parameter of the target image includes: setting the presentation time of the target image by using the following fitting formula:

$$T(c) = \sum_{t=0}^{n} a_j c^t;$$

where

T(c) is the presentation time, c is the first recognition probability, c is a real number satisfying $0 \leq c \leq 1$, n is an order at which T(c) fits c, n is an integer greater than 0, t is an integer satisfying $-n \leq t \leq n$, and $a_t$ is a coefficient of $c^t$.

In an embodiment, T(c) is obtained after n-order linear fitting is performed on c by using (c1, T2) and (c2, T1). T1 is a minimum presentation time threshold, T2 is a maximum presentation time threshold, c1 is a minimum probability threshold of a recognition probability determined by using the computer vision algorithm, and c2 is a maximum probability threshold of a recognition probability determined by using the computer vision algorithm.

In an embodiment, the duration impact parameter includes the fatigue state parameter. The setting a presentation time of the target image based on a duration impact parameter of the target image includes: setting the presentation time of the target image by using the following fitting formula:

$$T(f) = \sum_{k=0}^{m} a_k f^k;$$

where

T(f) is the presentation time, f is the fatigue state parameter, m is an order at which T(f) fits f, m is a positive integer greater than 0, k is an integer satisfying $-m \leq k \leq m$, and $a_k$ is a coefficient of $f^k$.

In an embodiment, the duration impact parameter includes the first recognition probability and the fatigue state parameter. The setting a presentation time of the target image based on a duration impact parameter of the target image includes: setting the presentation time of the target image by using the following fitting formula:

$$T(c, f) = \sum_{t=0}^{n} \sum_{k=0}^{m} a_{t,k} c^t f^k;$$

where

T(c, f) is the presentation time, c is the first recognition probability, f is the fatigue state parameter, m is an order at which T(c, f) fits f, n is an order at which T(c, f) fits c, both n and m are positive integers greater than 0, t is an integer satisfying $-n \le t \le n$, k is an integer satisfying $-m \le k \le m$, c is a real number satisfying $0 \le c \le 1$, and $a_{t,k}$ is a coefficient of $c^t f^k$.

In an embodiment, the method further includes: when it is detected that a corresponding fatigue state parameter obtained when the observation object observes the target image is greater than or equal to a first fatigue threshold, controlling to stop displaying images to be displayed after the target image in the image sequence, and obtaining an image whose first recognition probability is greater than or equal to a first probability threshold in the images to be displayed after the target image; and when it is detected that the fatigue state parameter of the observation object is less than or equal to a second fatigue threshold, controlling to sequentially display the image whose first recognition probability is greater than or equal to the first probability threshold in the images to be displayed after the target image. When the fatigue state parameter of the observation object is greater than or equal to the first fatigue threshold, that is, when it is detected that the observation object is already fatigued, image display is suspended, so that the observation object rests, and images with a relatively high first recognition probability are selected in this period. When the observation object has finished rest, brain-computer combination image recognition is performed on these images again. According to the foregoing process, a miss detection rate of brain-computer combination image recognition can be reduced.

In an embodiment, there are at least two observation objects, and the feedback signal is at least two feedback signals respectively generated when the at least two observation objects observe a same image. The determining a target recognition probability of the target image based on a computer vision signal and the feedback signal of the target image includes: determining the target recognition probability of the target image based on the computer vision signal and the at least two feedback signals of the target image. A plurality of observation objects simultaneously perform brain-computer combination image recognition on an image in the image sequence. This can reduce a random error caused by a subjective reason of an observation object in a case of one observation object, thereby improving accuracy of brain-computer combination image recognition.

In an embodiment, the fatigue state parameter is at least two fatigue state parameters respectively generated when the at least two observation objects observe a same image. A presentation time of the target image is positively correlated with a weighted sum of the at least two fatigue state parameters. Fatigue state parameters of a plurality of observation objects are measured and an image presentation time is determined by using the plurality of fatigue state parameters. In this way, a random error caused by a subjective reason of an observation object in a case of one observation object can be reduced, and determining of the image presentation time is more accurate. Therefore, the accuracy of brain-computer combination image recognition can be improved.

In an embodiment, the determining a target recognition probability of the target image based on a computer vision signal and the feedback signal of the target image includes: determining a first weight based on at least one of the first recognition probability of the target image, the fatigue state parameter corresponding to the target image, and the presentation time of the target image, where the first weight is a weight used when the feedback signal of the target image is used to determine the target recognition probability, the first weight is inversely correlated with the first recognition probability of the target image, the first weight is inversely correlated with the fatigue state parameter of the target image, and the first weight is positively correlated with the presentation time of the target image; and fusing, based on the first weight of the target image, the computer vision signal of the target image and the feedback signal of the target image to obtain the target recognition signal of each image in the image sequence. When recognition accuracy of the computer vision algorithm is higher, a fusion weight used by recognition by using the computer vision algorithm may be increased, and a fusion weight used by brain recognition of the observation object may be reduced, thereby reducing a miss detection rate. When the fatigue state parameter of the observation object is larger, the weight of brain recognition of the observation object may be reduced, and therefore the miss detection rate can be reduced. When an image presentation time is longer, a time for observation by the observation object is longer, and therefore accuracy of brain recognition of the observation object is higher. In this case, the weight of brain recognition of the observation object may be increased, so as to reduce a miss detection rate.

In an embodiment, the computer vision signal is the first recognition probability. Before the determining a target recognition probability of the target image based on a computer vision signal and the feedback signal of the target image, the method further includes: calculating a second recognition probability of the target image based on the feedback signal of the target image, where the second recognition probability is used to indicate a probability that the observation object determines that the target image includes the preset image feature. The determining a target recognition probability of the target image based on a computer vision signal and the feedback signal of the target image includes: calculating the target recognition probability of the target image based on the first recognition probability of the target image and the second recognition probability of the target image.

In an embodiment, the computer vision signal is an image feature that is of the target image and that is determined by using the computer vision algorithm. Before the determining a target recognition probability of the target image based on a computer vision signal and the feedback signal of the target image, the method further includes: determining, based on the feedback signal of the target image, a feedback signal feature of the observation object when the observation object observes the target image; and performing feature fusion on the image feature of the target image and the feedback signal feature of the observation object when the observation object observes the target image, to obtain a mixed feature of the target image. The determining a target recognition probability of the target image based on a computer vision signal and the feedback signal includes: determining the target recognition probability of the target image based on the mixed feature of the target image.

In an embodiment, the method further includes: determining, from the image sequence based on the target recognition probability of each image in the image sequence, S images as images including the preset image feature, where the target recognition probabilities of the S images meet a preset condition, and S is an integer less than or equal to N. The preset condition may be that the target recognition probability is greater than or equal to a threshold, or the preset condition may be that the S images are the first S images sorted in descending order according to the target recognition probabilities when target recognition probabilities of images in the image sequence are sorted in descending order.

In an embodiment, the method further includes: using images whose corresponding target recognition probabilities are between a second probability threshold and a third probability threshold in the image sequence as a new image sequence. Images, in the image sequence, with relatively great uncertainty of whether the target image feature is included are selected, for a plurality of times, as a new image sequence for brain-computer combination image recognition. In this way, a suspicious object in the image sequence can be filtered out, a probability of misjudgment by the image recognition device is reduced, and accuracy of brain-computer combination image recognition can be improved.

In an embodiment, the feedback signal is an electroencephalogram signal.

According to a fifth aspect, an embodiment of this application provides an image recognition device, including a processor and a memory, where the memory is configured to store a program instruction, and the processor is configured to invoke the program instruction to execute the brain-computer combination image recognition method based on image sequence presentation provided in any one of the first aspect and the embodiments of the first aspect.

According to a sixth aspect, an embodiment of this application provides an image presentation time determining device, including a processor and a memory, where the memory is configured to store a program instruction, and the processor is configured to invoke the program instruction to execute the image presentation time determining method provided in any one of the second aspect and the embodiments of the second aspect.

According to a seventh aspect, an embodiment of this application provides an image presentation time adjustment device, including a processor and a memory, where the memory is configured to store a program instruction, and the processor is configured to invoke the program instruction to execute the image presentation time adjustment method provided in any one of the third aspect and the embodiments of the third aspect.

According to an eighth aspect, an embodiment of this application provides an image recognition device, including a processor and a memory, where the memory is configured to store a program instruction, and the processor is configured to invoke the program instruction to execute the image recognition method provided in any one of the fourth aspect and the embodiments of the fourth aspect.

According to a ninth aspect, an embodiment of this application provides an image recognition device, where the device includes a module or a unit that is configured to execute the brain-computer combination image recognition method based on image sequence presentation provided in any one of the first aspect and the embodiments of the first aspect.

According to a tenth aspect, an embodiment of this application provides an image presentation time determining device, where the device includes a module or a unit that is configured to execute the image presentation time determining method provided in any one of the second aspect and the embodiments of the second aspect.

According to an eleventh aspect, an embodiment of this application provides an image presentation time adjustment device, where the device includes a module or a unit that is configured to execute the image presentation time adjustment method provided in any one of the third aspect and the embodiments of the third aspect.

According to a twelfth aspect, an embodiment of this application provides an image recognition device, where the device includes a module or a unit that is configured to execute the image recognition method provided in any one of the fourth aspect and the embodiments of the fourth aspect.

According to a thirteenth aspect, an embodiment of the present invention provides a chip system, where the chip system includes at least one processor, a memory, and an interface circuit. The memory, the interface circuit, and the at least one processor are interconnected by using a line, and the at least one memory stores a program instruction. When the program instruction is executed by the processor, the method described in any one of the first aspect and the embodiments of the first aspect is implemented.

According to a fourteenth aspect, an embodiment of the present invention provides a chip system, where the chip system includes at least one processor, a memory, and an interface circuit. The memory, the interface circuit, and the at least one processor are interconnected by using a line, and the at least one memory stores a program instruction. When the program instruction is executed by the processor, the method described in any one of the second aspect and the embodiments of the second aspect is implemented.

According to a fifteenth aspect, an embodiment of the present invention provides a chip system, where the chip system includes at least one processor, a memory, and an interface circuit. The memory, the interface circuit, and the at least one processor are interconnected by using a line, and the at least one memory stores a program instruction. When the program instruction is executed by the processor, the method described in any one of the third aspect and the embodiments of the third aspect is implemented.

According to a sixteenth aspect, an embodiment of the present invention provides a chip system, where the chip system includes at least one processor, a memory, and an interface circuit. The memory, the interface circuit, and the at least one processor are interconnected by using a line, and the at least one memory stores a program instruction. When the program instruction is executed by the processor, the method described in any one of the fourth aspect and the embodiments of the fourth aspect is implemented.

According to a seventeenth aspect, an embodiment of the present invention provides a computer readable storage medium, where the computer readable storage medium stores a program instruction, and when the program instruction is run by a processor, the method described in any one of the first aspect and the embodiments of the first aspect is implemented.

According to an eighteenth aspect, an embodiment of the present invention provides a computer readable storage medium, where the computer readable storage medium stores a program instruction, and when the program instruction is run by a processor, the method described in any one of the second aspect and the embodiments of the second aspect is implemented.

According to a nineteenth aspect, an embodiment of the present invention provides a computer readable storage medium, where the computer readable storage medium stores a program instruction, and when the program instruction is run by a processor, the method described in any one of the third aspect and the embodiments of the third aspect is implemented.

According to a twentieth aspect, an embodiment of the present invention provides a computer readable storage medium, where the computer readable storage medium stores a program instruction, and when the program instruction is run by a processor, the method described in any one of the fourth aspect and the embodiments of the fourth aspect is implemented.

According to a twenty-first aspect, an embodiment of the present invention provides a computer program product, and when the computer program product is run by a processor, the method described in any one of the first aspect and the embodiments of the first aspect is implemented.

According to a twenty-second aspect, an embodiment of the present invention provides a computer program product, and when the computer program product is run by a processor, the method described in any one of the second aspect and the embodiments of the second aspect is implemented.

According to a twenty-third aspect, an embodiment of the present invention provides a computer program product, and when the computer program product is run by a processor, the method described in any one of the third aspect and the embodiments of the third aspect is implemented.

According to a twenty-fourth aspect, an embodiment of the present invention provides a computer program product, and when the computer program product is run by a processor, the method described in any one of the fourth aspect and the embodiments of the fourth aspect is implemented.

According to a twenty-fifth aspect, an embodiment of this application provides an image recognition system, including: an image recognition device, a display device, and a feedback signal collection device, where the image recognition device is separately connected to the display device and the feedback signal collection device. The image recognition device is configured to execute the brain-computer combination image recognition method based on image sequence presentation provided in any one of the first aspect and the embodiments of the first aspect. The display device is configured to display the image sequence. The feedback signal collection device is configured to: obtain a feedback signal obtained when the observation object observes any image i in the image sequence, and feed back the feedback signal to the image recognition device.

Specifically, the image recognition device may be the image recognition device described in the fifth aspect or the ninth aspect.

According to a twenty-sixth aspect, an embodiment of this application provides an image recognition system, including: an image presentation time determining device, a display device, and a feedback signal collection device, where the image presentation time determining device is separately connected to the display device and the feedback signal collection device. The image presentation time determining device is configured to execute the image presentation time determining method provided in any one of the second aspect and the embodiments of the second aspect. The display device is configured to display the image sequence. The feedback signal collection device is configured to: obtain a feedback signal obtained when the observation object observes any image i in the image sequence, and feed back the feedback signal to the image presentation time determining device.

Specifically, the image presentation time determining device may be the image presentation time determining device described in the sixth aspect or the tenth aspect.

According to a twenty-seventh aspect, an embodiment of this application provides an image recognition system, including: an image presentation time adjustment device, a display device, and a feedback signal collection device, where the image presentation time adjustment device is separately connected to the display device and the feedback signal collection device. The image presentation time adjustment device is configured to execute the image presentation time adjustment method provided in any one of the third aspect and the embodiments of the third aspect. The display device is configured to display the image sequence. The feedback signal collection device is configured to: obtain a feedback signal obtained when the observation object observes any image i in the image sequence, and feed back the feedback signal to the image presentation time adjustment device.

Specifically, the image presentation time adjustment device may be the image presentation time determining device described in the seventh aspect or the eleventh aspect.

According to a twenty-eighth aspect, an embodiment of this application provides an image recognition system, including: an image recognition device, a display device, and a feedback signal collection device, where the image recognition device is separately connected to the display device and the feedback signal collection device. The image recognition device is configured to execute the image recognition method provided in any one of the fourth aspect and the embodiments of the fourth aspect. The display device is configured to display the target image. The feedback signal collection device is configured to: obtain a feedback signal obtained when the observation object observes the target image, and feed back the feedback signal to the image recognition device.

Specifically, the image recognition device may be the image recognition device described in the eighth aspect or the twelfth aspect.

DESCRIPTION OF DRAWINGS

The following describes the accompanying drawings used in the embodiments of this application.

DESCRIPTION OF EMBODIMENTS

Figure 1:
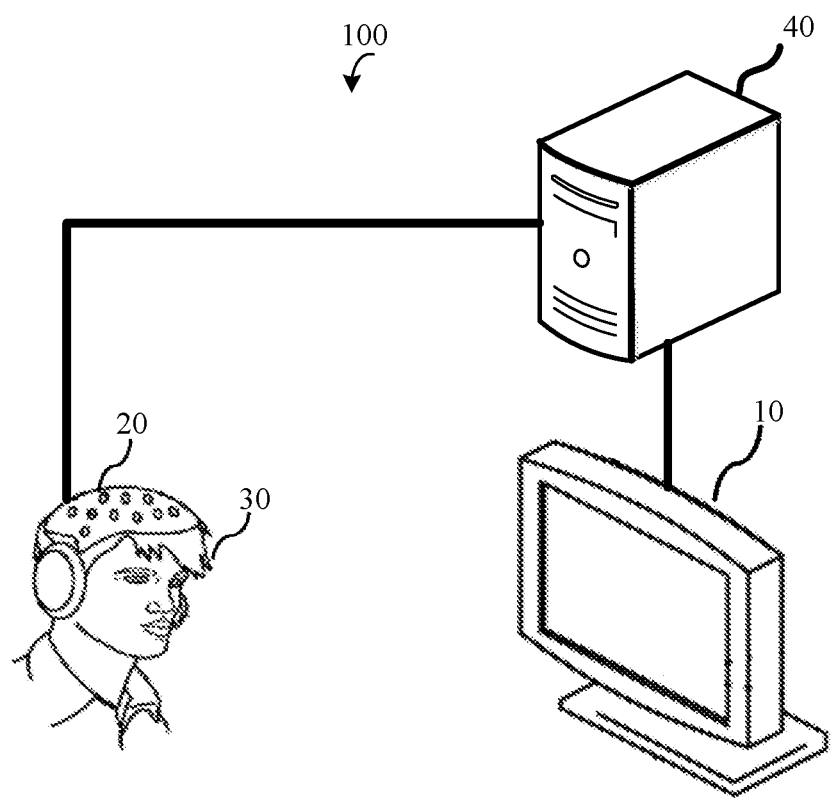
FIG. 1 is a schematic diagram of an architecture of an image recognition system according to an embodiment of this application.

The embodiments of the present invention are described below with reference to the accompanying drawings in the embodiments of the present invention. Terms used in an implementation part of this application are merely used to explain specific embodiments of this application, and are not intended to limit this application.

To help understanding of the embodiments of this application, the following describes some terms used in the embodiments of this application.

(1) Rapid Serial Visual Presentation Paradigm

Rapid serial visual representation is an experimental paradigm based on visual image sequence stimulation. In a process of executing a rapid serial visual representation paradigm task, a sequence of images that are displayed in chronological order at intervals may be presented to an observation object. In a process of displaying the image sequence, each image including a stimulus may be presented at a same location on a display device, a next image appears after a previous image disappears, and presentation times of all the images may be equal. The image sequence presented to the observation object may be used as an external stimulus to a brain of the observation object, so that the observation object generates a feedback signal. Feedback signals generated when the observation object observes the image sequence may be collected by using a device. A specific feedback signal is generated when the observation object observes an image of interest in the image sequence. Therefore, a feedback signal of the observation object may be detected, and whether the feedback signal complies with the specific feedback signal or a signal feature of the specific feedback signal is detected, to obtain, through reverse analysis, an image with a preset image feature included in the image sequence. The observation object may be, for example, a person or an animal. For any image i in the image sequence, a feedback signal may be analyzed to learn whether the image includes the preset image feature. The target image described below may also be any image in the image sequence.

(2) Feedback Signal

A feedback signal is used to indicate a reaction of the observation object to a watched image. When the observation object observes an image sequence based on RSVP, one feedback signal is generated for each image in the image sequence, and the feedback signal may be a biological signal of the observation object collected by using a sensor. The feedback signal in this application may be any one or more of the following: an electroencephalogram signal, an eye movement signal, a skin potential reaction signal, a body movement reaction signal, and the like. This application is described by using an electroencephalogram signal as an example. It may be understood that the feedback signal in this application may be not limited to the foregoing several feedback signals. With progress of technologies, a detected feedback signal of an organism may also be a biological signal that can be detected and that newly appears in the future.

The electroencephalogram signal is a biological electrical signal, and may include a spontaneous electroencephalogram signal and an evoked potential (EP) electroencephalogram signal. The spontaneous electroencephalogram signal is a spontaneous change in electrical potential of nerve cells in the brain without specific external stimulation. The evoked potential electroencephalogram signal is a change of brain potential caused by external stimulation of neurons in the brain, such as sound, light, electricity, or a specific image. The electroencephalogram signal in this application is an inductive electroencephalogram signal. When an observation object observes an image sequence, a group of continuous electroencephalogram signals of the observation object may be continuously collected. Then detection is performed on the group of electroencephalogram signals. When an electroencephalogram signal including a first electroencephalogram signal feature is detected, an image observed by the observation object when the electroencephalogram signal including the first electroencephalogram signal feature is generated may be obtained, so as to implement image recognition.

An electroencephalogram signal can be collected by using a brain-computer interface (BCI). The brain-computer interface creates a channel for the brain of an observation object to communicate with an external device, and is used to collect electroencephalogram signals of the observation object, convert the electroencephalogram signals into data that can be recognized by a computer, and decode a thinking intention of the observation object through data analysis, so that image recognition can be implemented through brain-computer cooperation.

Event related potential (ERP) may be used to represent an electroencephalogram signal. The event related potential indicates voltage fluctuation of an electroencephalogram signal over time, which can be evoked by visual or auditory stimulation. The evoked voltage fluctuation of the electroencephalogram signal can be called "peak", "wave", or "electroencephalogram component". The voltage fluctuation of the electroencephalogram signal is a main object of electroencephalogram signal research. A P300 component is a most commonly used electroencephalogram component for detecting whether a preset image feature is included.

In this application, an image that is recognized from the image sequence and includes the preset image feature may be a specific object in the image sequence. This application does not limit specific content and expression form of the specific object. For example, the specific object may be a "dangerous object" in video detection in a security protection scenario, for example, a "cutting tool or gun". For another example, a "criminal suspect" is recognized from an image sequence that includes an image of the "criminal suspect", and the image of the "criminal suspect" is a specific object. The specific object may not be limited to a specific target, and there may be various types of specific objects, or specific objects of one category or a plurality of categories, which is not limited in this application. For example, a specific object may be a "cutting tool or gun", or may be a target of a "dangerous object" category, or may be targets of a plurality of categories such as "dangerous objects" and "prohibited objects". It may be understood that the foregoing example for a specific object should not constitute a limitation. As long as a small quantity of target stimuli are doped in a large quantity of non-target stimuli, and when the target stimulus appears, a specific feedback signal is triggered, the small quantity of target stimuli can be understood as specific objects in this application.

If the feedback signal is an electroencephalogram signal, when a specific object appears, a particular feedback signal P300 component is triggered. P300 may be interpreted as about 300 ms or a longer time after presentation of a specific object, for example, may be a positive peak that appears within up to 900 ms. When a specific object is presented, the brain of the observation object may generate a P300 component. When a non-specific object is presented, the brain of the observed object does not generate a P300 component. Based on the above principle, ERP can be used to recognize a specific objects in an image sequence.

When it is detected that an electroencephalogram signal meets a specific electroencephalogram signal feature, it may be reversely determined that an image observed by an observation object when the electroencephalogram signal is generated is a specific object. The specific electroencephalogram signal feature is an electroencephalogram feature met by an electroencephalogram signal generated by the observation object when the observation object observes the specific object. Specifically, the specific electroencephalogram signal feature is a positive peak that appears about 300 ms after the specific object is observed. In other words, the specific electroencephalogram signal feature is an electroencephalogram feature of P300. When it is detected that a positive peak appears in the electroencephalogram signal, it may be determined that in the image sequence, an image observed by the observation object about 300 ms before the positive peak appears is an image that includes a preset image feature; alternatively, a probability that an image observed by the observation object about 300 ms before the positive peak appears is an image that includes a preset image feature is determined. An image recognition device may also calculate, based on a feature of an electroencephalogram signal and a computer vision signal obtained by using a computer vision algorithm, a probability that an image includes the preset image feature (which may be referred to as a target recognition probability below). The image recognition device determines, based on the target recognition probability, whether the image for generating the target recognition probability is an image that includes the preset image feature.

The foregoing describes a principle of brain recognition of an observation object by using a feedback signal as an electroencephalogram signal. The feedback signal is not limited to an electroencephalogram signal, and may be extended to one or more of an electroencephalogram signal, an eye movement signal, a skin potential reaction signal, and a body movement reaction signal, and may also be extended to a new biological signal that can be detected in the future.

(3) Computer Vision Algorithm

The computer vision algorithm is a mathematical model used for helping a computer understand an image. A core idea of the computer vision algorithm is to use a data-driven method to learn a statistics feature and pattern from big data. Generally, a large quantity of training samples are required to train the model. Specifically, the computer vision algorithm may be used to model image features including texture, color, shape, spatial relationship, high-level semantics, and the like. An initial model is trained by using a training sample, and parameters in the initial model are adjusted to converge an error of image recognition, so as to construct a new model. After the training is completed, a probability that an image in the image sequence is a specific object may be predicted by using the new model, so as to perform image recognition.

Currently, the computer vision algorithm may include a conventional image detection algorithm and a deep learning algorithm based on an artificial neural network. A process of performing image recognition by using a conventional image recognition algorithm is as follows: First, a feature extraction algorithm is used to extract an image feature. The image feature may be one or more of a color feature, a texture feature, a shape feature, a spatial relationship feature, or a high-level semantic feature of the image. A method for extracting an image feature may be implemented by using one or more of the following algorithms: for example, a local binary pattern (LBP) algorithm, a histogram of oriented gradient (HOG) algorithm, or a Haar feature algorithm. Then, the extracted image feature may be input into a support vector machine (SVM) to calculate a probability that the image includes the preset image feature.

When a conventional image recognition algorithm is used to perform image recognition, another feature extraction algorithm may also be used, for example, a deformable parts model (DPM) algorithm. This is not limited in this application. A process of calculating a probability by using a conventional image recognition algorithm may further include another operation on an image, for example, removing an image background through preprocessing, and segmenting the image. This is not limited in this application.

Another most commonly used computer vision algorithm is the deep learning algorithm based on an artificial neural network. In the deep learning algorithm based on an artificial neural network, an image feature may be extracted by using a plurality of neural network layers, and a probability that the image includes a preset image feature is calculated. The deep learning algorithm based on an artificial neural network may be, for example, a convolutional neural network (CNN). The deep learning algorithm may use the convolutional neural network to extract an image feature and calculate a probability that the image includes a preset image feature. The convolutional neural network used for image recognition may be considered as a classifier, and images are classified by using the convolutional neural network, and may be classified into an image that includes the preset image feature and an image that does not include the preset image feature. The convolutional neural network may be a new model obtained after parameters in an initial model of a specific network architecture are adjusted by using a training sample to converge a recognition error. The parameters in the model may include a convolution core size, a pooling core size, a quantity of fully connected layers, and the like.

An operation of performing image recognition by using the trained convolutional neural network model is: First, an image is processed by using a convolutional layer, so as to extract information that is in the image and that carries an image feature, where a specific form of the information may be a sequence; second, a data amount of the image feature information is reduced by using a pooling layer; and finally, information that carries the image feature and that is output by the pooling layer is input to a fully connected layer, to determine whether the image includes the preset image feature. In other words, whether the image includes the preset image feature is predicted. The last convolutional layer may also be a classifier, for example, a softmax model or an SVM, which predicts, based on input information that carries the image feature, whether the image includes the preset image feature.

It should be noted that the operations of performing image recognition by using the foregoing convolutional neural network may be increased or decreased. The foregoing operations may be combined and stacked for any quantity of times to perform actual image recognition. The foregoing deep learning algorithm based on an artificial neural network may also be an algorithm other than the convolutional neural network, which is not limited in this application.

(4) The Brain of the Observation Object Works with the Computer to Perform Image Recognition.

That the brain of the observation object works with the computer to perform image recognition means to combine a feedback signal obtained after a target image in the image sequence is recognized by the observation object and a recognition result of a computer vision algorithm, so as to perform image recognition. Specifically, a computer vision signal of the target image may be obtained after the target image is processed by using the computer vision algorithm. The computer vision signal may be a probability that the target image includes a preset image feature and that is obtained through calculation by using the computer vision algorithm, or may be an image feature of the target image that is obtained through calculation by using the computer vision algorithm. After the feedback signal of the observation object is obtained, the probability that the target image includes the preset image feature may be determined based on the feedback signal, or a feedback signal feature of the feedback signal may be extracted. The target image herein may be understood as any image i in the image sequence. When the image recognition device performs image recognition by combining a computer vision signal and a feedback signal, two combination methods may be used: a probability weighted sum method and a feature fusion method. Descriptions are separately provided in the following:

a. Using a Probability Weighted Sum to Fuse a Computer Vision Signal and a Feedback Signal:

The image recognition device processes the target image by using the computer vision algorithm, to obtain a probability that the target image includes the preset image feature, namely a first recognition probability p1. Then, the image recognition device obtains a feedback signal generated when the observation object observes the target image, and calculates, based on the feedback signal, a probability p2 that the target image includes the preset image feature, which may be referred to as a second recognition probability. In this way, the image recognition device may obtain a probability that the target image is an image including the preset image feature, that is, a target recognition probability p of the target image:

$$p = w1*p1 + w2*p2 \quad (1\text{-}1)$$

Herein, w1 is a weight of the first recognition probability p1 obtained through recognition by using the computer vision algorithm, and w2 is a weight of the second recognition probability p2 obtained through recognition by the observation object. Values of w1 and w2 may be determined according to experience, or may be learned by one or more observation objects. Generally, in image recognition performed by using the computer vision algorithm and image recognition performed by an observation object, a higher recognition accuracy of the two indicates a larger weight. A sum of w1 and w2 may be normalized to 1.

The image recognition device may determine, based on the target recognition probability p of the target image, whether the target image is an image that includes the preset image feature. For example, a threshold may be set. When the target recognition probability p of the target image is greater than or equal to the threshold, the image recognition device determines that the image is an image including the preset image feature. The image recognition device may also sort an image sequence according to target recognition probabilities, which may be sorting in descending order. The image recognition device selects first N images in the sorted image sequence as images including the preset image feature.

b. Feature Fusion for Brain-Computer Combination Image Recognition:

A feedback signal is generated when the observation object observes a target image, feature fusion is performed on a feedback signal feature extracted from the feedback signal and an image feature extracted after the target image is processed by using a computer vision algorithm, and a target recognition probability is calculated based on a result of the feature fusion.

Specifically, an example in which the feedback signal is an electroencephalogram signal is used for description. A two-dimensional matrix may be obtained through short-time Fourier transform (STFT) of an electroencephalogram signal with a single electrode. A transverse direction of the matrix is a time axis, and a longitudinal direction is a frequency component axis of the electroencephalogram signal. The two-dimensional matrix is used to represent a tensor feature of an electroencephalogram signal generated when an observation object observes a target image, and the tensor feature may be an energy feature or a power spectrum density feature of the electroencephalogram signal. A plurality of two-dimensional matrices may be obtained from an electroencephalogram signal with a plurality of electrodes, and the plurality of two-dimensional matrices are spliced into a three-dimensional tensor in a third dimension. Three dimensions of the three-dimensional tensor are respectively a time, a frequency of the electroencephalogram signal, and a channel (a quantity of channels is the same as a quantity of electrodes for collecting the electroencephalogram signal).

The image recognition device may extract an image feature from the foregoing target image by using a convolutional neural network. The image recognition device obtains, through extraction, a two-dimensional feature map by using one convolutional layer or a plurality of convolutional layers, where the feature map is an image feature corresponding to all pixels in a width direction and a height direction of a two-dimensional target image. The convolutional layer may be a plurality of layers, and the extracted image feature of the target image may also be a three-dimensional tensor feature. The three dimensions are a width of the target image, a height of the target image, and the convolutional layer respectively.

Feature fusion may be that the image recognition device performs tensor splicing on a three-dimensional tensor obtained from the electroencephalogram signal generated when the observation object observes the target image and a three-dimensional image feature of the target image that is obtained by using the convolutional neural network, so as to obtain a fused three-dimensional tensor. The fused three-dimensional tensor not only reflects a feature of the electroencephalogram signal obtained through electroencephalogram recognition on the target image, but also reflects an image feature obtained after image recognition is performed on the target image by using the computer vision algorithm, and may be referred to as an electroencephalogram visual hybrid feature.

After the electroencephalogram visual hybrid feature of the target image is obtained, the electroencephalogram visual hybrid feature of the target image is processed by using a classifier layer in the convolutional neural network, and the classifier layer is configured to output the target recognition probability of the target image based on the electroencephalogram visual hybrid feature of the target image.

The performing image feature extraction and fusion to obtain the electroencephalogram visual hybrid feature and outputting the target recognition probability by using the classifier may be performed in one convolutional neural network. The foregoing convolutional neural network may be obtained through training.

It may be understood that the foregoing two combination methods are only used to describe the embodiments of this application, and should not constitute a limitation. The embodiments of this application do not limit a combination method used for combining a computer vision algorithm and an electroencephalogram signal to perform image recognition.

(5) First Recognition Probability Obtained Through Calculation by a Computer Vision Algorithm A method for determining, by the image recognition device by using the computer vision algorithm, a probability that the target image includes the preset image feature may be classifying by using a classifier. The following describes, by using an example in which a softmax classifier is used, obtaining of the probability that the target image includes the preset image feature.

A classification target of the softmax classifier is to output a probability that the target image in the image sequence is a specific object and a probability that the target image is a non-specific object. An input of the softmax classifier may be an image feature of the target image, and an output is the probability p0 that the target image is a particular object and the probability p0' that the target image is a non-particular object. The two probability values may be respectively output by using two neurons. p0+p0'=1, p0 and p0' are constants whose value ranges are [0, 1]. The probability p0 that the target image is a particular object may be used as the first recognition probability of the target image that is obtained through calculation by using the computer vision algorithm, that is, c=p0.

In addition, the first recognition probability c of the target image that is obtained through calculation by using the computer vision algorithm may be a function of p0, and is used to represent a probability that the target image includes the preset image feature, that is, c=f(p0), where f(p0) is the probability that the target image includes the preset image feature. For example, f(p0) may be a maximum value function max(p0,1−p0), that is, calculating a maximum value between p0 and p0', and in this case, a value range of the first recognition probability c is [0.5, 1]. For another example, f(p0) may also be |p0−0.5|. A function relationship between the first recognition probability and p0 is not limited in this application. The first recognition probability may be used to reflect a reliability degree of a result of image recognition performed by the classifier.

(6) Fatigue State Parameter

A fatigue state parameter of the observation object can be obtained by the image recognition device by analyzing a feedback signal of the observation object, or may be detected by a related sensor by measuring fatigue state information or a fatigue degree of the observation object, or may be obtained through prediction by using a fatigue rule.

For example, when the feedback signal is an electroencephalogram signal, an electroencephalogram collection device may be used as a sensor for measuring fatigue status information. The image recognition device may perform calculation for the electroencephalogram signal by using a fatigue detection algorithm, to obtain the fatigue state parameter of the observation object. Specifically, a principle of the fatigue detection algorithm is: When the observation subject is in a fatigue state, β waves and high-frequency electroencephalogram of the brain decrease and α waves increase. A frequency of the electroencephalogram signal gradually decreases to a slow wave (θ wave) when the observation object changes from the fatigue state to a dozing state or sleep state. In the industry, an electroencephalogram signal power spectrum ratio: (α+θ)/β is used as the fatigue state parameter to describe a fatigue degree of the observation object. The fatigue state parameter may also be obtained through normalization, and may be a value between [0, 1].

In addition to representing the fatigue state parameter of the observation object by using an electroencephalogram signal, the fatigue state parameter can also be detected based on an eye movement of the observation object. In other words, fatigue status information is detected by using a sensor for detecting an eye movement. A specific principle is as follows: A plurality of eye movement indicators may be detected, for example, a blinking frequency, a time proportion of eye closure in a preset time, a gaze direction, and a gaze time; and the eye movement indicators are calculated by using a fatigue state parameter algorithm model to obtain the fatigue state parameter of the observation object.

In addition to the foregoing real-time detection of the fatigue state parameter of the observation object, a fatigue state parameter of the observation object when the observation object observes any image in the image sequence may be predicted according to a fatigue rule. The fatigue rule may be an objectively existing change rule of a fatigue degree of the observation object. The fatigue rule may be used to indicate a change rule of the fatigue degree of the observation object based on a quantity of images observed by the observation object, or the fatigue rule is used to indicate a change rule of the fatigue degree of the observation object based on a duration spent by the observation object for image observation. In the embodiments of this application, the fatigue rule may be in a form of a mapping table, or may be in a form of a fitting formula. For details, refer to a subsequent embodiment.

The fatigue rule may also be obtained through training by using a plurality of samples for one or more observation objects. Each sample in the plurality of samples is a combination of a quantity of observed images and a fatigue state parameter, or each sample in the plurality of samples is a combination of a duration spent for image observation and a fatigue state parameter.

In the embodiments of this application, a method for representing a fatigue state parameter is not limited to the foregoing method, and the fatigue state parameter may be detected and represented in another manner. This is not limited in this application.

FIG. 1 is a schematic diagram of an architecture of an image recognition system according to an embodiment of this application. As shown in FIG. 1, the image recognition system 100 includes a display device 10, a feedback signal collection device 20, an observation object 30, and an image recognition device 40. The image recognition device 40 is connected to the feedback signal collection device 20, and is configured to obtain a feedback signal of the observation object 30 collected by the feedback signal collection device 20. The image recognition device 40 is connected to the display device 10, and is configured to transmit an image sequence to the display device 10 for displaying for the observation object 30 to watch.

The display device 10 is configured to: receive the image sequence sent by the image recognition device 40, and sequentially display the image sequence in a specified presentation time sequence.

The feedback signal collection device 20 is configured to collect a feedback signal of the observation object 30, where the feedback signal may be generated when the observation object 40 watches the image sequence displayed on the display device 10. The feedback signal collection device 20 may send the generated feedback signal to the image recognition device 40. The feedback signal collection device 20 may be, for example, a device including a brain-computer a interface used to collect an electroencephalogram signal, and may be specifically, for example, a head mounted electroencephalogram hat.

The observation object 30 may be a person, and specifically may be a specific group of people, for example, a criminal investigator. The observation object 30 observes the image sequence displayed by the display device 10, and generates a feedback signal to be collected by the feedback signal collecting apparatus 20.

The image recognition device 40 is configured to calculate, by using a computer vision algorithm pre-stored in the image recognition device 40, a probability that each image in the image sequence includes a preset image feature. The image recognition device 40 is further configured to receive the feedback signal collected by the feedback signal collection device 20, where a feedback signal of the observation object collected when the observation object observes a target image may be used to recognize the target image, so as to learn whether the target image includes the preset image feature or obtain a probability that the target image includes the preset image feature.

The brain has disadvantages of low efficiency and fatigability, but the brain has abundant cognition and knowledge without training, and can also recognize higher order semantic features. The computer vision algorithm has disadvantages of a large error and difficult to extract higher order semantic features, but the computer vision algorithm has an advantage of high efficiency. Therefore, the image recognition device 40 may be further configured to combine a recognition result of the computer vision algorithm and a recognition result of the brain of the observation object 30, to perform image recognition. In other words, the image recognition device 40 is further configured to fuse the feedback signal and a computer vision signal that is obtained through calculation by using the computer vision algorithm, to obtain a target recognition probability of each image in the image sequence through calculation. The recognition result of the computer vision algorithm and the recognition result of the brain of the observation object 30 are combined, so that advantages of both brain recognition and computer algorithm recognition can be combined, and a miss detection rate of image recognition can be increased. In addition, the image recognition device 40 may be further configured to obtain the image sequence. The image sequence may be extracted from a video stream. The video stream may be collected by a camera device such as a camera (not shown in FIG. 1).

It should be noted that the image recognition system 100 shown in FIG. 1 is merely intended to more clearly describe the technical solutions in this application, but is not intended to limit this application. A person of ordinary skill in the art may know that as a system architecture evolves and a new service scenario emerges, the technical solutions provided in this application are also applicable to a similar technical problem.

In the image recognition system 100 shown in FIG. 1, the display device 10 and the image recognition device 40 may be integrated in a same device, or may be separate devices. When the display device 10 and the image recognition device 40 are integrated in a same device, for example, the display device 10 and the image recognition device 40 may be respectively a display and a host of a computer, or the display device 10 and the image recognition device 40 may be respectively a display screen and a mainboard of a notebook computer. The display device 10 and the feedback signal collection device 20 may be integrated in a same device, or may be separate devices. The display device 10 and the feedback signal collection device 20 may be integrated in a same device, which may be, for example, a virtual reality (VR) device. The VR device includes a module configured to collect the feedback signal of the observation object 30 and a display module configured to display the image sequence.

Figure 2:
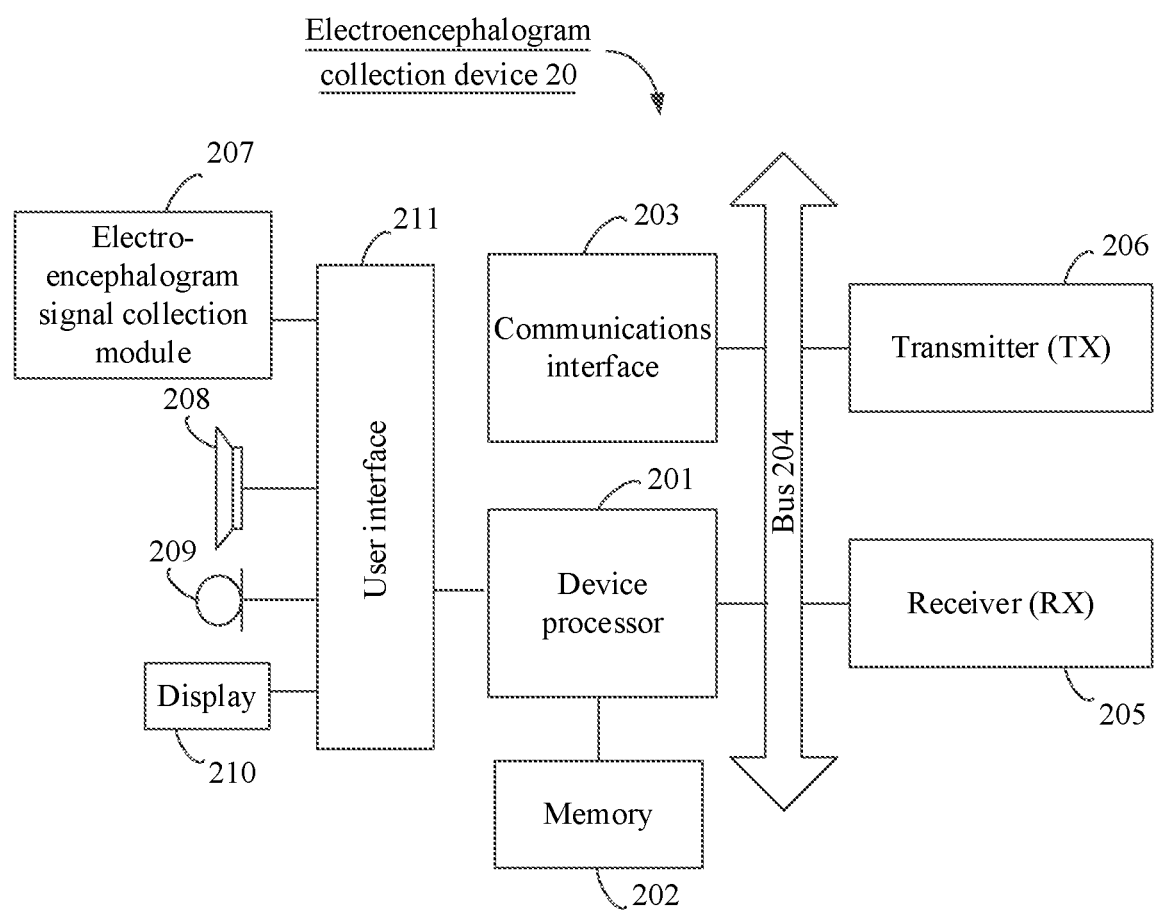
FIG. 2 is a schematic structural diagram of an electroencephalogram collection device according to an embodiment of this application.

FIG. 2 is a schematic structural diagram of a feedback signal collection device 20 according to an embodiment of this application. As shown in FIG. 2, the feedback signal collection device 20 includes one or more device processors 201, a memory 202, a communications interface 203, a receiver 205, a transmitter 206, and an input/output module (including a feedback signal collecting module 207, an audio input/output module 208, a key input module 209, a display 210, and the like). It should be noted that the display 210 may be a constituent part of the feedback signal collection device 20, or may not be a constituent part of the feedback signal collection device 20. For better description, an example in which the display 210 is a constituent part of the feedback signal collection device 20 is used in this embodiment of this application. The feedback signal collecting module 207 may be a sensor, and is configured to collect a feedback signal of an observation object. These components may be connected by using a bus 204 or in another manner. In FIG. 2, an example in which the components are connected by using the bus is used.

The communications interface 203 may be used by the feedback signal collection device 20 to communicate with another communications device, such as an image recognition device. Specifically, the image recognition device may be the image recognition device 40 shown in FIG. 1. Specifically, the communications interface 203 may be a wired communications interface 203, for example, a local access network (LAN) interface. The communications interface 203 is not limited to a wired communications interface. The feedback signal collection device 20 may further be configured with a long term evolution (LTE) (4G) communications interface, or may be configured with a 5G interface or a communications interface of a future new air interface.

The transmitter 206 may be configured to perform transmission processing, for example, signal modulation, on a signal output by the device processor 201. The receiver 205 may be configured to perform receiving processing, for example, signal demodulation, on a received signal. In some embodiments of this application, the transmitter 206 and the receiver 205 may be considered as a wireless modem. In the feedback signal collection device 20, there may be one or more transmitters 206 and receivers 205.

In addition to the transmitter 206 and the receiver 205 shown in FIG. 2, the feedback signal collection device 20 may further include other communications components, for example, a GPS module, a Bluetooth module, and a Wi-Fi module. In addition to the foregoing described wireless communication signal, the feedback signal collection device 20 may further support other wireless communication signals, for example, a satellite signal and a short wave signal. In addition to wireless communication, the feedback signal collection device 20 may further be configured with a wired network interface (for example, a LAN interface) to support wired communication.

The input/output module may be configured to implement interaction between the feedback signal collection device 20 and a user/external environment, and may mainly include the feedback signal collecting module 207, the audio input/output module 208, the key input module 209, and the display 210. The feedback signal collecting module 207 is configured to collect a feedback signal of the observation object 30, and the display 210 may be used as the display device 10 in the image recognition system described in FIG. 1. Specifically, the input/output module may further include a touchscreen, a sensor, and the like. All the input/output modules communicate with the device processor 201 through a user interface 211.

The memory 202 is coupled to the device processor 201, and is configured to store various software programs and/or a plurality of sets of instructions. Specifically, the memory 202 may include a high-speed random access memory, and may include a non-volatile memory, for example, one or more disk storage devices, flash memory devices, or other non-volatile solid-state storage devices. The memory 202 may store an operating system (briefly referred to as a system in the following), for example, an embedded operating system such as ANDROID, IOS, WINDOWS, or LINUX. The memory 202 may further store a network communication program. The network communication program may be used to communicate with one or more additional devices and one or more image recognition devices 40. The memory 202 may further store a user interface program. The user interface program may vividly display content of an application program by using a graphical operation interface, and receive control operations of a user for the application program by using input controls such as menus, dialog boxes, and keys.

In some embodiments of this application, the memory 202 may be configured to store an implementation program, on a side of the feedback signal collection device 20, of an image recognition method based on image sequence presentation provided in one or more embodiments of this application. Alternatively, the memory 202 may be configured to store an implementation program, on a side of the feedback signal collection device 20, of an image presentation time determining method provided in one or more embodiments of this application. Alternatively, the memory 202 may be configured to store an implementation program, on a side of the feedback signal collection device 20, of an image presentation time adjustment method provided in one or more embodiments of this application. Alternatively, the memory 202 may be configured to store an implementation program, on a side of the feedback signal collection device 20, of an image recognition method provided in one or more embodiments of this application. For implementation of the image recognition method provided in one or more embodiments of this application, refer to subsequent embodiments.

The device processor 201 may be configured to read and execute a computer readable instruction. Specifically, the device processor 201 may be configured to invoke the program stored in the memory 202, and execute an instruction included in the program. The program may be, for example, the implementation program, on the side of the feedback signal collection device 20, of the image recognition method based on image sequence presentation provided in one or more embodiments of this application; or the implementation program, on the side of the feedback signal collection device 20, of the image presentation time determining method provided in one or more embodiments of this application; or the implementation program, on the side of the feedback signal collection device 20, of the image presentation time adjustment method provided in one or more embodiments of this application; or the implementation program, on the side of the feedback signal collection device 20, of the image recognition method provided in one or more embodiments of this application.

It may be understood that the feedback signal collection device 20 may be the feedback signal collection device 20 in the image recognition system 100 shown in FIG. 1, and may be implemented as a non-mobile device, a mobile device, a wearable device, a VR device, or the like.

It should be noted that the feedback signal collection device 20 shown in FIG. 2 is merely an implementation of this embodiment of this application. In an actual application, the feedback signal collection device 20 may further include more or fewer components. This is not limited herein.

Figure 3:
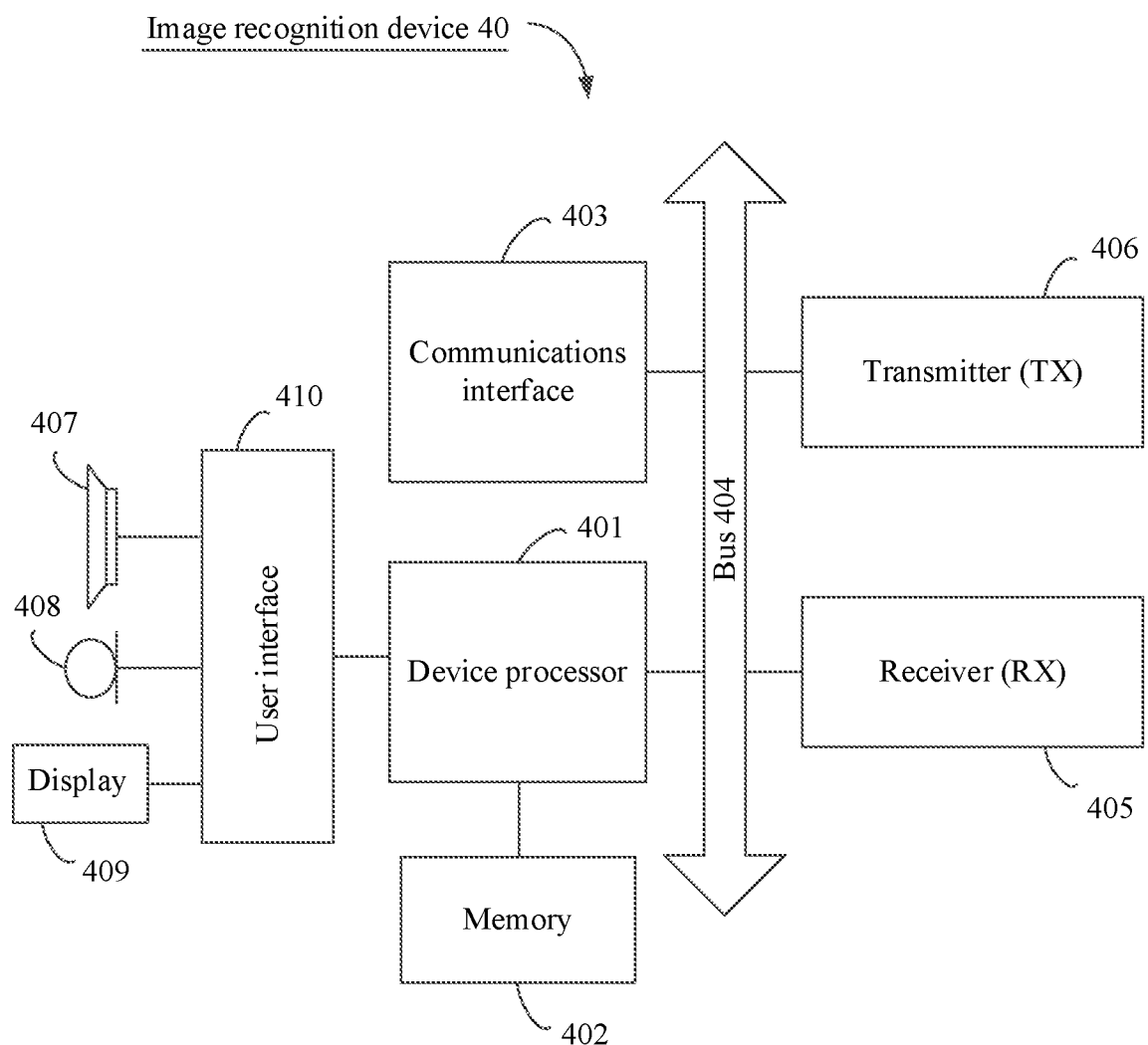
FIG. 3 is a schematic structural diagram of an image recognition device according to an embodiment of this application.

FIG. 3 is a schematic structural diagram of an image recognition device 40 according to an embodiment of this application. As shown in FIG. 3, the image recognition device 40 includes one or more device processors 401, a memory 402, a communications interface 403, a receiver 405, a transmitter 406, and an input/output module (including an audio input/output module 407, a key input module 408, a display 409, and the like). It should be noted that the display 409 may be a constituent part of the image recognition device 40, or may not be a constituent part of the image recognition device 40. For better description, an example in which the display 409 is a constituent part of the image recognition device 40 is used in this embodiment of this application. These components may be connected by using a bus 404 or in another manner. In FIG. 3, an example in which the components are connected by using the bus is used.

The communications interface 403 may be used by the image recognition device 40 to communicate with another communications device, such as a display device. Specifically, the display device may be the display device 10 shown in FIG. 1. Specifically, the communications interface 403 may be a wired communications interface 403, for example, a local access network (LAN) interface. The communications interface 403 is not limited to a wired communications interface. The device 40 may further be configured with a long term evolution (LTE) (4G) communications interface, or may be configured with a 5th generation (5G) interface or a communications interface of a future new air interface.

The transmitter 406 may be configured to perform transmission processing, for example, signal modulation, on a signal output by the device processor 401. The receiver 405 may be configured to perform receiving processing, for example, signal demodulation, on a received signal. In some embodiments of this application, the transmitter 406 and the receiver 405 may be considered as a wireless modem. In the image recognition device 40, there may be one or more transmitters 406 and receivers 405.

In addition to the transmitter 406 and the receiver 405 shown in FIG. 3, the image recognition device 40 may further include other communications components, for example, a GPS module, a Bluetooth module, and a wireless fidelity (Wi-Fi) module. In addition to the foregoing described wireless communication signal, the image recognition device 40 may further support other wireless communication signals, for example, a satellite signal and a short wave signal. In addition to wireless communication, the image recognition device 40 may further be configured with a wired network interface (for example, a LAN interface) to support wired communication.

The input/output module may be configured to implement interaction between the image recognition device 40 and a user/external environment, and may mainly include the video input/output module 407, the key input module 408, the display 409, and the like. The display 409 may be used as the display device 10 in the image recognition system described in FIG. 1. Specifically, the input/output module may further include a camera, a touchscreen, a sensor, and the like. All the input/output modules communicate with the device processor 401 through a user interface 410.

The memory 402 is coupled to the device processor 401, and is configured to store various software programs and/or a plurality of sets of instructions. Specifically, the memory 402 may include a high-speed random access memory, and may include a non-volatile memory, for example, one or more disk storage devices, flash memory devices, or other non-volatile solid-state storage devices. The memory 402 may store an operating system (briefly referred to as a system in the following), for example, an embedded operating system such as ANDROID, IOS, WINDOWS, or LINUX. The memory 402 may further store a network communication program. The network communication program may be used to communicate with one or more additional devices, one or more display devices, and one or more electroencephalogram collection devices 20. The memory 402 may further store a user interface program. The user interface program may vividly display content of an application program by using a graphical operation interface, and receive control operations of a user for the application program by using input controls such as menus, dialog boxes, and keys.

In some embodiments of this application, the memory 402 may be configured to store an implementation program, on a side of the image recognition device 40, of an image recognition method based on image sequence presentation provided in one or more embodiments of this application. Alternatively, the memory 402 may be configured to store an implementation program, on a side of the image recognition device 40, of an image presentation time determining method provided in one or more embodiments of this application. Alternatively, the memory 402 may be configured to store an implementation program, on a side of the image recognition device 40, of an image presentation time adjustment method provided in one or more embodiments of this application. Alternatively, the memory 202 may be configured to store an implementation program, on a side of the image recognition device 40, of an image recognition method provided in one or more embodiments of this application. For implementation of the image recognition method provided in one or more embodiments of this application, refer to subsequent embodiments.

The device processor 401 may be configured to read and execute a computer readable instruction. Specifically, the device processor 401 may be configured to invoke the program stored in the memory 402, and execute an instruction included in the program. The program may be, for example, the implementation program, on the side of the image recognition device 40, of the image recognition method based on image sequence presentation provided in one or more embodiments of this application; or the implementation program, on the side of the image recognition device 40, of the image presentation time determining method provided in one or more embodiments of this application; or the implementation program, on the side of the image recognition device 40, of the image presentation time adjustment method provided in one or more embodiments of this application; or the implementation program, on the side of the image recognition device 40, of the image recognition method provided in one or more embodiments of this application.

It may be understood that the image recognition device 40 may be the image recognition device 40 in the image recognition system 100 shown in FIG. 1, and may be implemented as a non-mobile device or a mobile device.

It should be noted that the image recognition device 40 shown in FIG. 3 is merely an implementation of this embodiment of this application. In an actual application, the image recognition device 40 may further include more or fewer components, which is not limited herein.

Currently, times for presenting all images in an image sequence based on a rapid serial visual representation paradigm on the display device 10 is generally uniform, and the presentation times may be determined according to experience or an experiment. However, because the brain of an observation object is prone to fatigue and attention resources of the brain of the observation object are limited, a miss detection rate of brain-computer combination image recognition is still high, resulting in low efficiency of brain-computer collaboration image recognition.

Based on the schematic diagram of the architecture of the image recognition system in FIG. 1, an embodiment of this application provides a brain-computer combination image recognition method based on image sequence presentation. In the brain-computer combination image recognition method based on image sequence presentation, the image recognition device determines or adjusts an image presentation time based on at least one of a first recognition probability obtained through calculation by using a computer vision algorithm and a fatigue state parameter corresponding to the image. A smaller first recognition probability indicates a longer presentation time and a longer watching time for the observation object. A larger fatigue state parameter of the observation object indicates a longer presentation time and a longer watching time for the observation object. The brain-computer combination image recognition method based on image sequence presentation makes better use of attention resources of the brain of the observation object in a time dimension to recognize an image, and allocates more attention resources of the observation object in the time dimension to an image with relatively great uncertainty. Therefore, a miss detection rate of image recognition can be reduced, and efficiency of brain-computer combination image recognition is improved.

Main inventive principles in this application may include: The image recognition device calculates a first recognition probability of a target image in an image sequence by using a computer vision algorithm, and obtains a fatigue state parameter corresponding to the target image. The image recognition device determines or adjusts a presentation time of the target image on the display device based on at least one of the first recognition probability corresponding to the target image and the fatigue state parameter corresponding to the target image. A policy of determining or adjusting, by the image recognition device, the presentation time may be: When the first recognition probability is smaller, and the fatigue state parameter of the observation object is larger, a longer presentation time is set or adjusted. In other words, when uncertainty of recognition by using the computer vision algorithm is greater, or the fatigue state parameter of the observation object is larger, a time for presenting the image for the brain to recognize is longer. In this way, a miss detection rate can be reduced. On the contrary, when the first recognition probability is larger, and the fatigue state parameter of the observation object is smaller, and a shorter presentation time is set or adjusted. When uncertainty of recognition by using the computer vision algorithm is relatively small, or the observation object is not fatigued, a relatively long brain recognition time is not required. This can reduce the fatigue caused by brain recognition and reduce the miss detection rate.

For example, when a first recognition probability c of an image A meets $0.7 < c \leq 0.9$, a probability that the image recognition device recognizes, by using the computer vision algorithm, that the image A in the image sequence includes a preset image feature is relatively high. In other words, the computer vision algorithm recognizes the image A with small uncertainty. In this case, it is unnecessary to set a long time for the brain of the observation object to recognize the image A, and the image recognition device may correspondingly set a presentation time of the image A to 0.1 s. When a first recognition probability c of an image B in the image sequence meets $0.5<c\leq0.7$, that is, a probability that the image recognition device recognizes, by using the computer vision algorithm, that the image B includes the preset image feature is smaller than the previous image, the image recognition device may set a longer presentation time for the image B, for example, 0.2 s. When a first recognition probability c of an image C in the image sequence meets $0.3<c\leq0.5$, a probability of recognizing, by using the computer vision algorithm, that the image C includes the preset image feature is relatively small. In other words, the computer vision algorithm recognizes the image with great uncertainty, and the image recognition device may set a relatively long time for the brain of the observation object for recognizing, so as to reduce a miss detection rate. For example, a presentation time of the image C may be set to 0.4 s. In the foregoing method, more attention resources of the observation object in the time dimension may be allocated to an image with relatively great uncertainty. In this way, a miss detection rate of image recognition can be reduced, and efficiency of brain-computer collaboration image recognition is improved.

For another example, when a fatigue state parameter f of the observation object when the observation object observes the image A is fm, and is relatively small, it indicates that the observation object has relatively active brain thinking. In this case, the observation object can recognize, within a relatively short observation time, whether the image includes the preset image feature. Therefore, the image recognition device may set the presentation time of the image A to 0.1 s. When a fatigue state parameter f of the observation object when the observation object observes the image B is fm', and is relatively large, it indicates that the observation object has relatively slow brain thinking. In this case, the observation object requires a relatively long observation time to recognize whether the image includes the preset image feature. Therefore, the image recognition device may set the presentation time of the image B to 0.3 s. Determining an image presentation time based on the fatigue state parameter of the observation object can reduce miss detection caused by brain fatigue of the observation object, thereby reducing the miss detection rate.

Based on the foregoing main invention principles, the following describes several embodiments provided in this application.

Figure 4:
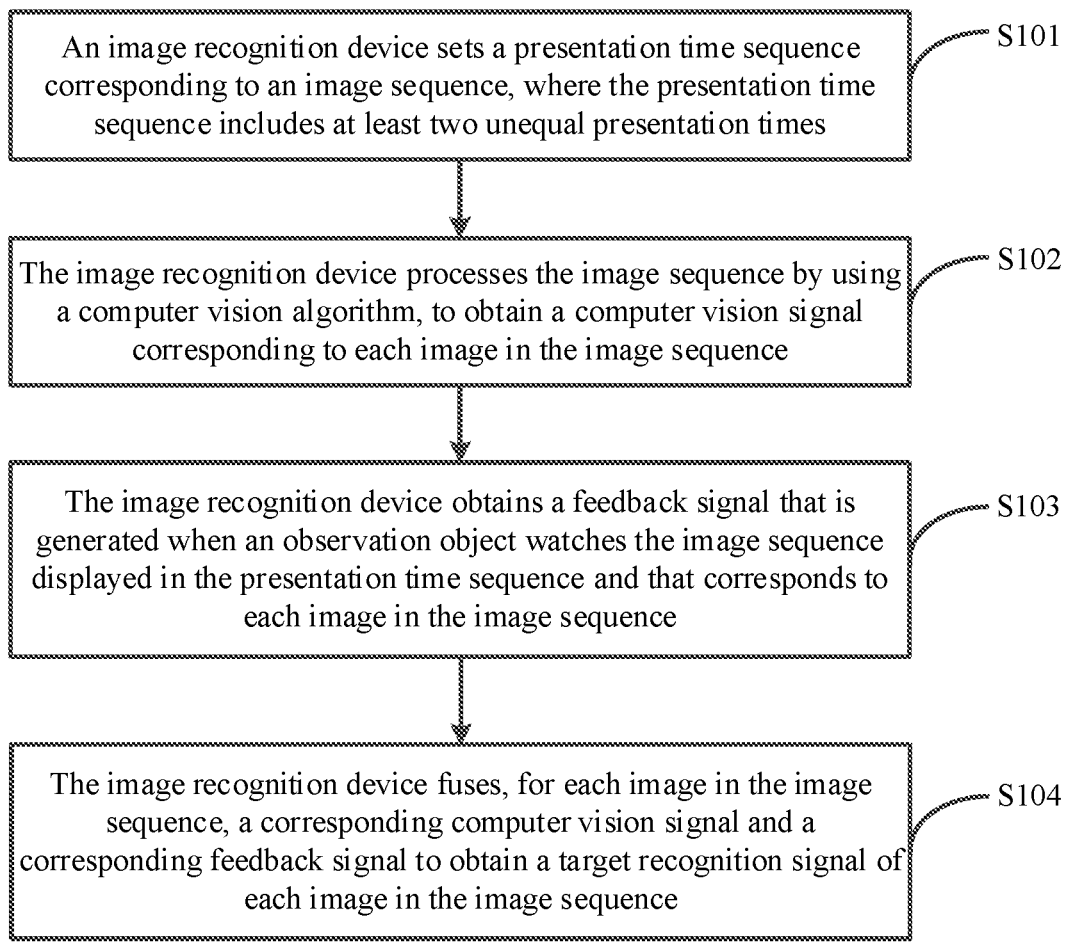
FIG. 4 is a schematic flowchart of a brain-computer combination image recognition method based on image sequence presentation according to an embodiment of this application.

FIG. 4 is a schematic flowchart of a brain-computer combination image recognition method based on image sequence presentation according to an embodiment of this application. In this method, an image recognition device sets a presentation time of an image based on a duration impact parameter. As shown in FIG. 4, the brain-computer combination image recognition method based on image sequence presentation includes but is not limited to the following operations S101 to S104.

S101. The image recognition device sets a presentation time sequence corresponding to an image sequence, where the presentation time sequence includes at least two unequal presentation times.

The foregoing image sequence may be an image sequence based on RSVP, and may include N images, where N is a positive integer.

S102. The image recognition device processes the image sequence by using a computer vision algorithm, to obtain a computer vision signal corresponding to each image in the image sequence.

S103. The image recognition device obtains a feedback signal that is generated when an observation object watches the image sequence displayed in the presentation time sequence and that corresponds to each image in the image sequence.

S104. The image recognition device fuses, for each image in the image sequence, a corresponding computer vision signal and a corresponding feedback signal to obtain a target recognition signal of each image in the image sequence.

Operation S102 may be performed before step S101, or may be performed after operation S103.

A presentation time of an image is used to indicate a time period from a presentation start moment of the image to a presentation start moment of a next adjacent image. The presentation time of the image may be a time period during which the image is displayed on a display device, or may include the time period during which the image is displayed on the display device and a time period from a moment when the display device stops displaying the image to a moment when the display device starts to display a next adjacent image. The time period from a moment when the display device stops displaying the image to a moment when the display device starts to display a next adjacent image may be used for the observation object to rest.

Figure 5:
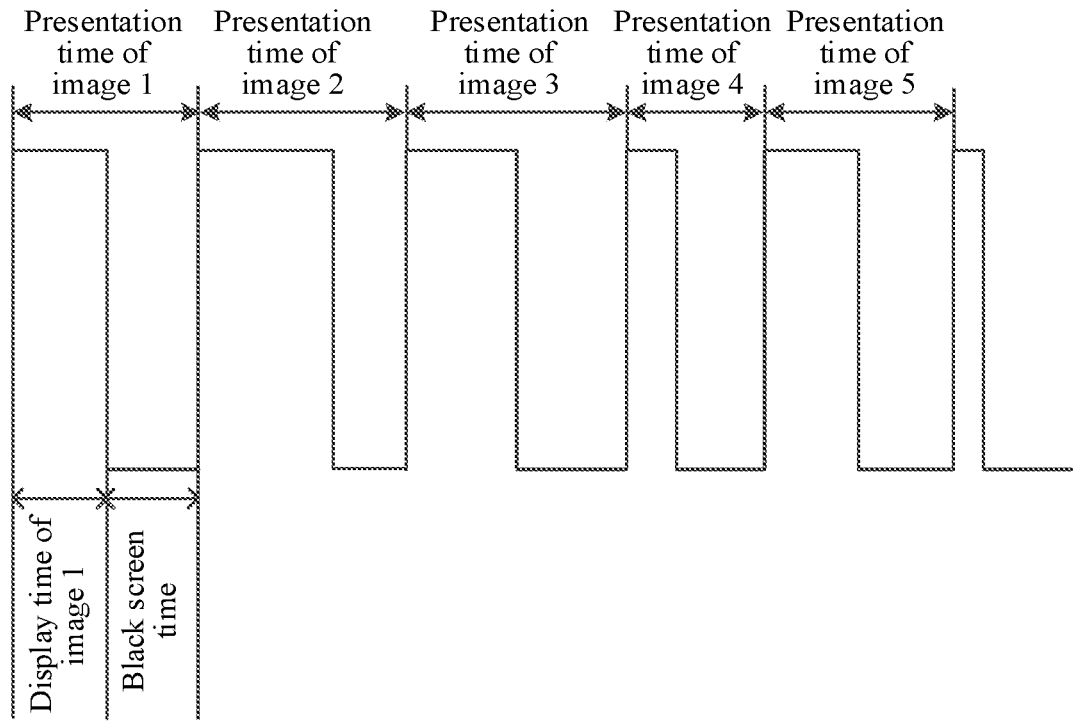
FIG. 5 is a schematic diagram of an image presentation time according to an embodiment of this application.

Specifically, FIG. 5 is a schematic diagram of an image presentation time according to an embodiment of this application. As shown in FIG. 5, a presentation time of an image may include a sum of a time for displaying the image on the display device and a black screen time after the image is displayed. The black screen time may be used by the observation object to take a rest after observing the image. As shown in FIG. 5, the image sequence may include an image 1, an image 2, an image 3, an image 4, and an image 5. In the image sequence, a time for displaying the image 1 on the display screen is 200 ms, and a black screen time of the display device after the image 1 is displayed is 100 ms. Therefore, a presentation time of the image 1 may be 300 ms. A black screen time corresponding to an image may also be set to 0.

It may be understood that, a presentation time of an image in this embodiment of this application is not limited to the foregoing definition. For example, a presentation time may also be a time when the image is displayed on the display device. Specifically, in the embodiment described in FIG. 5, the presentation time of the image 1 may also be defined as 200 ms.

In this embodiment of this application, presentation times of all images in the image sequence are no longer completely the same, and the specified presentation time sequence corresponding to the image sequence may include at least two unequal presentation times. A difference between any two presentation times of the at least two unequal presentation times is $k\times\Delta$, where k is a positive integer, and $\Delta$ is a preset time period value. The at least two unequal presentation times are set to improve accuracy of recognizing each image in the image sequence by the observation object. The time period value $\Delta$ may be a value between 10 ms to 100 ms. In an embodiment, the time period value $\Delta$ may be a value between 50 ms to 100 ms.

For example, the image sequence includes 100 images, $\Delta$ may be 50 ms, and presentation times of the images in the image sequence are in ascending order according to an arithmetic sequence. To be specific, a presentation time of the $i^{th}$ image is $[100+(i-1)*50]$ ms, and i is an integer that meets $1\leq i\leq100$. In the image sequence, different images correspond to different presentation times. This example is merely used to explain this embodiment of this application without constituting any limitation.

In an embodiment, the at least two unequal presentation times in the presentation time sequence and the presentation time difference k×Δ may be determined based on a duration impact parameter of each image in the image sequence. The setting a presentation time sequence corresponding to an image sequence may include: determining a presentation time corresponding to each image in the image sequence based on the duration impact parameter, so as to obtain the presentation time sequence corresponding to the image sequence. The duration impact parameter includes at least one of a first recognition probability and a fatigue state parameter.

The first recognition probability is a probability, obtained by the image recognition device through calculation by using a computer vision algorithm, that an image includes a preset image feature. A feedback signal generated when the observation object observes that an image includes the preset image feature conforms to a specific feedback signal feature. The specific feedback signal feature may be, for example, a feature met by a P300 electroencephalogram signal.

The computer vision signal obtained through calculation by using the computer vision algorithm is the first recognition probability or an image feature of an image. The target recognition signal may be a probability that an image includes the preset image feature, and is used to determine whether the image includes the preset image feature, so as to perform target image recognition.

In this embodiment of this application, a presentation time T(c) is inversely correlated with a first recognition probability c. A larger first recognition probability of any image i in the image sequence indicates a shorter presentation time that the image recognition device sets for the image i. A larger fatigue state parameter corresponding to the image i indicates a longer presentation time that the image recognition device sets for the image i. When the probability, determined by using the computer vision algorithm, that the image i includes the preset image feature is relatively small, uncertainty of recognition performed by the image recognition system on the image is relatively great, and a relatively long electroencephalogram recognition time for the image i may be set. In this way, more attention resources of the observation object in the time dimension are allocated to the image with relatively great uncertainty, and the miss detection rate of the image recognition system can be reduced. On the contrary, a larger fatigue state parameter corresponding to the image i indicates a longer presentation time of the image i, that is, when the fatigue state parameter of the observation object is larger, a time for presenting the image i for the brain to recognize is longer, thereby reducing a miss detection rate. The presentation time of each image in the image sequence is set according to a principle that the presentation time is inversely correlated with the first recognition probability and is positively correlated with the fatigue state parameter, attention resources of the observation object can be allocated to a "weak part" of the image recognition system in the time dimension, and a program time is properly set based on a fatigue degree of the observation object, so that recognition efficiency of the image recognition system can be improved and the miss detection rate can be reduced compared with setting a uniform presentation time.

The brain-computer combination image recognition based on image sequence presentation is specifically described in three parts: 1. This part describes how to determine, based on the duration impact parameter, the presentation time sequence corresponding to the image sequence when the duration impact parameter includes different parameters. 2. This part describes setting a presentation time of each image in the image sequence in real time or in advance. 3. This part describes multi-observation object recognition, multi-round recognition, and a brain-computer fusion weight. Descriptions are separately provided in the following:

1. How to determine, based on the duration impact parameter, the presentation time sequence corresponding to the image sequence?

The duration impact parameter includes at least one of a first recognition probability and a fatigue state parameter, and there are three cases: (1) The duration impact parameter includes the first recognition probability; (2) The duration influence parameter includes the fatigue state parameter; and (3) The duration impact parameter includes the first recognition probability and the fatigue state parameter. The following specifically describes how to determine, based on the duration impact parameter, the presentation time sequence corresponding to the image sequence in the foregoing three cases.

(1) The duration impact parameter includes the first recognition probability c.

A correspondence between the first recognition probability c and the presentation time T may be determined by using a fitting formula, or may be determined by using a mapping table. Descriptions are separately provided in the following:

a. Determining the Correspondence Between the First Recognition Probability c and the Presentation Time T in a Formula Fitting Manner In an embodiment, the duration impact parameter may include the first recognition probability c. T(c) may be obtained after n-order linear fitting, nonlinear fitting, or the like is performed on c. For example, n-order linear fitting is used to obtain:

$$T(c) = \sum_{t=0}^{n} a_j c^t \qquad (1\text{-}2)$$

where T(c) is the presentation time, c is the first recognition probability, c is a real number satisfying $0 \le c \le 1$, n is an order at which T(c) fits c, n is an integer greater than 0, t is an integer satisfying $-n \le t \le n$, and $a_t$ is a coefficient of $c^t$.

In an embodiment, T(c) may be obtained through fitting based on a probability threshold and a presentation time threshold, and the following gives a specific description:

First, the probability threshold is explained as follows: A minimum probability threshold c1 and a maximum probability threshold c2 may exist for the first recognition probability c. When the first recognition probability c obtained through calculation by using the computer vision algorithm is less than or equal to c1, the brain of the observation object does not need to perform electroencephalogram recognition, and it may be directly determined, by using the computer vision algorithm, that an image in the image sequence does not include the preset image feature. When the first recognition probability c is greater than or equal to c2, brain recognition of the observation object is not required either, and it may be directly determined, by using the computer vision algorithm, that an image in the image sequence includes the preset image feature. If the image i meets either of the foregoing two cases, the image i does not need to be placed in the image sequence for the observation object to watch to perform brain image recognition, that is, whether the image i includes the preset image feature may be directly recognized by using the computer vision algorithm. The image i may be any image in the image sequence.

Second, the presentation time threshold is explained as follows: A minimum presentation time threshold T1 and a maximum presentation time threshold T2 may exist for a presentation time T of an image in the image sequence. T1 and T2 may be set based on a physiological feature of image recognition performed when the observation object watches the image sequence. To be specific, it needs to be ensured that the observation object can recognize, within the presentation time T1, whether the image includes the preset image feature; in addition, the presentation time cannot be too long, to avoid wasting brain attention resources in the time dimension, and therefore the maximum presentation time threshold T2 may be set.

In an embodiment, T(c) may be obtained after fitting is performed on c by using c1, c2, T1, and T2. In an embodiment, T(c) may be obtained after fitting is performed on c by using (c1, T2) and (c2, T1). When a first recognition probability of an image is the minimum probability threshold c1, the image recognition device sets a presentation time of the image to the maximum presentation time threshold T2. When a first recognition probability of an image is the maximum probability threshold c2, the image recognition device sets a presentation time of the image to the minimum presentation time threshold T1. The fitting may be n-order linear fitting, or may be nonlinear fitting, for example, least square fitting.

Specifically, for example, n-order linear fitting may be used to obtain:

$$T(c) = T_1 + (c - c1)^n \cdot \frac{T1 - T2}{(c2 - c1)^n} \quad (1\text{-}3)$$

In an embodiment, when a first recognition probability of an image is the minimum probability threshold c1, a presentation time of the image may not be set to the maximum presentation time threshold T2, but is set to, for example, be slightly less than T2. Likewise, when a first recognition probability of an image is the maximum probability threshold c2, a presentation time of the image may not be set to the minimum presentation time threshold T1, but is set to, for example, be slightly greater than T2. In an embodiment, T(c) may also be obtained after linear fitting or nonlinear fitting is performed on c by using another parameter. This is not limited in this application. A fitting relationship between T(c) and c may also be obtained by adding a coefficient, or adding a constant, or the like on the basis of the formula (1-3).

In an embodiment, the probability threshold c1 may also be a minimum value of probabilities that the preset image feature is included in a round of image sequence prediction performed by using the computer vision algorithm, and the probability threshold c2 may also be a maximum value of probabilities that the preset image feature is included in a round of image sequence prediction performed by using the computer vision algorithm.

In the foregoing formula (1-2) and formula (1-3), in a value range of the first recognition probability c, T(c) is a monotonically decreasing function, that is, a larger first recognition probability of an image indicates a shorter presentation time of the image on the display device.

In an embodiment, after the presentation time of each image in the image sequence is determined based on the fitting relationship between c and T, the presentation time of the corresponding image may be further adjusted based on a fatigue state parameter of the observation object.

In other words, the fatigue state parameter is used as an independent variable for adjusting the presentation time of the image i. In addition, the fatigue state parameter is positively correlated with the image presentation time. In other words, when the fatigue state parameter is larger, the presentation time of the image i may be adjusted to be longer. An adjusted presentation time T'(c, f) may be determined based on a fitting relationship between the presentation time of the image and f. A relationship between T'(c, f), and f and c may be obtained through n-order linear fitting, or may be obtained through non-linear fitting. This is not limited in this embodiment of this application. A value of n may be a positive integer greater than 0. The image i may be any image in the image sequence.

Because the observation object is not fatigued until the image sequence is displayed for a period of time. In other words, impact of the fatigue state parameter f on the presentation time T of the image i usually lags behind impact of the first recognition probability c on T. When a relationship between the presentation time T of the image and the first recognition probability c is determined, the first recognition probability c may be first used as an independent variable to perform fitting on T, and then impact of the fatigue state parameter f is imposed on the fitting result. A method for imposing the impact of the fatigue state parameter f may be adding an increment T1(f) to T(c) determined in the formula (1-2) or (1-3), so as to obtain a presentation time T'(c, f) considering the impact of the fatigue state parameter. For the fitting manner, the first recognition probability c is used as an independent variable to perform fitting on T to obtain the formula (1-2) or the formula (1-3), and $$T'(c, f) = T(c) + T1(f) = T1(f) + \sum_{t=0}^{n} a_t c^t \quad (1\text{-}4)$$

where T'(c, f) is a presentation time of an image that considers c and f, and T1(f) is the impact of the fatigue state parameter f on the presentation time of the image. T1(f) may be a positive value, 0, or a negative value. T1(f) may also be a constant. Alternatively, T1(f) may be T1(f)=T(c)*y % where y is a positive value, 0, or a negative value, and y may be a constant.

Certainly, if the fatigue state parameter is not considered, T(c) may be determined by using a mapping table, and an increment T1(f) is added to implement impact of the fatigue state parameter on the presentation time. For determining a correspondence between the presentation time T(c) and the first recognition probability c by using a mapping table, refer to the following specific description. Details are not described herein again. In addition to being obtained by using the fitting formula, T1(f) may also be determined by using a mapping table.

For the increment T1(f) generated for the presentation time due to the fatigue state parameter f, the following is described:

① The increment T1(f) of the presentation time may be obtained through fitting based on a fatigue threshold:

First, the fatigue threshold is explained as follows: When it is detected that the fatigue state parameter f of the observation object is greater than or equal to a first fatigue threshold f2, the image recognition device may determine that the observation object is excessively fatigued and needs to rest. The first fatigue threshold f2 may be considered as a maximum fatigue state parameter of the observation object that can be tolerated by the image recognition system. When it is detected that the fatigue state parameter of the observation object is greater than or equal to the first fatigue threshold f2, the image recognition device may suspend displaying the image sequence to be observed by the observation object. When it is detected that the fatigue state parameter f of the observation object is less than or equal to a second fatigue threshold f1, the image recognition device may determine that the observation object can re-perform electroencephalogram image recognition, and may re-enable the image sequence for image recognition by using an electroencephalogram signal. f2 may be greater than or equal to f1. When the fatigue state parameter is between the first fatigue threshold f2 and the second fatigue threshold f1, a larger fatigue state parameter indicates a longer image presentation time. This reduces a case in which detection of an image is missed due to fatigue of the observation object, and may reduce an increase in a miss detection rate caused by the fatigue state parameter.

Specifically, for example, T1(f) may be related to T(c), and T1(f) may be obtained through one-order linear fitting:

$$T1(f) = T(c) * \frac{f - f1}{f2 - f1} \quad (1\text{-}5)$$

In an embodiment, T1(f) may be obtained through non-linear fitting, and a coefficient in a fitting formula is determined based on the first fatigue threshold f2 and the second fatigue threshold f1. For example, fitting is performed by using a least square method. This is not limited in this embodiment of this application.

T'(c, f) may be obtained by using the formula (1-4) and the formula (1-5):

$$T'(c, f) = T(c) + T1(f) = T(c) * \left(1 + \frac{f - f1}{f2 - f1}\right) \quad (1\text{-}6)$$

② The increment T1(f) of the presentation time may also be related to the first recognition probability:

When the first recognition probability is relatively large, it indicates that a probability that the computer vision algorithm recognizes an image as a specific object is relatively large. Therefore, there is no need to add a long image presentation time for electroencephalogram recognition. When the first recognition probability is relatively small, it indicates that a probability that the computer vision algorithm recognizes an image as a specific object is relatively small. Therefore, a relatively long image presentation time needs to be added for the observation object to recognize the image as the specific object. Based on the foregoing principle, the increment T1(f) of the presentation time may be set to be inversely correlated with the first recognition probability c.

In an embodiment, a coefficient affected by the first recognition probability c or an increment affected by the first recognition probability c may be added on the basis of the formula (1-6), to increase coefficient examples:

$$T1(f) = T(c) * \frac{f - f1}{f2 - f1} * x(c) \quad (1\text{-}7)$$

where x(c) is an impact coefficient of the first recognition probability c on the increment T1(f) of the presentation time. A larger first recognition probability c indicates a smaller x(c) and a smaller first recognition probability c indicates a larger x(c).

A relationship between c and x(c) may be a linear fitting relationship, or may be another fitting relationship. This is not limited in this application. x(c) may be determined based on c by querying a table. Referring to Table 1, when T1(f) is a positive value in the formula (1-5), Table 1 is an example of a correspondence between the first recognition probability c and the impact coefficient x(c).

TABLE 1

Example of a correspondence between a first recognition probability c and an impact coefficient x(c) (T1(f) is a positive value)

| c | (0.1, 0.3] | (0.3, 0.5] | (0.5, 0.7] | (0.7, 0.9] |
|---|---|---|---|---|
| x(c) | 1.5 | 1.2 | 0.9 | 0.6 |

As shown in Table 1, if T1(f) is a positive value, when first recognition probabilities c are within intervals (0.1, 0.3], (0.3, 0.5], (0.5, 0.7], and (0.7, 0.9], values of x(c) are respectively 1.5, 1.2, 0.9, and 0.6. A larger first recognition probability c indicates a smaller x(c), and a smaller first recognition probability c indicates a larger x(c).

It may be understood that this example is merely used to explain this embodiment of this application without constituting any limitation.

③ A working process of the image recognition system when the observation object is fatigued When it is detected that the fatigue state parameter of the observation object is greater than or equal to the first fatigue threshold, the image recognition device may determine that the fatigue state parameter of the observation object significantly affects electroencephalogram image recognition. Therefore, the image recognition device may control to suspend a display process of the image sequence. The first fatigue threshold may be used as a threshold for the image recognition device to determine whether the fatigue state parameter of the observation object is suitable for continuing electroencephalogram image recognition.

When it is detected that the fatigue state parameter of the observation object is greater than or equal to the first fatigue threshold f2, the image recognition device may further control to suspend displaying of the image sequence, and obtain images whose first recognition probabilities are greater than or equal to a first probability threshold in the image sequence. When it is detected that the fatigue state parameter of the observation object is less than or equal to the second fatigue threshold, the images whose first recognition probabilities are greater than or equal to the first probability threshold in the image sequence are displayed in sequence in terms of time based on a presentation time of one image in the image sequence. The first probability threshold may be flexibly adjusted based on a performance requirement of the image recognition system in an actual application, for example, the first probability threshold is determined based on a sensitivity requirement of the system.

In other words, when the fatigue state parameter of the observation object reaches a specific threshold, the image recognition device may suspend the electroencephalogram image recognition by the observation object, so that the observation object can take a rest. In a process in which the observation object is resting, the image recognition device may select, by using the first recognition probability of each image in the image sequence that is obtained through calculation by using the computer vision algorithm, images whose first recognition probabilities are greater than the first probability threshold. The selected images are used as a new image sequence for brain-computer combination image recognition. When the fatigue state parameter of the observation object is less than or equal to the second fatigue threshold, it indicates that the observation object has finished rest, and may continue to participate in electroencephalogram image recognition. In this case, the image recognition device may control display of the selected image sequence, so that the image recognition device performs brain-computer combination image recognition. The first fatigue threshold is greater than or equal to the second fatigue threshold. Values of the first fatigue threshold and the second fatigue threshold may be determined based on a physiological feature of the observation object. When the observation object is fatigued, displaying of the image sequence is suspended through control, so that the observation object rests, and an image with a relatively high first recognition probability is selected during this period. When the observation object has finished rest, brain-computer combination image recognition is performed on these images. The foregoing process can improve recognition efficiency of the image recognition system.

In addition, when the image recognition system performs brain-computer combination image recognition, if it is detected that the fatigue state parameter of the observation object is between the first fatigue threshold and the second fatigue threshold, that is, the fatigue state parameter f of the observation object falls within [f2, f1], the image recognition device may further increase, based on the fatigue state parameter f of the observation object, a presentation time of an image displayed after the current moment in the image sequence. If the image recognition device has determined, according to operation S401 in the method described in FIG. 4, that the presentation time of the image A is Tn, when it is detected that the fatigue state parameter of the observation object is between the first fatigue threshold and the second fatigue threshold, the presentation time of the image A displayed after the current moment in the image sequence may be set to Tn+Tk. Alternatively, the presentation time of the image A may be set to Tn×(1+p %), or the presentation time of the image A may be set to Tn×b. Tk indicates a duration increment, p indicates a duration increment percentage, and b indicates a duration increment multiple. Tk, p, and b may be constants or variables.

Actually, when the fatigue state parameter of the observation object is between the first fatigue threshold and the second fatigue threshold, the observation object has already started to be fatigued, but still does not reach a fatigue threshold for controlling to stop image sequence display for electroencephalogram recognition. In this case, a presentation time of an image displayed after the current moment in the image sequence is further increased. A longer presentation time results in smaller impact on accuracy of recognition by using an electroencephalogram signal of the observation object. This can reduce a case of miss detection caused by fatigue of the observation object, so that a miss detection rate can be reduced.

④ The fatigue state parameter may be obtained through real-time measurement for the observation object by using a sensor, or may be predicted by using a fatigue rule.

The fatigue rule may be embodied in a manner of a mapping table, or may be embodied in a manner of a fitting formula. The fatigue rule may be used to indicate a change rule of the fatigue state parameter of the observation object based on a quantity of images observed by the observation object, or the fatigue rule is used to indicate a change rule of the fatigue state parameter of the observation object based on a duration spent by the observation object for image observation. Descriptions are separately provided in the following:

The fatigue rule may include a second mapping table. When the fatigue rule is used to indicate a change rule of the fatigue state parameter of the observation object based on a quantity of images observed by the observation object, refer to Table 2. Table 2 is an example of the second mapping table provided in this embodiment of this application.

TABLE 2

| Example of a second mapping table | | | | |
|---|---|---|---|---|
| S | 1 | 2 | 3 | ... |
| f | 1.0 | 1.03 | 1.1 | ... |

As shown in Table 2, the second mapping table includes a plurality of quantities S of observed images and fatigue state parameters f corresponding to the plurality of quantities S of observed images. When the quantities of images observed by the observation object are 1, 2, 3, and so on, corresponding fatigue state parameters may be 1, 1.03, 1.1, and so on. Predicting, according to the fatigue rule, a fatigue state parameter corresponding to each image in the image sequence includes: finding, from the second mapping table according to a quantity of images displayed before each image in the image sequence, the fatigue state parameter corresponding to each image in the image sequence. In the image sequence, a quantity of images displayed before a specific image is a quantity of observed images corresponding to the specific image.

The second mapping table may also include a plurality of ranges of quantities of observed images and fatigue state parameters f corresponding to the plurality of ranges of quantities of observed images. To search for a fatigue state parameter corresponding to a specific image in the image sequence, a range of quantities of observed images to which a quantity of images that have been displayed before the image belongs may be first searched for, and then a fatigue state parameter corresponding to the range of quantities of observed images is found from the second mapping table.

In an embodiment, the fatigue rule may include a second mapping table. When the fatigue rule is used to indicate a change rule of the fatigue state parameter of the observation object based on a duration spent by the observation object for image observation, refer to Table 3. Table 3 is an example of another second mapping table provided in this embodiment of this application.

TABLE 3

| Example of another second mapping table | | | | |
|---|---|---|---|---|
| t/s | 10 | 10.5 | 11 | ... |
| f | 1.0 | 1.05 | 1.2 | ... |

As shown in Table 3, the second mapping table includes a plurality of durations t spent for image observation and fatigue state parameters f corresponding to the plurality of durations t spent for image observation. When the durations t spent by the observation object for image observation are 10 s, 10.5 s, 11 s, and so on, corresponding fatigue state parameters may be 1, 1.05, 1.2, and so on. The predicting, according to the fatigue rule, a fatigue state parameter corresponding to each image in the image sequence includes: predicting, according to a quantity S of images displayed before each image in the image sequence, a duration spent by the observation object for image observation when each image in the image sequence is being observed, where a duration spent by the observation object for image observation when an image is being observed is $t=S \times ts$, ts is a predicted average presentation time of each image in the image sequence; and finding, from the second mapping table, the fatigue state parameter corresponding to each image in the image sequence according to the duration spent by the observation object for image observation when each image in the image sequence is being observed.

The second mapping table may also include a plurality of ranges of durations spent for image observation and fatigue state parameters f corresponding to the plurality of ranges of durations spent for image observation. To search for a fatigue state parameter corresponding to a specific image in the image sequence, a range of durations spent for image observation to which a duration of images that have been displayed before the image belongs may be first searched for, and then a fatigue state parameter corresponding to the range of durations spent for image observation is found from the second mapping table.

It may be understood that this example of the second mapping table is merely used to explain this embodiment of this application without constituting any limitation.

The fatigue rule may also be a fitting relationship between a fatigue state parameter and a quantity of observed images, or a fitting relationship between a fatigue state parameter and a time spent for image observation. The fitting relationship may be linear, or may be non-linear. The fitting relationship may be an objective law related to the observation object, for example, a fatigue rule of watching an image by a person, a fatigue rule of watching an image by a gorilla, or the like.

The fitting relationship may also be obtained by training one or more observation objects by using a plurality of samples. Each sample in the plurality of samples may be a combination of a quantity of observed images and a fatigue state parameter, and a mapping relationship that is obtained through training and that reflects a fatigue rule is a fitting relationship between a fatigue state parameter and a quantity of observed images. Each sample in the plurality of samples may also be a combination of a duration spent for image observation and a fatigue state parameter, and a mapping relationship that is obtained through training and that reflects a fatigue rule is a fitting relationship between a fatigue state parameter and a duration spent for image observation. Specifically, for example, a fatigue rule for a group of people may be trained, and the group of people may be, for example, criminal investigators. A model reflecting the fatigue rule for this kind of people can be obtained through training by using a large amount of sample data, and the model is used to predict a change rule of a fatigue state parameter of this kind of people.

b. Determining the Correspondence Between the First Recognition Probability c and the Presentation Time by Using a Mapping Table In an implementation, the image recognition device sets a presentation time T(c) of an image in the image sequence according to a first recognition probability c of the image, or may determine the presentation time of the image by using a mapping table. Specifically, the image recognition device may find, from the first mapping table according to a first recognition probability c of an image in the image sequence, a presentation time T corresponding to the first recognition probability c of the image. The first mapping table may be prestored in the image recognition device. The first mapping table includes a plurality of probabilities and presentation times respectively corresponding to the plurality of probabilities. Then, the image recognition device sets a presentation time of an image to a presentation time corresponding to a first recognition probability.

The probability in the first mapping table may be a probability value, or may be a probability interval. When the probability in the mapping table is a probability interval, a presentation time corresponding to a first recognition probability is a presentation time corresponding to a probability interval to which the first recognition probability belongs. For example, Table 4 is an example of a first mapping table provided in this embodiment of this application.

TABLE 4

| Example of a first mapping table | | | | |
|---|---|---|---|---|
| c | (0.1, 0.3] | (0.3, 0.5] | (0.5, 0.7] | (0.7, 0.9] |
| T(c)/s | 0.4 | 0.3 | 0.2 | 0.1 |

As shown in Table 4, when first recognition probabilities fall within intervals (0.1, 0.3], (0.3, 0.5], (0.5, 0.7], and (0.7, 0.9]), values of presentation times of images are respectively 0.4 s, 0.3 s, 0.2 s, and 0.1 s. When the first recognition probability is smaller, a longer image presentation time is set.

When the probability in the mapping table is a probability value, for example, Table 5 is an example of another first mapping table provided in this embodiment of this application.

TABLE 5

| Example of another first mapping table | | | | | | | | | |
|---|---|---|---|---|---|---|---|---|---|
| c | 0.1 | 0.2 | 0.3 | 0.4 | 0.5 | 0.6 | 0.7 | 0.8 | 0.9 |
| T(c)/s | 0.4 | 0.36 | 0.33 | 0.3 | 0.25 | 0.2 | 0.16 | 0.13 | 0.1 |

As shown in Table 5, when first recognition probabilities are respectively 0.1, 0.2, 0.3, 0.4, 0.5, 0.6, 0.7, 0.8, and 0.9, values of presentation times of images are respectively 0.4 s, 0.36 s, 0.33 s, 0.3 s, 0.25 s, 0.2 s, 0.16 s, 0.13 s, and 0.1 s. When a first recognition probability is smaller, a longer image presentation time is set, that is, a time for presenting, on the display device, the image for electroencephalogram recognition by the observation object is longer.

It may be understood that this example of the first mapping table is merely used to explain this embodiment of this application without constituting any limitation.

(2) The duration impact parameter includes the fatigue state parameter f.

In general, a presentation time of an image may be inversely correlated with a fatigue state parameter of the observation object. In other words, a larger fatigue state parameter indicates a longer presentation time of the image.

A relationship between the presentation time T of the image and the fatigue state parameter f of the observation object may be determined by using a mapping table. A specific mapping table may be similar to the first mapping tables shown in Table 4 and Table 5, and details are not described herein again.

T(f) may be obtained after m-order linear fitting, nonlinear fitting, or the like is performed on f. For example, m-order linear fitting is used to obtain:

$$T(f) = \sum_{k=0}^{m} a_k f^k \qquad (1\text{-}8)$$

T(f) is a presentation time, f is a fatigue state parameter, m is an order at which T(f) fits f, m is a positive integer greater than 0, k is an integer satisfying $-m \leq k \leq m$, and $a_k$ is a coefficient of $f^k$.

In an embodiment, T(c) may be obtained through fitting based on a fatigue threshold and a presentation time threshold. A fitting relationship between the presentation time T of the image and the fatigue state parameter f of the observation object may also be linear fitting, nonlinear fitting, or the like, which is not limited in this application.

A minimum fatigue threshold f1 and a maximum fatigue threshold f2 are explained as follows: When a fatigue state parameter corresponding to a target image is greater than or equal to f2, it indicates that the observation object is already very fatigued and needs to rest, and the image recognition device controls to stop displaying the image sequence to perform brain image recognition. When a fatigue state parameter corresponding to an image in the image sequence is less than or equal to f1, it indicates that the observation object has finished rest, and brain image recognition may continue to be performed, and the image sequence may start to display.

Specifically, the presentation time T1(f) of the image may be obtained after fitting is performed on c by using (f1, T1) and (f2, T2). When the fatigue state parameter of the observation object is the minimum fatigue threshold f1, the image recognition device sets a presentation time corresponding to the image to the minimum presentation time threshold T1. When the fatigue state parameter of the observation object is the maximum fatigue threshold f2, the image recognition device sets a presentation time corresponding to the image to the maximum presentation time threshold T2. A fitting relationship between T1(f) and f may be n-order linear fitting:

$$T(f) = T_1 + (f - f_1)^n \cdot \frac{T_2 - T_1}{(f_2 - f_1)^n} \qquad (1\text{-}9)$$

It may be understood that this example is merely used to explain this embodiment of this application without constituting any limitation. The fitting between T1(f) and f is not limited to linear fitting, and may also be nonlinear fitting, for example, least square fitting.

In an embodiment, if the relationship that is between T(f) and f and that is obtained through fitting according to the formula (1-8) is not determined by using the fatigue threshold and the presentation time threshold, after the fatigue state parameter f0 corresponding to the target image is input to T(f), and the presentation time T0 corresponding to the target image is obtained, the fatigue threshold and the presentation time threshold may further be used for normalization. Specifically, a maximum presentation time obtained through calculation according to the formula (1-8) may be correspondingly set to the maximum presentation time threshold T2. In other words, if the maximum presentation time is obtained through calculation according to the formula (1-8), the presentation time of a corresponding image is set to T2. A minimum presentation time obtained through calculation according to the formula (1-8) may be correspondingly set to the minimum presentation time threshold T1. In other words, if the minimum presentation time is obtained through calculation according to the formula (1-8), the presentation time of a corresponding image is set to T1. According to the fatigue state parameter f0 of the target image and the presentation time T0 corresponding to the target image, T0 may be normalized linearly and proportionally, to obtain a presentation time T0' of the target image obtained after T0 is normalized according to T1 and T2.

It may be understood that the presentation time, calculated by using the formula (1-2), of the target image may be normalized in the same manner by using the probability threshold and the presentation time threshold. The presentation time, calculated by using the formula (1-10), of the target image may be normalized in the same manner by using the probability threshold, the fatigue threshold, and the presentation time threshold.

When image recognition is performed only by using an electroencephalogram, a presentation time of an image is set based on a fatigue state parameter of the observation object. When the fatigue state parameter of the observation object is larger, a longer presentation time of the image is set by the image recognition device. This can reduce image miss detection caused by fatigue of the observation object, and a miss detection rate can be reduced.

In an embodiment, after the presentation time of each image in the image sequence is determined based on the fitting relationship between f and T, the presentation time of the corresponding image may be further adjusted based on the first recognition probability of each image. When a first recognition probability is larger, a presentation time of the image i may be adjusted to be longer. An adjusted presentation time T'(c, f) may be determined based on a fitting relationship between the presentation time of the image and t. A relationship between T'(c, f), and f and c may be obtained through n-order linear fitting, or may be obtained through non-linear fitting. This is not limited in this embodiment of this application. A value of n may be a positive integer greater than 0. The image i may be any image in the image sequence. A specific fitting process may be adding an increment T1(c) to T(f) determined in the formula (1-8) or (1-9), so as to obtain a presentation time T'(f, c) considering the impact of the fatigue state parameter. Alternatively, T(f) may be determined by using a mapping table, and an increment T1(c) is added. A specific determining process may be similar to a process of determining the increment T1(f) when the duration impact parameter includes the first recognition probability c, and details are not described herein again.

(3) The duration impact parameter includes the first recognition probability c and the fatigue state parameter f.

In this embodiment of this application, a presentation time T of an image in the image sequence may be determined in a manner of a first mapping table based on a first recognition probability c of the image and a fatigue state parameter f of the observation object. Specifically, the first mapping table may include a plurality of probabilities and a plurality of fatigue state parameters. One probability in the plurality of probabilities and one fatigue state parameter in the plurality of fatigue state parameters uniquely determine one presentation time.

The first recognition probability in the first mapping table may be a probability value, or may be a probability interval. The fatigue state parameter in the first mapping table may be a fatigue state parameter value, or may be a fatigue state parameter interval. When the first mapping table includes probability intervals and fatigue state parameter intervals, a presentation time corresponding to a first recognition probability is a presentation time corresponding to a probability interval to which the first recognition probability belongs and a probability interval to which the fatigue state parameter of the observation object belongs. In this embodiment of this application, a case in which the first mapping table includes probability intervals and fatigue state parameter intervals is used as an example for description. It may be understood that, the first mapping table may further include probability intervals and fatigue values, or the first mapping table may include probability values and fatigue intervals, or the first mapping table may include probability values and fatigue values. This is not described in detail. Table 6 is an example of another first mapping table provided in this embodiment of this application.

TABLE 6

Example of another first mapping table

| f | c | | | |
|---|---|---|---|---|
| | (0.1, 0.3] | (0.3, 0.5] | (0.5, 0.7] | (0.7, 0.9] |
| (1.15, 1.25] | 0.4 s | 0.3 s | 0.2 s | 0.1 s |
| (1.25, 1.35] | 0.5 s | 0.4 s | 0.3 s | 0.2 s |
| (1.35, 1.45] | 0.6 s | 0.5 s | 0.4 s | 0.3 s |

As shown in Table 6, when the first recognition probability falls within an interval (0.1, 0.3], (0.3, 0.5], (0.5, 0.7], or (0.7, 0.9], and the fatigue state parameter of the observation object falls within an interval (1.15, 1.25], (1.25, 1.35], or (1.35, 1.45]), a presentation time may be determined by searching the foregoing first mapping table. For example, if the first recognition probability is 0.6, and the fatigue state parameter of the observation object is 1.28, the first recognition probability 0.6 falls within the probability interval (0.5, 0.7], and the fatigue state parameter 1.28 of the observation object falls within the fatigue state parameter interval (1.25, 1.35]. A presentation time corresponding to the probability interval (0.5, 0.7] and the fatigue state parameter interval (1.25, 1.35]) in the first mapping table is 0.3 s. Therefore, the presentation time of the image is set to 0.3 s. It may be learned from the first mapping table that, when a first recognition probability is smaller, a longer image presentation time is set, and when a fatigue state parameter is smaller, a longer image presentation time is set.

$T(c, f)$ may be obtained after n-order fitting is performed on the first recognition probability c and m-order linear fitting is performed on the fatigue state parameter f:

$$T(c, f) = \sum_{t=0}^{n} \sum_{k=0}^{m} a_{t,k} c^t f^k \quad (1\text{-}10)$$

where $T(c, f)$ is the presentation time, c is the first recognition probability, f is the fatigue state parameter, m is an order at which $T(c, f)$ fits f, n is an order at which $T(c, f)$ fits c, both n and m are positive integers greater than 0, t is an integer satisfying $-n \leq t \leq n$, k is an integer satisfying $-m \leq k \leq m$, c is a real number satisfying $0 \leq c \leq 1$, and $a_{t,k}$ is a coefficient of $c^t f^k$.

Fitting between $T(c, f)$ and the first recognition probability c and the fatigue state parameter f may also be non-linear fitting, for example, least square fitting. This is not limited in this application.

In an embodiment, when a magnitude difference between the two independent variables c and f is relatively large, impact of an independent variable with a smaller magnitude in the fitting relationship of the formula (1-10) is weakened by an independent variable with a smaller magnitude. To reduce occurrence of the foregoing case, when fitting is performed, the fatigue state parameter f may be normalized, for example, f is a value between [0, 1].

In an embodiment, $T(c, f)$ may be obtained through fitting based on a probability threshold, a fatigue threshold, and a presentation time threshold. Specifically, $T(c, f)$ may be obtained after linear fitting is performed on c and f by using (c1, T2), (c2, T1), (f1, T1), and (f2, T2). T1 is a minimum presentation time threshold, T2 is a maximum presentation time threshold, c1 is a minimum probability threshold of a recognition probability determined by using the computer vision algorithm, c2 is a maximum probability threshold of a recognition probability determined by using the computer vision algorithm, f1 is a minimum fatigue threshold, and f2 is a maximum fatigue threshold.

For explanations of the probability threshold, the fatigue threshold, and the presentation time threshold, refer to the foregoing description, and details are not described herein again. Fitting between $T(c, f)$, and c and f may also be non-linear fitting, for example, least square fitting. This is not limited in this embodiment of this application.

2. Setting a Presentation Time of Each Image in the Image Sequence in Real Time or in Advance A duration impact parameter of any image i in the image sequence may be obtained in real time before the image i is displayed in a process in which the image recognition device controls to display the image sequence, or may be obtained in advance before the image recognition device controls to start displaying the image sequence. Therefore, the presentation time of the image i may be determined based on the duration impact parameter in real time before the image i is displayed in the process of controlling to display the image sequence, or may be determined based on the duration impact parameter in advance before the image sequence is controlled to be displayed. In addition, before controlling to start displaying the image sequence, the image recognition device may further determine, based on a parameter in the duration impact parameter, the presentation time sequence corresponding to the image sequence, and then in a process of controlling to display the image sequence, adjust, in real time, the presentation time of the image in the image sequence based on the other parameter in the duration impact parameter. Descriptions are separately provided in the following:

(1) Determining a Presentation Time of any Image in the Image Sequence in Real Time Descriptions are separately provided based on a different parameter included in the duration impact parameter.

If the duration impact parameter includes the fatigue state parameter, in a process of controlling to display the image sequence, for example, before any image i in the image sequence is controlled to be displayed, a fatigue state parameter corresponding to the image i may be obtained. A specific obtaining manner may be obtaining by detecting an observation object by using a sensor. For example, an electroencephalogram signal of the observation object before the image i is displayed is detected, and a fatigue state parameter of the observation object before the image i is displayed is determined by analyzing the electroencephalogram signal, and is used as the fatigue state parameter corresponding to the image i. The detected fatigue state parameter before the image i is displayed may be a fatigue state parameter of the observation object detected when one or more images displayed before the image i are displayed, or may be a fatigue state parameter obtained after a plurality of times of measurement and averaging. Then, the presentation time of the image i is set based on the determined fatigue state parameter corresponding to the image i.

In addition, the fatigue state parameter corresponding to the image i may also be obtained through prediction according to a fatigue rule. For predicting the fatigue state parameter corresponding to the image according to the fatigue rule, refer to the foregoing embodiment. Details are not described herein again.

If the duration impact parameter includes the first recognition probability, in a process of controlling to display the image sequence, for example, before the image i is controlled to be displayed, a first recognition probability corresponding to the image i may be determined by using a computer vision algorithm. Then, the presentation time of the image i is set based on the determined first recognition probability corresponding to the image i.

If the duration impact parameter includes the first recognition probability and the fatigue state parameter, in a process of controlling to display the image sequence, for example, before the image i is controlled to be displayed, a fatigue state parameter corresponding to the image i may be obtained, where a specific obtaining manner may be obtaining by detecting an observation object by using a sensor, or may be obtaining through prediction according to a fatigue rule; and before the image i is controlled to be displayed, a first recognition probability corresponding to the image i is determined by using a computer vision algorithm. Then, the presentation time of the image i is set based on the first recognition probability and the fatigue state parameter corresponding to the image i.

(2) Determining the Presentation Time Sequence Corresponding to the Image Sequence in Advance Before Controlling to Start Displaying the Image Sequence Descriptions are separately provided based on a different parameter included in the duration impact parameter.

If the duration impact parameter includes the fatigue state parameter, before the image sequence is controlled to be displayed, a fatigue state parameter corresponding to each image in the image sequence may be obtained. The obtained fatigue state parameter corresponding to each image in the image sequence may be obtained through prediction according to a fatigue rule. For predicting the fatigue state parameter corresponding to each image in the image sequence according to the fatigue rule, refer to the foregoing embodiment, and details are not described herein again. Then, the presentation time corresponding to each image in the image sequence may be determined based on the obtained fatigue state parameter corresponding to each image in the image sequence, so as to obtain the presentation time sequence corresponding to the image sequence.

If the duration impact parameter includes the first recognition probability, before the image sequence is controlled to be displayed, the image sequence may be processed by using a computer vision algorithm, and a first recognition probability corresponding to each image is obtained through calculation by using the computer vision algorithm. Then, the image recognition device may determine the presentation time corresponding to each image in the image sequence based on the first recognition probability, so as to obtain the presentation time sequence corresponding to the image sequence. After the presentation time sequence corresponding to the image sequence is obtained, the image sequence may be sequentially displayed under control according to the presentation time sequence.

If the duration impact parameter includes the first recognition probability and the fatigue state parameter, before the image sequence is controlled to be displayed, the image sequence may be processed by using a computer vision algorithm, and a first recognition probability corresponding to each image is obtained through calculation by using the computer vision algorithm; and a fatigue state parameter corresponding to each image in the image sequence may be predicted according to a fatigue rule. Then, the image recognition device may determine the presentation time corresponding to each image in the image sequence based on the corresponding first recognition probability and fatigue state parameter, so as to obtain the presentation time sequence corresponding to the image sequence. After the presentation time sequence corresponding to the image sequence is obtained, the image sequence may be sequentially displayed under control according to the presentation time sequence. For example, before the image sequence is controlled to be displayed, for any image i in the image sequence, the image recognition device may determine, by using the computer vision algorithm, a first recognition probability corresponding to the image i, and then predict, by using the fatigue rule, a fatigue state parameter corresponding to the image i when the observation object observes the image i. Then, the image recognition device determines a presentation time of the image i based on the first recognition probability and the fatigue state parameter corresponding to the image i. The image recognition device may obtain the presentation time sequence corresponding to the image sequence based on the presentation time of each image in the image sequence.

For a method for determining a presentation time of an image based on one or two parameters of a duration impact parameter corresponding to the image, refer to the foregoing specific description of determining the presentation time sequence. Details are not described herein again.

(3) Determining the Presentation Time Sequence Corresponding to the Image Sequence in Advance Before Controlling to Start Displaying the Image Sequence, and Adjusting a Presentation Time of an Image in a Process of Controlling to Display the Image Sequence Specifically, the duration impact parameter may include the first recognition probability. In this case, before the image sequence is controlled to be displayed, the image recognition device processes the image sequence by using a computer vision algorithm, so as to obtain, through calculation, a first recognition probability corresponding to each image by using the computer vision algorithm. Then, the image recognition device may determine the presentation time corresponding to each image in the image sequence based on the first recognition probability, so as to obtain the presentation time sequence corresponding to the image sequence. After the presentation time sequence corresponding to the image sequence is obtained, the image sequence may be sequentially displayed under control according to the presentation time sequence.

In a process of controlling to display the image sequence, before controlling to display any image i in the image sequence, the image recognition device may obtain a fatigue state parameter corresponding to the image i. The fatigue state parameter corresponding to the image i may be obtained by detecting an observation object by using a sensor, or may be obtained through prediction according to a fatigue rule. A previously determined presentation time of the image i is adjusted based on the fatigue state parameter of the image i, so as to obtain an adjusted presentation time of the image i. When the image i is controlled to be displayed, the image i is displayed according to the adjusted presentation time of the image i. For any image in the image sequence, the foregoing process of adjusting a presentation time of the image by using a fatigue state parameter may be executed. A policy of adjusting a presentation time of an image may be as follows: When a fatigue state parameter is larger, the presentation time of the image is increased by a greater amplitude; and when a fatigue state parameter is smaller, the presentation time of the image is decreased by a greater amplitude. For specific implementation of adjusting a presentation time of an image, refer to the foregoing embodiment. Details are not described herein again.

3. Multi-Observation Object Recognition, Multi-Round Recognition, and a Brain-Computer Fusion Weight (1) Multi-Observation Object Recognition In an embodiment, there are at least two observation objects, the feedback signals are at least two feedback signals respectively generated when the at least two observation objects observe the image sequence, and the target recognition probability is determined based on the computer vision signal and the at least two feedback signals.

Specifically, for each observation object, the image recognition device may fuse the computer vision signal obtained through calculation by using the computer vision algorithm and a feedback signal of the observation object, to obtain a brain-computer combination image recognition result. In other words, at least two brain-computer combination image recognition results are obtained, and the image recognition result is whether the image includes the preset image feature. The image recognition device determines a final image recognition result based on the at least two recognition results, for example, may perform weighted summation on the at least two recognition results to determine the final image recognition result.

For example, the observation objects are A, B, and C, and brain-computer combination image recognition is performed on any image i in the image sequence. In this case, a brain-computer combination image recognition result corresponding to A may be calculated based on the computer vision signal and a feedback signal of A. The brain-computer combination image recognition result corresponding to A is a probability a that the image i includes the preset image feature. The same method may be used to separately calculate a brain-computer combination image recognition result corresponding to B and a brain-computer combination image recognition result corresponding to C. The brain-computer combination image recognition result corresponding to B is a probability b that the image i includes the preset image feature. The brain-computer combination image recognition result corresponding to C is a probability c that the image i includes the preset image feature. Then a final image recognition result is determined in a weighted summation manner based on weights Wa, Wb, and Wc respectively used by the brain-computer combination image recognition results corresponding to A, B, and C, that is, a probability that the image i includes the preset image feature is Wa×a+Wb×b+Wc×c.

Alternatively, the image recognition device may first obtain an overall feedback signal feature through calculation based on the at least two feedback signals by using a specific policy, for example, perform tensor splicing on feedback signal features of the at least two feedback signals to obtain the overall feedback signal feature. Then the image recognition device fuses the overall feedback signal feature and an output result of the computer vision algorithm to obtain the final image recognition result. In this embodiment of this application, the fusion of the feedback signal and the computer vision signal obtained through calculation by using the computer vision algorithm may be probability fusion, or may be feature fusion. For a specific process, refer to the foregoing specific description of brain-computer combination image recognition. Details are not described herein again.

For example, the observation objects are A, B, and C, and brain-computer combination image recognition is performed on any image i in the image sequence. A feedback signal obtained when A observes the image i, a feedback signal obtained when B observes the image i, and a feedback signal obtained when C observes the image i are fused to obtain an overall feedback signal. A fusion process may be signal superposition, or may be feature fusion, for example, may be specifically splicing of tensor features. This is not limited in this application. The overall feedback signal includes brain recognition results of A, B, and C for the image i. Then the overall feedback signal is fused with the computer vision signal to obtain a target recognition signal. For a process in which the feedback signal and the computer vision signal are fused, and the tensor features are spliced to perform feature fusion, refer to the foregoing embodiment. Details are not described herein again.

It may be understood that the foregoing examples for brain-computer combination image recognition with a plurality of observation objects are only used to describe this embodiment of this application, and should not constitute a limitation.

In an implementation, when there are at least two observation objects, the image recognition device may determine impact of fatigue state parameters of the at least two observation objects on a presentation time of any image i in the image sequence. There are at least two fatigue state parameters corresponding to the image i. The image recognition device may determine a weighted sum of the fatigue state parameters of the at least two observation objects, and then determine the presentation time of the image i based on the weighted sum of the fatigue state parameters. The presentation time of the image i may be positively correlated with the weighted sum of the fatigue state parameters. A fatigue state parameter weight of each observation object may be determined by the image recognition device based on a statistical feature of a fatigue state parameter of each observation object.

In addition, when there are at least two observation objects, the image recognition device may first determine an intermediate value of fatigue state parameters of the at least two observation objects corresponding to the image i, and then determine the presentation time of the image i based on the intermediate value of the fatigue state parameters. The presentation time of image i may be positively correlated with the intermediate value of the fatigue state parameters.

It may be understood that this example is merely used to explain this embodiment of this application without constituting any limitation. The image recognition device may determine any statistical value, for example, an average, of the fatigue state parameters of the at least two observation objects, and then determine a presentation time of an image based on the statistical value of the fatigue state parameters.

A plurality of observation objects simultaneously perform brain-computer combination image recognition on an image in the image sequence. This can reduce a random error caused by a subjective reason of an observation object in a case of one observation object, thereby improving accuracy of brain-computer combination image recognition.

(2) Multi-Round Recognition

In an implementation, the image recognition device may select images whose target recognition probabilities are between a second probability threshold and a third probability threshold in the image sequence. The second probability threshold is a threshold used by the image recognition device to determine that an image does not include the preset image feature. When a probability that an image includes the preset image feature is less than or equal to the second probability threshold, the image recognition device determines that the image is not an image that includes the preset image feature. The third probability threshold is a threshold used by the image recognition device to determine that an image includes the preset image feature. When a probability that an image includes the preset image feature is greater than or equal to the third probability threshold, the image recognition device determines that the image is an image that includes the preset image feature. The second probability threshold is greater than or equal to the third probability threshold. The selected images are used as a new image sequence for brain-computer combination image recognition.

Because the new image sequence comes from the initial image sequence before selection, and the presentation time of each image in the initial image sequence may be determined according to operation S401 in the image recognition method described in FIG. 4, a presentation time of each image in the new image sequence on the display device may be the determined presentation time of the image in the initial image sequence, or may be re-determined. This is not limited in this application. Re-determining the presentation time of each image in the new image sequence on the display device may also be adding an increment on the basis of the presentation time of the image in the initial image sequence. If the image recognition device sets, for any image i in the image sequence, a determined presentation time of the image i in the initial image sequence to Ts, in the new image sequence, the image recognition device may set a presentation time of the image i to Ts+Tm, or may set the presentation time of the image i to Ts×(1+s %), or may set the presentation time of the image i to Ts×t. Tm indicates a duration increment, s indicates a duration increment percentage, and t indicates a duration increment multiple. Tm, s, and t may be constants or variables.

For example, the second probability threshold is set to 30%, and the third probability threshold is set to 70%. The image recognition device may determine that the image i includes the preset image feature when detecting that a second probability of the image i is greater than or equal to 70%. The image recognition device may determine that the image i does not include the preset image feature when detecting that the second probability of the image i is less than or equal to 30%. In this case, the image recognition device may select images whose second probabilities are between 30% and 70% in the image sequence, and use the images as a new image sequence for brain-computer combination image recognition. For example, in the original image sequence, the presentation time of the image i determined by the image recognition device according to operation S401 in the image recognition method described in FIG. 4 is 200 ms, and the second probability of the image i that is obtained by the image recognition device through brain-computer combination calculation is 52%, which is between 30% and 70%. In other words, the target recognition probability 52% of the image i falls within a range of [30%, 70%]. In the new image sequence, the image recognition device may still set the presentation time of the image i to 200 ms, or may set the presentation time of the image i to (200+100) ms, or may set the presentation time of the image i to 200×(1+20%) ms, or may set the presentation time of the image i to 200×2 ms. It may be understood that this example is merely used to explain this embodiment of this application without constituting any limitation.

In addition, the second probability threshold and the third probability threshold may be determined based on a sensitivity requirement of the image recognition system. The second probability threshold may alternatively be set to be greater than a probability threshold of an image used to indicate that the image does not include the preset image feature. Similarly, the third probability threshold may alternatively be set to be less than a probability threshold of an image used to indicate that the image includes the preset image feature. For example, the image recognition device determines that a probability threshold of an image indicating that the image does not include the preset image feature is 20%, that is, when a probability that the image includes the preset image feature is less than or equal to 20%, the image recognition device determines that the image is not an image that includes the preset image feature. The image recognition device determines that a probability threshold of an image indicating that the image includes the preset image feature is 80%, that is, when a probability that the image includes the preset image feature is greater than or equal to 80%, the image recognition device determines that the image is an image that includes the preset image feature. In this case, the second probability threshold is set to 30%, and the third probability threshold is set to 70%. In other words, images whose second probabilities are between 30% and 70% in the image sequence are selected as a new image sequence for brain-computer combination image recognition.

If the image recognition device re-detects that a second probability of an image in a new image sequence is still between the second probability threshold and the third probability threshold, the image recognition device may determine that the image is not an image that includes the preset image feature, and the image may be put into a new round of image sequence again, and then iterated to the image recognition system for re-recognition. A quantity of rounds of iterative detection in this embodiment of this application is not limited, and may be determined based on a sensitivity requirement of the image recognition device.

It may be understood that the foregoing example is merely used to explain this embodiment of this application without constituting any limitation.

Images, in the image sequence, with relatively great uncertainty of whether the target image feature is included are selected, for a plurality of times, as a new image sequence for brain-computer combination image recognition. In this way, a suspicious object in the image sequence can be filtered out, a probability of misjudgment by the image recognition device is reduced, and accuracy of brain-computer combination image recognition can be improved.

(3) Brain-Computer Fusion Weight

In an implementation, for each image in the image sequence, when the feedback signal and the computer vision signal are fused, the feedback signal and the computer vision signal may be fused based on weights. A fusion weight (namely, a first weight) used by the feedback signal may be related to at least one of the first recognition probability, the fatigue state parameter of the observation object, and the presentation time. The first weight is inversely correlated with the first recognition probability, the first weight is inversely correlated with the fatigue state parameter, and the first weight is positively correlated with a presentation time of an image.

First, when a first recognition probability of recognition by using the computer vision algorithm is larger, it indicates that a probability that the image includes the preset image feature is higher, that is, a recognition accuracy rate of the computer vision algorithm recognition is higher. Therefore, a fusion weight used by recognition by using the computer vision algorithm may be increased, and a fusion weight used by brain recognition of an observation object may be decreased, so as to reduce a miss detection rate. Second, if a fatigue state parameter of the observation object is larger, it indicates that efficiency of brain recognition of the observation object in a fatigue state is lower and the miss detection rate is higher. Therefore, when the fatigue state parameter of the observation object is larger, the weight of brain recognition of the observation object is smaller. Finally, a longer presentation time of an image indicates a longer time for observing by the observation object. Therefore, when accuracy of brain recognition of the observation object is higher, a miss detection rate is lower, and the weight of recognition by using the feedback signal may be set to be larger. In other words, a longer presentation time of an image indicates a larger fusion weight of the feedback signal.

Based on at least one of the first recognition probability, the fatigue state parameter of the observation object, and the presentation time of the image, the first weight may be determined in a manner of a mapping table, or may be determined in a manner of function fitting. The function fitting may be n-order linear fitting, nonlinear fitting, or the like. This is not limited in this embodiment of this application.

In addition, in this embodiment of this application, the obtained image sequence and the corresponding presentation time sequence are used to control display of the image sequence, and perform brain-computer combination image recognition. It may be understood that the obtained image sequence and the corresponding presentation time sequence are not limited to the foregoing application scenario, and the obtained image sequence and the corresponding presentation time sequence may be output or stored. With evolution of an image-related system and emergence of a new service scenario, the technical solutions provided in this application are also applicable to similar technical problems.

Figure 6:
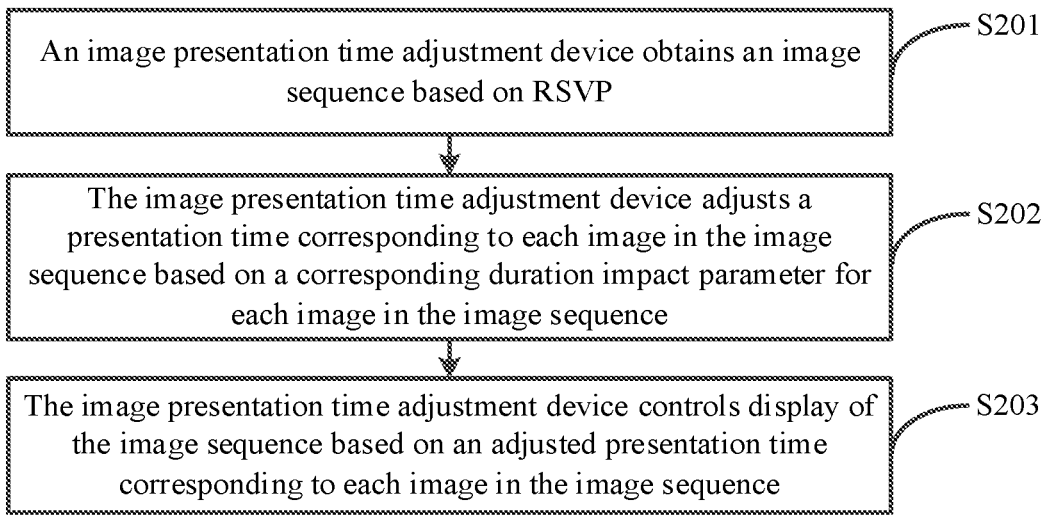
FIG. 6 is a schematic flowchart of an image presentation time adjustment method according to an embodiment of this application.

FIG. 6 is a schematic flowchart of an image presentation time adjustment method according to an embodiment of this application. In this method, an image presentation time adjustment device adjusts a presentation time of an image based on a duration impact parameter. As shown in FIG. 6, the image presentation time adjustment method includes but is not limited to the following operations S201 to S203.

S201. The image presentation time adjustment device obtains an image sequence based on RSVP.

S202. The image presentation time adjustment device adjusts a presentation time corresponding to each image in the image sequence based on a corresponding duration impact parameter for each image in the image sequence.

A first recognition probability is inversely correlated with a presentation time, and a fatigue state parameter is positively correlated with a presentation time.

S203. The image presentation time adjustment device controls display of the image sequence based on an adjusted presentation time corresponding to each image in the image sequence.

In this embodiment of this application, before the presentation time corresponding to each image in the image sequence is adjusted based on a corresponding duration impact parameter for each image in the image sequence, presentation times of all images in the image sequence may be equal or unequal. For descriptions of the fatigue state parameter, the fatigue rule, the first recognition probability, and the feedback signal in this embodiment of this application, refer to the embodiment described in FIG. 4. Details are not described herein again.

In an embodiment, the image sequence that is displayed by the image presentation time adjustment device based on the adjusted presentation time may be used for brain-computer combination image recognition. For a specific description of brain-computer combination image recognition based on an image sequence, refer to the embodiment described in FIG. 4. Details are not described herein again. When brain-computer combination image recognition is performed, the image presentation time adjustment device may adjust a specified presentation time sequence based on a duration impact parameter. Attention resources of the brain of the observation object in a time dimension can be better used to recognize an image, and more attention resources of the observation object in the time dimension are allocated to an image with relatively great uncertainty. Therefore, a miss detection rate of image recognition can be reduced, and efficiency of brain-computer collaboration image recognition is improved.

In an embodiment, the image presentation time adjustment device may adjust the presentation time corresponding to each image in the image sequence based on the corresponding duration impact parameter for each image in the image sequence before controlling to start displaying the image sequence, so as to obtain an adjusted presentation time sequence. Then, the image sequence is controlled to be sequentially displayed based on the adjusted presentation time sequence.

In an embodiment, in a process of controlling to display the image sequence, before controlling to display any image i in the image sequence, the image presentation time adjustment device may obtain, in real time, a duration impact parameter of the image i, and adjust a presentation time of the image i based on the duration impact parameter of the image i. Then, display of the image i is controlled based on the adjusted presentation time of the image i.

In an embodiment, the image presentation time adjustment device may first adjust the presentation time corresponding to each image in the image sequence based on the corresponding duration impact parameter for each image in the image sequence before controlling to start displaying the image sequence, so as to obtain an adjusted presentation time sequence. In a process of controlling to display the image sequence, before controlling to display any image i in the image sequence, the image presentation time adjustment device obtains, in real time, another duration impact parameter of the image i, and adjusts the presentation time of the image i again based on the another duration impact parameter of the image i. Then, display of the image i is controlled based on the adjusted presentation time of the image i.

Specific descriptions of the foregoing three adjustment manners may be similar to specific descriptions of manners for determining the presentation time sequence corresponding to the image sequence in the embodiment described in FIG. 4, and details are not described herein again.

In an embodiment, the image sequence may also include N images selected from M images received from a camera device.

In an embodiment, that the image presentation time adjustment device adjusts a presentation time corresponding to each image in the image sequence based on a corresponding duration impact parameter for each image in the image sequence may specifically include: For any image j in the image sequence, the image presentation time adjustment device may first determine a presentation time offset based on a duration impact parameter, and then adjust a presentation time of the image j based on the determined presentation time offset. The presentation time offset determined based on the duration impact parameter may be determined by using a mapping table, or may be determined by using a fitting formula. A process of determining the presentation time offset by using a mapping table is specifically as follows: For the image j, the presentation time offset of the image j is found from a third mapping table based on the duration impact parameter of the image j, where the third mapping table includes a plurality of duration impact parameters and presentation time offsets respectively corresponding to the plurality of duration impact parameters. For a specific description of determining the presentation time offset by using a mapping table, refer to the description of determining the presentation time according to the first mapping table in the embodiment described in FIG. 4. In other words, the third mapping table may be similar to the first mapping table, and details are not described herein again.

A process of determining the presentation time offset by using a fitting formula is specifically as follows: When the duration impact parameter includes the first recognition probability, that the image presentation time adjustment device adjusts a presentation time corresponding to each image in the image sequence based on a corresponding duration impact parameter for each image in the image sequence includes: The image presentation time adjustment device obtains the presentation time offset of each image in the image sequence by using the following fitting formula:

$$\Delta T(c) = \sum_{t=0}^{n} a_j c^t \quad (1\text{-}11)$$

where $\Delta T(c)$ is the presentation time offset, c is the first recognition probability, c is a real number satisfying $0 \leq c \leq 1$, n is an order at which $\Delta T(c)$ fits c, n is an integer greater than 0, t is an integer satisfying $-n \leq t \leq n$, and $a_t$ is a coefficient of $c^t$.

In an embodiment, $\Delta T(c)$ is obtained after n-order linear fitting is performed on c by using (c1, T2) and (c2, T1). T1 is a minimum presentation time threshold, T2 is a maximum presentation time threshold, c1 is a minimum probability threshold of a recognition probability determined by using the computer vision algorithm, and c2 is a maximum probability threshold of a recognition probability determined by using the computer vision algorithm. For descriptions of the minimum presentation time threshold, the maximum presentation time threshold, the minimum probability threshold, and the maximum probability threshold, refer to the embodiment described in FIG. 4. Details are not described herein again.

Specifically, for example, if the presentation time of each image in the image sequence is Tc before adjustment, the n-order linear fitting may be as follows:

$$\Delta T(c) = T_1 - Tc + (c - c1)^n \cdot \frac{(T1 - Tc) - (T2 - Tc)}{(c2 - c1)^n} \quad (1\text{-}12)$$

In an embodiment, when a first recognition probability of an image q is greater than or equal to c2, the first recognition probability is used to determine that the image q includes the preset image feature. When the first recognition probability of the image q is less than or equal to c1, the first recognition probability is used to determine that the image q does not include the preset image feature, where the image q is any image in the image sequence.

In an embodiment, the duration impact parameter includes the fatigue state parameter, and that the image presentation time adjustment device adjusts a presentation time corresponding to each image in the image sequence based on a corresponding duration impact parameter for each image in the image sequence includes: The image presentation time adjustment device obtains the presentation time offset of each image in the image sequence by using the following fitting formula:

$$\Delta T(f) = \sum_{k=0}^{m} a_k f^k \quad (1\text{-}13)$$

where $\Delta T(f)$ is the presentation time offset, f is the fatigue state parameter, m is an order at which $\Delta T(f)$ fits f, m is a positive integer greater than 0, k is an integer satisfying $-m \leq k \leq m$, and $a_k$ is a coefficient of $f^k$.

In an embodiment, $\Delta T(f)$ is obtained after n-order linear fitting is performed on f by using (f1, T1) and (f2, T2). T1 is a minimum presentation time threshold, T2 is a maximum presentation time threshold, f1 is a minimum fatigue threshold, and f2 is a maximum fatigue threshold. For descriptions of the minimum fatigue threshold and the maximum fatigue threshold, refer to the embodiment described in FIG. 4. Details are not described herein again.

Specifically, for example, if the presentation time of each image in the image sequence is Tc before adjustment, the n-order linear fitting may be as follows:

$$\Delta T(f) = T_1 - Tc + (f - f1)^n \cdot \frac{(f2 - Tc) - (f1 - Tc)}{(f2 - f1)^n} \quad (1\text{-}14)$$

In an embodiment, the duration impact parameter includes the first recognition probability and the fatigue state parameter, and that the image presentation time adjustment device adjusts a presentation time corresponding to each image in the image sequence based on a corresponding duration impact parameter for each image in the image sequence includes: The image presentation time adjustment device obtains the presentation time offset of each image in the image sequence by using the following fitting formula:

$$\Delta T(c, f) = \sum_{t=0}^{n} \sum_{k=0}^{m} a_{t,k} c^t f^k \quad (1\text{-}15)$$

where $\Delta T(c, f)$ is the presentation time offset, c is the first recognition probability, f is the fatigue state parameter, m is an order at which $\Delta T(c, f)$ fits f, n is an order at which $\Delta T(c,$ f) fits c, both n and m are positive integers greater than 0, t is an integer satisfying $-n \le t \le n$, k is an integer satisfying $-m \le k \le m$, c is a real number satisfying $0 \le c \le 1$, and $a_{t,k}$ is a coefficient of $c^t f^k$.

The presentation time corresponding to each image in the image sequence is adjusted based on the corresponding presentation time offset of each image in the image sequence.

In an embodiment, $\Delta T(c, f)$ is obtained after linear fitting is performed on c and f by using (c1, T2), (c2, T1), (f1, T1), and (f2, T2). T1 is a minimum presentation time threshold, T2 is a maximum presentation time threshold, c1 is a minimum probability threshold of a recognition probability determined by using the computer vision algorithm, c2 is a maximum probability threshold of a recognition probability determined by using the computer vision algorithm, f1 is a minimum fatigue threshold, and f2 is a maximum fatigue threshold.

A specific description of determining the presentation time offset by using the fitting formula based on the duration impact parameter may be similar to the description of determining the presentation time by using the fitting formula in the embodiment described in FIG. 4.

In an embodiment, when it is detected that a corresponding fatigue state parameter obtained when the observation object observes an image r is greater than or equal to a first fatigue threshold, the image presentation time adjustment device may control to stop displaying images to be displayed after the image r in the image sequence, and obtain an image whose corresponding first recognition probability is greater than or equal to a first probability threshold in the images to be displayed after the image r; and when it is detected that the fatigue state parameter of the observation object is less than or equal to a second fatigue threshold, the image presentation time adjustment device controls to sequentially display the image whose first recognition probability is greater than or equal to the first probability threshold in the images to be displayed after the image r, where the image r is any image in the image sequence. For description of controlling, based on the fatigue state parameter, to stop displaying the image sequence, or to start displaying the image sequence again, refer to the embodiment described in FIG. 4. Details are not described herein again.

In an embodiment, there are at least two observation objects, and the fatigue state parameter is at least two fatigue state parameters respectively generated when the at least two observation objects observe a same image. A presentation time of an image u is positively correlated with a weighted sum of the at least two fatigue state parameters, where the image u is any image in the image sequence. The fatigue state parameter includes the at least two fatigue state parameters respectively generated when the at least two observation objects observe a same image. For a description of performing brain-computer combination image recognition on one image sequence by a plurality of observation objects, refer to the embodiment described in FIG. 4. Details are not described herein again.

In an embodiment, that the image recognition device fuses, for each image in the image sequence, a corresponding computer vision signal and a corresponding feedback signal to obtain a target recognition signal of each image in the image sequence includes: determining, for each image in the image sequence based on at least one of the first recognition probability, the fatigue state parameter, and the presentation time, a first weight corresponding to each image in the image sequence, where the first weight is a weight used when the corresponding feedback signal is used to determine the target recognition signal, the first weight is inversely correlated with the first recognition probability, the first weight is inversely correlated with the fatigue state parameter, and the first weight is positively correlated with the presentation time; and fusing, for each image in the image sequence based on a corresponding first weight, a corresponding computer vision signal and a corresponding feedback signal to obtain the target recognition signal of each image in the image sequence. For descriptions of the first weight and the fusion of the computer vision signal and the feedback signal based on the weight, refer to the embodiment described in FIG. 4. Details are not described herein again.

For a description of the fusion of the computer vision signal and the feedback signal, refer to the foregoing description. Details are not described herein again.

In an embodiment, the image presentation time adjustment device uses images whose corresponding target recognition probabilities are between a second probability threshold and a third probability threshold in the image sequence as a new image sequence. The new image sequence may be used to re-execute a brain-computer combination image recognition process. For specific descriptions of the second threshold and the third probability threshold, refer to the specific descriptions of the embodiment described in FIG. 4. Details are not described herein again.

It may be understood that, in the embodiment described in FIG. 6, for explanations of related descriptions, refer to the embodiment described in FIG. 4. A new embodiment may be obtained with reference to any one or more implementations of the embodiment described in FIG. 4 and the embodiment described in FIG. 6. This is not limited in the embodiments of this application.

The method in the embodiments of the present invention is described above in detail, and an apparatus in an embodiment of the present invention is provided below.

Figure 7:
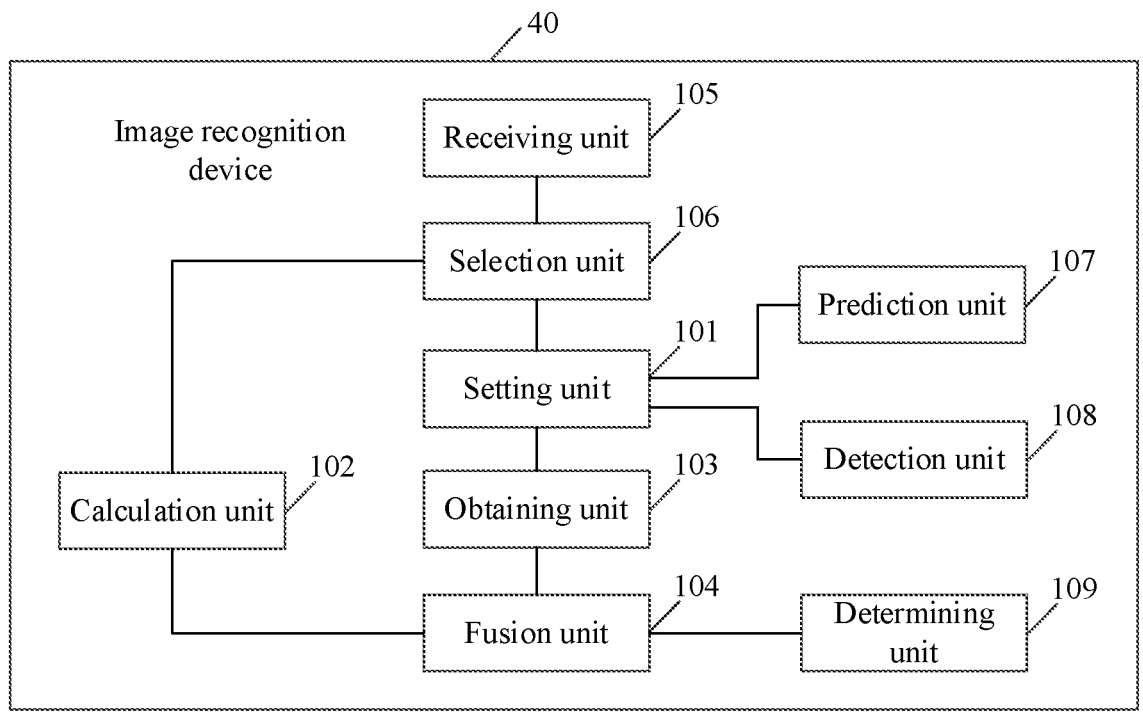
FIG. 7 is a schematic structural diagram of an image recognition device according to an embodiment of this application.

FIG. 7 is a schematic structural diagram of an image recognition device 40 according to an embodiment of this application. As shown in FIG. 7, the device may include a setting unit 101, a calculation unit 102, an obtaining unit 103, and a fusion unit 104.

The setting unit 101 is configured to set a presentation time sequence corresponding to an image sequence, where the image sequence includes N images, N is a positive integer, the presentation time sequence includes a presentation time of each image in the image sequence, a presentation time of an image i is used to indicate a time period from a presentation start moment of the image i to a presentation start moment of a next adjacent image, the image i is any image in the image sequence, the presentation time sequence includes at least two unequal presentation times, a difference between any two presentation times of the at least two unequal presentation times is $k \times \Delta$, k is a positive integer, and $\Delta$ is a preset time period value.

The calculation unit 102 is configured to process the image sequence by using a computer vision algorithm, to obtain a computer vision signal corresponding to each image in the image sequence.

The obtaining unit 103 is configured to obtain a feedback signal that is generated when an observation object watches the image sequence displayed in the presentation time sequence and that corresponds to each image in the image sequence, where the feedback signal is used to indicate a reaction of the observation object to the watched image.

The fusion unit 104 is configured to fuse, for each image in the image sequence, a corresponding computer vision signal and a corresponding feedback signal to obtain a target recognition signal of each image in the image sequence, where the target recognition signal is used for image recognition.

In an embodiment, the image recognition device further includes a receiving unit 105 and a selection unit 106. The receiving unit 105 is configured to receive M images from a camera device, where M is an integer greater than 1.

The selection unit 106 is configured to select N images from the M images as the image sequence, where N is less than or equal to M.

In an embodiment, the setting unit 101 is specifically configured to determine a corresponding presentation time for each image in the image sequence based on a duration impact parameter, to obtain the presentation time sequence corresponding to the image sequence.

The duration impact parameter includes at least one of the first recognition probability and a fatigue state parameter, the first recognition probability is used to indicate a probability, obtained by using the computer vision algorithm, that an image includes a preset image feature, the fatigue state parameter is used to indicate a fatigue degree of the observation object when the observation object observes an image, the presentation time is inversely correlated with the first recognition probability, and the presentation time is positively correlated with the fatigue state parameter.

In an embodiment, the duration impact parameter includes the fatigue state parameter, and the image recognition device 40 further includes a prediction unit 107. The prediction unit 107 is configured to predict, according to a fatigue rule, the fatigue state parameter corresponding to each image in the image sequence, where the fatigue rule is used to indicate a change rule of a fatigue degree of the observation object.

In an embodiment, the obtaining unit 103 is further configured to: in a process of displaying the image sequence in the presentation time sequence, obtain the fatigue state parameter corresponding to an image j, and adjust, based on the fatigue state parameter corresponding to the image j, a presentation time, in the presentation time sequence, corresponding to an image to be displayed after the image j in the image sequence, where the image j is any image in the image sequence.

In an embodiment, the obtaining unit 103 is specifically configured to obtain the fatigue state parameter based on fatigue state information that is sent by a sensor and that is obtained when the observation object watches the image j.

In an embodiment, the setting unit 101 is specifically configured to: for each image in the image sequence, find a presentation time corresponding to the duration impact parameter from a first mapping table, where the first mapping table includes a plurality of duration impact parameters and presentation times respectively corresponding to the plurality of duration impact parameters.

In an embodiment, the duration impact parameter includes the first recognition probability.

The setting unit 101 is specifically configured to obtain the presentation time of each image in the image sequence by using the following fitting formula:

$$T(c) = \sum_{t=0}^{n} a_j c^t;$$

where

T(c) is the presentation time, c is the first recognition probability, c is a real number satisfying 0≤c≤1, n is an order at which T(c) fits c, n is an integer greater than 0, t is an integer satisfying −n≤t≤n, and $a_t$ is a coefficient of $c^t$.

In an embodiment, T(c) is obtained after n-order linear fitting is performed on c by using (c1, T2) and (c2, T1). T1 is a minimum presentation time threshold, T2 is a maximum presentation time threshold, c1 is a minimum probability threshold of a recognition probability determined by using the computer vision algorithm, and c2 is a maximum probability threshold of a recognition probability determined by using the computer vision algorithm.

In an embodiment, the duration impact parameter includes the fatigue state parameter, and the setting unit 101 is specifically configured to obtain the presentation time of each image in the image sequence by using the following fitting formula:

$$T(f) = \sum_{k=0}^{m} a_k f^k;$$

where

T(f) is the presentation time, f is the fatigue state parameter, m is an order at which T(f) fits f, m is a positive integer greater than 0, k is an integer satisfying −m≤k≤m, and $a_k$ is a coefficient of $f^k$.

In an embodiment, the duration impact parameter includes the first recognition probability and the fatigue state parameter, and the setting unit 101 is specifically configured to obtain the presentation time of each image in the image sequence by using the following fitting formula:

$$T(c, f) = \sum_{t=0}^{n} \sum_{k=0}^{m} a_{t,k} c^t f^k;$$

where

T(c, f) is the presentation time, c is the first recognition probability, f is the fatigue state parameter, m is an order at which T(c, f) fits f, n is an order at which T(c, f) fits c, both n and m are positive integers greater than 0, t is an integer satisfying −n≤t≤n, k is an integer satisfying −m≤k≤m, c is a real number satisfying 0≤c≤1, and $a_{t,k}$ is a coefficient of $c^t f^k$.

In an embodiment, the image recognition device further includes a detection unit 108, configured to: when it is detected that a corresponding fatigue state parameter obtained when the observation object observes an image q is greater than or equal to a first fatigue threshold, control to stop displaying images to be displayed after the image q in the image sequence.

The obtaining unit 103 is further configured to obtain an image whose corresponding first recognition probability is greater than or equal to a first probability threshold in the images to be displayed after the image q, where the image q is any image in the image sequence.

The detection unit 108 is further configured to: when it is detected that the fatigue state parameter of the observation object is less than or equal to a second fatigue threshold, control to sequentially display the image whose first recognition probability is greater than or equal to the first probability threshold in the images to be displayed after the image q.

In an embodiment, there are at least two observation objects. The fusion unit 104 is specifically configured to fuse, for each image in the image sequence, a corresponding computer vision signal and at least two corresponding feedback signals to obtain a target recognition signal of each image in the image sequence.

In an embodiment, the fatigue state parameter includes at least two fatigue state parameters respectively generated when the at least two observation objects observe a same image.

In an embodiment, the fusion unit 104 is specifically configured to: determine, for each image in the image sequence based on at least one of the first recognition probability, the fatigue state parameter, and the presentation time, a first weight corresponding to each image in the image sequence, where the first weight is a weight used when the corresponding feedback signal is used to determine the target recognition signal, the first weight is inversely correlated with the first recognition probability, the first weight is inversely correlated with the fatigue state parameter, and the first weight is positively correlated with the presentation time.

The fusion unit 104 is further configured to fuse, for each image in the image sequence based on a corresponding first weight, a corresponding computer vision signal and a corresponding feedback signal to obtain the target recognition signal of each image in the image sequence.

In an embodiment, the computer vision signal is a first recognition probability determined by using the computer vision algorithm.

The calculation unit 102 is further configured to calculate, for each image in the image sequence, a second recognition probability of each image in the image sequence based on a corresponding feedback signal, where the second recognition probability is used to indicate a probability that the observation object determines that the image includes the preset image feature. The fusion unit 104 is specifically configured to calculate, for each image in the image sequence, a target recognition probability of each image in the image sequence based on the corresponding first recognition probability and the corresponding second recognition probability.

In an embodiment, the computer vision signal is an image feature determined by using the computer vision algorithm.

The calculation unit 102 is further configured to determine, for each image in the image sequence based on a corresponding feedback signal, a feedback signal feature corresponding to each image in the image sequence. The fusion unit 104 is specifically configured to: perform, for each image in the image sequence, feature fusion on the corresponding image feature and the corresponding feedback signal feature, to obtain a fused feature corresponding to each image in the image sequence; and determine, for each image in the image sequence, a target recognition probability of each image in the image sequence based on the corresponding fused feature.

In an embodiment, the device further includes a determining unit 109, configured to determine, from the image sequence based on the target recognition probability of each image in the image sequence, S images as images including the preset image feature, where the target recognition probabilities of the S images meet a preset condition, and S is an integer less than or equal to N.

In an embodiment, the setting unit 101 is further configured to use images that are in the image sequence and whose corresponding target recognition probabilities are between a second probability threshold and a third probability threshold as a new image sequence.

In an embodiment, the feedback signal is an electroencephalogram signal.

It should be noted that, for implementation of each unit in the image recognition device 40, refer to corresponding descriptions in the method embodiment shown in FIG. 4. Details are not described herein again. The image recognition device 40 may be the image recognition device 40 in the system architecture shown in FIG. 1.

Figure 8:
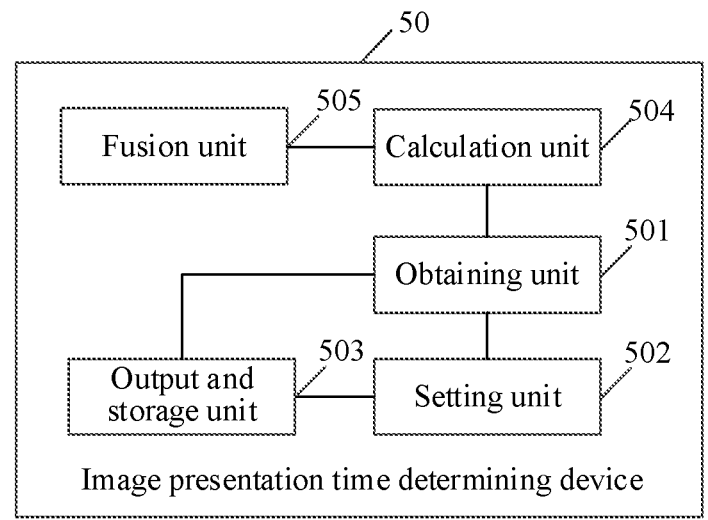
FIG. 8 is a schematic structural diagram of an image presentation time determining device according to an embodiment of this application.

FIG. 8 is a schematic structural diagram of an image presentation time determining device 50 according to an embodiment of this application. As shown in FIG. 8, the device 50 may include an obtaining unit 501, a setting unit 502, and an output and storage unit 503.

The obtaining unit 501 is configured to obtain a plurality of images, where the plurality of images may form an image sequence.

The setting unit 502 is configured to: set a corresponding presentation time for each image in the plurality of images based on a duration impact parameter, to obtain a presentation time sequence corresponding to the plurality of images. The duration impact parameter includes at least one of a first recognition probability and a fatigue state parameter, the presentation time is inversely correlated with the first recognition probability, and the presentation time is positively correlated with the fatigue state parameter. The first recognition probability is used to indicate a probability, obtained by using a computer vision algorithm, that an image includes a preset image feature. The fatigue state parameter is used to indicate a fatigue degree of the observation object when the observation object observes an image. A presentation time of an image i is used to indicate a time period from a presentation start moment of the image i to a presentation start moment of a next adjacent image, and the image i is any image in the plurality of images.

The output and storage unit 503 is configured to output or store the plurality of images and the presentation time sequence corresponding to the plurality of images.

In an embodiment, the image presentation time determining device 50 further includes a calculation unit 504 and a fusion unit 505.

The calculation unit 504 is configured to process the image sequence by using a computer vision algorithm, to obtain a computer vision signal corresponding to each image in the image sequence.

The obtaining unit 501 is further configured to obtain a feedback signal that is generated when an observation object watches the plurality of images displayed in the presentation time sequence and that corresponds to each image in the plurality of images, where the feedback signal is used to indicate a reaction of the observation object to the watched image.

The fusion unit 505 is configured to fuse, for each image in the image sequence, a corresponding computer vision signal and a corresponding feedback signal to obtain a target recognition signal of each image in the plurality of images, where the target recognition signal is used for image recognition.

It should be noted that, the image presentation time determining device 50 may be the image recognition device 40 in the system architecture shown in FIG. 1. It should be noted that, for implementation of each unit in the image presentation time determining device 50, refer to corresponding descriptions in the method embodiment shown in FIG. 4. Details are not described herein again.

Figure 9:
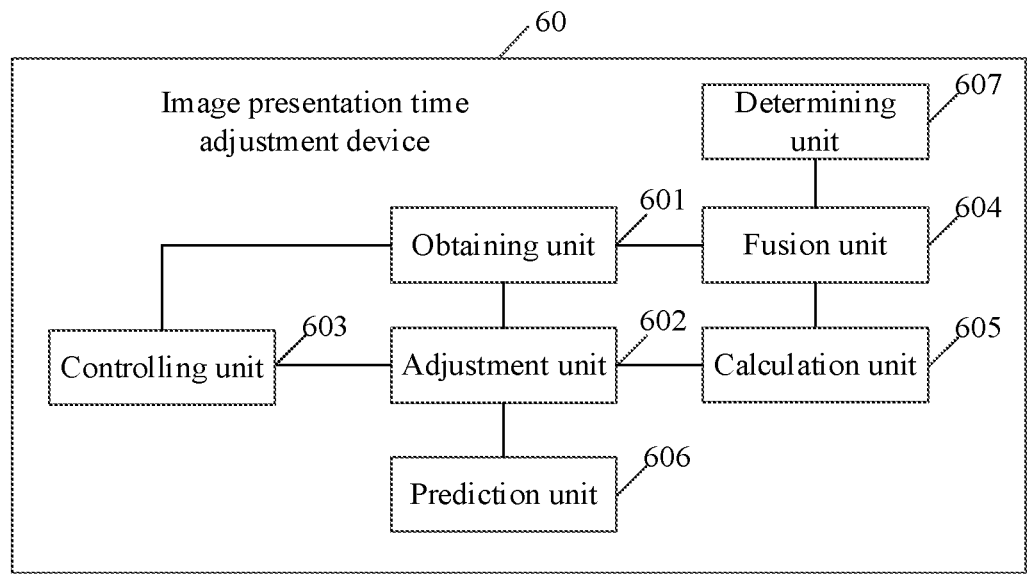
FIG. 9 is a schematic structural diagram of an image presentation time adjustment device according to an embodiment of this application.

FIG. 9 is a schematic structural diagram of an image presentation time adjustment device 60 according to an embodiment of this application. As shown in FIG. 9, the device may include an obtaining unit 601, an adjustment unit 602, and a control unit 603.

The obtaining unit 601 is configured to obtain an image sequence based on a rapid serial visual presentation RSVP paradigm, where the image sequence includes a plurality of images, a presentation time is configured for each image in the plurality of images, a presentation time of an image i is used to indicate a time period from a presentation start moment of the image i to a presentation start moment of a next adjacent image, and the image i is any image in the plurality of images.

The adjustment unit 602 is configured to adjust the presentation time corresponding to each image in the image sequence based on a corresponding duration impact parameter for each image in the image sequence, where the duration impact parameter includes at least one of a first recognition probability and a fatigue state parameter, the first recognition probability is used to indicate a probability, obtained by using a computer vision algorithm, that an image includes a preset image feature, the fatigue state parameter is used to indicate a fatigue degree of the observation object when the observation object observes an image, the first recognition probability is inversely correlated with the presentation time, and the fatigue state parameter is positively correlated with the presentation time.

The control unit 603 is configured to control display of the image sequence based on an adjusted presentation time corresponding to each image in the image sequence.

In an embodiment, presentation times of the plurality of images are equal before the presentation times start to be adjusted.

In an embodiment, the obtaining unit 601 is specifically configured to: receive M images from a camera device, where M is an integer greater than 1; and select N images from the M images as the image sequence, where N is less than or equal to M.

In an embodiment, a fatigue state parameter corresponding to each image in the image sequence is obtained through prediction according to a fatigue rule, and the fatigue rule is used to indicate a change rule of a fatigue degree of the observation object.

In an embodiment, a fatigue state parameter corresponding to an image is a fatigue state parameter of the observation object when the observation object observes the image.

In an embodiment, the image presentation time adjustment device 60 further includes a fusion unit 604 and a calculation unit 605. The obtaining unit 601 is configured to obtain a feedback signal that is generated when the observation object watches the image sequence displayed in the presentation time sequence and that corresponds to each image in the image sequence, where the feedback signal is used to indicate a reaction of the observation object to the watched image.

The calculation unit 605 is configured to process the image sequence by using a computer vision algorithm, to obtain a computer vision signal corresponding to each image in the image sequence.

The fusion unit 604 is configured to fuse, for each image in the image sequence, a corresponding computer vision signal and a corresponding feedback signal to obtain a target recognition signal of each image in the image sequence, where the target recognition signal is used for image recognition.

In an embodiment, the duration impact parameter includes the first recognition probability and the fatigue state parameter, and the image presentation time adjustment device 60 further includes a prediction unit 606.

The calculation unit 605 is specifically configured to process the image sequence by using the computer vision algorithm, to obtain the first recognition probability corresponding to each image in the image sequence.

The prediction unit 606 is configured to predict a fatigue state parameter corresponding to each image in the image sequence according to a fatigue rule, where the fatigue rule is used to indicate a change rule of a fatigue degree of the observation object.

The adjustment unit 602 is specifically configured to adjust the presentation time corresponding to each image in the image sequence based on a corresponding first recognition probability and fatigue state parameter, so as to obtain an adjusted presentation time sequence corresponding to the image sequence.

In an embodiment, the duration impact parameter includes the first recognition probability. The calculation unit 605 is further configured to process the image sequence by using the computer vision algorithm, to obtain a first recognition probability of each image in the image sequence. The adjustment unit 602 is specifically configured to adjust, for each image in the image sequence based on a corresponding first recognition probability, the presentation time corresponding to each image in the image sequence.

In an embodiment, the duration impact parameter includes the fatigue state parameter. The prediction unit 606 is configured to predict a fatigue state parameter corresponding to each image in the image sequence according to a fatigue rule, where the fatigue rule is used to indicate a change rule of a fatigue degree of the observation object. The adjustment unit 602 is specifically configured to adjust, for each image in the image sequence based on a corresponding fatigue state parameter, the presentation time corresponding to each image in the image sequence.

In an embodiment, the adjustment unit 602 is specifically configured to find, for an image j, a presentation time offset of the image j from a third mapping table based on a duration impact parameter of the image j, where the third mapping table includes a plurality of duration impact parameters and presentation time offsets respectively corresponding to the plurality of duration impact parameters; and adjust a presentation time of the image j based on the presentation time offset of the image j, where the image j is any image in the image sequence.

In an embodiment, the obtaining unit 601 is further configured to: for an image q, obtain a fatigue state parameter of the image q based on fatigue state information that is sent by a sensor and that is obtained when the observation object watches the image p, where the image q is any image in the image sequence other than the first image, and the image p is a previous image of the image q.

In an embodiment, a fatigue state parameter of the first image is preset to 0.

In an embodiment, the duration impact parameter includes the first recognition probability, and the adjustment unit 602 is specifically configured to obtain a presentation time offset of each image in the image sequence by using the following fitting formula:

$$\Delta T(c) = \sum_{t=0}^{n} a_j c^t;$$

where $\Delta T(c)$ is the presentation time offset, c is the first recognition probability, c is a real number satisfying $0 \leq c \leq 1$, n is an order at which $\Delta T(c)$ fits c, n is an integer greater than 0, t is an integer satisfying $-n \leq t \leq n$, and $a_t$ is a coefficient of $c^t$;

adjust the presentation time of each image in the image sequence based on the presentation time offset of each image in the image sequence; and adjust the presentation time corresponding to each image in the image sequence based on the corresponding presentation time offset of each image in the image sequence.

In an embodiment, ΔT(c) is obtained after n-order linear fitting is performed on c by using (c1, T2) and (c2, T1). T1 is a minimum presentation time threshold, T2 is a maximum presentation time threshold, c1 is a minimum probability threshold of a recognition probability determined by using the computer vision algorithm, and c2 is a maximum probability threshold of a recognition probability determined by using the computer vision algorithm.

In an embodiment, when a first recognition probability of an image q is greater than or equal to c2, the first recognition probability is used to determine that the image q includes the preset image feature. When the first recognition probability of the image q is less than or equal to c1, the first recognition probability is used to determine that the image q does not include the preset image feature, where the image q is any image in the image sequence.

In an embodiment, the duration impact parameter includes the fatigue state parameter, and the adjustment unit 602 is specifically configured to obtain the presentation time offset of each image in the image sequence by using the following fitting formula:

$$\Delta T(f) = \sum_{k=0}^{m} a_k f^k;$$

where

ΔT(f) is the presentation time offset, f is the fatigue state parameter, m is an order at which ΔT(f) fits f, m is a positive integer greater than 0, k is an integer satisfying −m≤k≤m, and $a_k$ is a coefficient of $f^k$; adjust the presentation time corresponding to each image in the image sequence based on the presentation time offset of the corresponding image; and adjust the presentation time corresponding to each image in the image sequence based on the corresponding presentation time offset of each image in the image sequence.

In an embodiment, the duration impact parameter includes the first recognition probability and the fatigue state parameter, and the adjustment unit 602 is specifically configured to obtain the presentation time offset of each image in the image sequence by using the following fitting formula:

$$\Delta T(c, f) = \sum_{t=0}^{n} \sum_{k=0}^{m} a_{t,k} c^t f^k;$$

where

ΔT(c, f) is the presentation time offset, c is the first recognition probability, f is the fatigue state parameter, m is an order at which ΔT(c, f) fits f, n is an order at which ΔT(c, f) fits c, both n and m are positive integers greater than 0, t is an integer satisfying −n≤t≤n, k is an integer satisfying −m≤k≤m, c is a real number satisfying 0≤c≤1, and $a_{t,k}$ is a coefficient of $c^t f^k$; and adjust the presentation time corresponding to each image in the image sequence based on the corresponding presentation time offset of each image in the image sequence.

In an embodiment, the control unit 603 is further configured to: when it is detected that a corresponding fatigue state parameter obtained when the observation object observes an image r is greater than or equal to a first fatigue threshold, control to stop displaying images to be displayed after the image r in the image sequence.

The obtaining unit 601 is further configured to obtain an image whose corresponding first recognition probability is greater than or equal to a first probability threshold in the images to be displayed after the image r.

The detection unit 603 is further configured to: when it is detected that the fatigue state parameter of the observation object is less than or equal to a second fatigue threshold, control to sequentially display the image whose first recognition probability is greater than or equal to the first probability threshold in the images to be displayed after the image r, where the image r is any image in the image sequence.

In an embodiment, there are at least two observation objects, and the fatigue state parameter is at least two fatigue state parameters respectively generated when the at least two observation objects observe a same image. A presentation time of an image u is positively correlated with a weighted sum of the at least two fatigue state parameters, where the image u is any image in the image sequence. In an embodiment, for each image in the image sequence, the fusion unit 604 is specifically configured to: determine, for each image in the image sequence based on at least one of the first recognition probability, the fatigue state parameter, and the presentation time, a first weight corresponding to each image in the image sequence, where the first weight is a weight used when the corresponding feedback signal is used to determine the target recognition signal, the first weight is inversely correlated with the first recognition probability, the first weight is inversely correlated with the fatigue state parameter, and the first weight is positively correlated with the presentation time.

The fusion unit 604 is further configured to fuse, for each image in the image sequence based on a corresponding first weight, a corresponding computer vision signal and a corresponding feedback signal to obtain the target recognition signal of each image in the image sequence.

In an embodiment, the computer vision signal is a first recognition probability determined by using the computer vision algorithm. The calculation unit 605 is further configured to calculate, for each image in the image sequence, a second recognition probability of each image in the image sequence based on a corresponding feedback signal, where the second recognition probability is used to indicate a probability that the observation object determines that the image includes the preset image feature. The fusion unit 604 is specifically configured to calculate, for each image in the image sequence, a target recognition probability of each image in the image sequence based on the corresponding first recognition probability and the corresponding second recognition probability.

In an embodiment, the computer vision signal is an image feature determined by using the computer vision algorithm. The calculation unit 605 is further configured to determine, for each image in the image sequence based on a corresponding feedback signal, a feedback signal feature corresponding to each image in the image sequence.

The fusion unit 604 is specifically configured to perform, for each image in the image sequence, feature fusion on the corresponding image feature and the corresponding feedback signal feature, to obtain a fused feature corresponding to each image in the image sequence.

The fusion unit 604 is further configured to determine, for each image in the image sequence, a target recognition probability of each image in the image sequence based on the corresponding fused feature.

In an embodiment, the image presentation time adjustment device 60 further includes a determining unit 607, configured to determine, from the image sequence based on the target recognition probability of each image in the image sequence, S images as images including the preset image feature, where the target recognition probabilities of the S images meet a preset condition, and S is an integer less than or equal to N. The preset condition may be that the target recognition probability is greater than or equal to a threshold, or the preset condition may be that the S images are the first S images sorted in descending order according to the target recognition probabilities when target recognition probabilities of images in the image sequence are sorted in descending order.

In an embodiment, the determining unit 607 is further configured to use images that are in the image sequence and whose corresponding target recognition probabilities are between a second probability threshold and a third probability threshold as a new image sequence. The new image sequence may be used to re-execute the method described in FIG. 6.

When a target recognition probability of any image in the image sequence is less than or equal to the second probability threshold, the image is not an image that includes the preset image feature. When a target recognition probability of any image in the image sequence is greater than or equal to the third probability threshold, the image is an image that includes the preset image feature. The second probability threshold is less than or equal to the third probability threshold.

In an embodiment, the feedback signal is an electroencephalogram signal.

It should be noted that, for implementation of the foregoing units, refer to corresponding descriptions in the method embodiment shown in FIG. 6. Details are not described herein again. The image presentation time adjustment device 60 may be the image recognition device 40 in the system architecture shown in FIG. 1.

Figure 10:
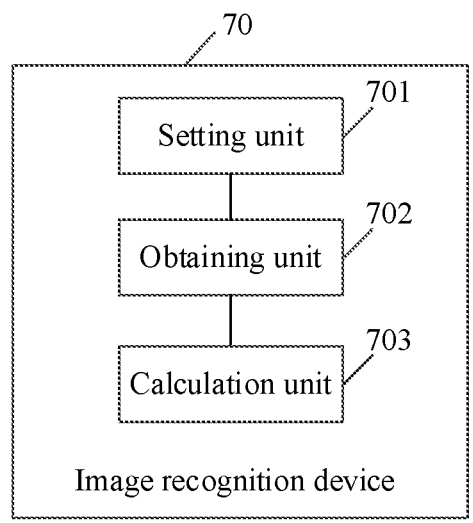
FIG. 10 is a schematic structural diagram of an image recognition device according to an embodiment of this application.

FIG. 10 is a schematic structural diagram of an image recognition device 70 according to an embodiment of this application. As shown in FIG. 10, the device may include a setting unit 701, an obtaining unit 702, and a calculation unit 703.

The setting unit 701 is configured to set a presentation time of a target image based on a duration impact parameter of the target image, where the presentation time of the target image is used to indicate a time period from a presentation start moment of the target image to a presentation start moment of a next adjacent image, the duration impact parameter includes at least one of a first recognition probability and a fatigue state parameter, the first recognition probability is used to indicate a probability, obtained by using a computer vision algorithm, that an image includes a preset image feature, the fatigue state parameter is used to indicate a fatigue degree of an observation object when the observation object observes an image, the presentation time is inversely correlated with the first recognition probability, and the presentation time is positively correlated with the fatigue state parameter.

The obtaining unit 702 is configured to obtain a feedback signal generated when the observation object observes the target image within the presentation time of the target image.

The calculation unit 703 is configured to determine a target recognition probability of the target image based on a computer vision signal and the feedback signal of the target image, where the computer vision signal is the first recognition probability or an image feature that is of the target image and that is determined by using the computer vision algorithm.

It should be noted that, for implementation of the foregoing units, refer to corresponding descriptions in the method embodiment shown in FIG. 4. Details are not described herein again. The image recognition device 70 may be the image recognition device 40 in the system architecture shown in FIG. 1.

An embodiment of this application further provides an image recognition system, including: an image recognition device 40, a display device 10, and a feedback signal collection device 20. The image recognition device 40 is separately connected to the display device 10 and the feedback signal collection device 20. The image recognition device 40 is configured to execute the brain-computer combination image recognition method based on image sequence presentation described in FIG. 4. The display device 10 is configured to display the image sequence, and the feedback signal collection device 20 is configured to obtain a feedback signal obtained when the observation object watches any image i in the image sequence, and feed back the feedback signal to the image recognition device.

Specifically, the image recognition device 40 may be the image recognition device described in FIG. 3 or FIG. 7. The display device 10 and the feedback signal collection device 20 may be respectively the display device 10 and the feedback signal collection device 20 in the system described in FIG. 1.

An embodiment of this application provides an image recognition system, including: an image presentation time determining device 50, a display device 10, and a feedback signal collection device 20. The image presentation time determining device 50 is separately connected to the display device 10 and the feedback signal collection device 20. The image presentation time determining device 50 is configured to execute the image presentation time determining method described in FIG. 4. The display device 10 is configured to display the image sequence, and the feedback signal collection device 20 is configured to obtain a feedback signal obtained when the observation object watches any image i in the image sequence, and feed back the feedback signal to the image presentation time determining device. The system may be the system described in FIG. 1.

Specifically, the image presentation time determining device 50 may be the image presentation time determining device described in FIG. 8, or may be the image recognition device described in FIG. 3. The display device 10 and the feedback signal collection device 20 may be respectively the display device 10 and the feedback signal collection device 20 in the system described in FIG. 1.

An embodiment of this application provides an image recognition system, including: an image presentation time adjustment device 60, a display device 10, and a feedback signal collection device 20. The image presentation time adjustment device is separately connected to the display device and the feedback signal collection device. The image presentation time adjustment device is configured to execute the image recognition method described in FIG. 6. The display device 10 is configured to display the image sequence, and the feedback signal collection device 20 is configured to obtain a feedback signal obtained when the observation object watches any image i in the image sequence, and feed back the feedback signal to the image presentation time adjustment device. The system may be the system described in FIG. 1.

Specifically, the image presentation time adjustment device 60 may be the image presentation time determining device described in FIG. 9, or may be the image recognition device described in FIG. 3. The display device 10 and the feedback signal collection device 20 may be respectively the display device 10 and the feedback signal collection device 20 in the system described in FIG. 1.

An embodiment of this application provides an image recognition system, including: an image recognition device 70, a display device 10, and a feedback signal collection device 20. The image recognition device 70 is separately connected to the display device 10 and the feedback signal collection device 20. The image recognition device 70 is configured to execute the image recognition method described in FIG. 6. The display device 10 is configured to display the target image, and the feedback signal collection device 20 is configured to obtain a feedback signal obtained when the observation object observes the target image, and feed back the feedback signal to the image recognition device. The system may be the system described in FIG. 1.

Specifically, the image recognition device 70 may be the image recognition device described in FIG. 10, or may be the image recognition device described in FIG. 3. The display device 10 and the feedback signal collection device 20 may be respectively the display device 10 and the feedback signal collection device 20 in the system described in FIG. 1.

An embodiment of the present invention further provides a chip system. The chip system includes at least one processor, a memory, and an interface circuit. The memory, the transceiver, and the at least one processor are interconnected by using a line, and the at least one memory stores an instruction. When the instruction is executed by the processor, the method procedure shown in FIG. 4 or FIG. 6 is implemented.

An embodiment of the present invention further provides a computer readable storage medium. The computer readable storage medium stores an instruction, and when the instruction is run on a processor, the method procedure shown in FIG. 4 or FIG. 6 is implemented.

An embodiment of the present invention further provides a computer program product. When the computer program product is run on a processor, the method procedure shown in FIG. 4 or FIG. 6 is implemented.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, some or all of the procedures or functions according to the embodiments of this application are generated. The computer may be a general-purpose computer, a dedicated computer, a computer network, or another programmable apparatus. The computer instruction may be stored in a computer readable storage medium, or transmitted by using the computer readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program is run, the processes of the methods in the embodiments are performed. The foregoing storage medium includes: any medium that can store program code, such as a ROM or a random access memory RAM, a magnetic disk or an optical disc.

What is claimed is:

1. A brain-computer combination image recognition method based on image sequence presentation, comprising:
setting a presentation time sequence corresponding to an image sequence, wherein the image sequence comprises N images, N is a positive integer, the presentation time sequence comprises a presentation time of an image i, the presentation time of the image i is determined based on a duration impact parameter that comprises at least one of a first recognition probability calculated using a computer vision algorithm or a fatigue state parameter corresponding to the image i, and is to indicate a time period from a presentation start moment of the image i to a presentation start moment of a next adjacent image, the image i is any image in the image sequence, the presentation time sequence comprises at least two unequal presentation times, a difference between any two presentation times of the at least two unequal presentation times is k×Δ, k is a positive integer, and Δ is a preset time period value;
processing the image sequence by using the computer vision algorithm, to obtain a computer vision signal corresponding to the image i in the image sequence;
obtaining a feedback signal that is generated when an observation object watches the image sequence displayed in the presentation time sequence and that corresponds to the image i in the image sequence, wherein the feedback signal is to indicate a reaction of the observation object to the watched image; and
fusing, for the image i in the image sequence, the computer vision signal corresponding to the image i and the feedback signal corresponding to the image i to obtain a target recognition signal of the image i in the image sequence for image recognition.

2. The method according to claim 1, wherein before the setting of the presentation time sequence corresponding to the image sequence, the method further comprises:
receiving M images from a camera device, wherein M is an integer greater than 1; and
selecting N images from the M images as the image sequence, wherein N is less than or equal to M.

3. The method according to claim 1,
wherein the first recognition probability is to indicate a probability that the image i comprises a preset image feature;
wherein the fatigue state parameter is to indicate a fatigue degree of the observation object when the observation object observes the image i; and wherein the presentation time is inversely correlated with the first recognition probability, and positively correlated with the fatigue state parameter.

4. The method according to claim 3, wherein the duration impact parameter comprises the fatigue state parameter, and before the determining of the presentation time for the image i in the image sequence based on the duration impact parameter, the method further comprises:
predicting, according to a fatigue rule, the fatigue state parameter corresponding to the image i in the image sequence, wherein the fatigue rule is to indicate a change rule of a fatigue degree of the observation object.

5. The method according to claim 3, wherein the obtaining of a feedback signal that is generated when the observation object watches the image sequence displayed in the presentation time sequence and that corresponds to the image i in the image sequence comprises:
in a process of displaying the image sequence in the presentation time sequence, obtaining a fatigue state parameter corresponding to an image j;
adjusting, based on the fatigue state parameter corresponding to the image j, a presentation time of the presentation time sequence, wherein the image i corresponds to an image to be displayed after the image j in the image sequence, wherein the image j is any image in the image sequence.

6. The method according to claim 5, wherein the obtaining of the fatigue state parameter corresponding to the image j comprises:
obtaining the fatigue state parameter based on fatigue state information that is sent by a sensor and that is obtained when the observation object watches the image j.

7. The method according to claim 3, wherein the determining of the presentation time for the image i in the image sequence based on the duration impact parameter comprises:
for the image i in the image sequence, finding a presentation time corresponding to the duration impact parameter from a first mapping table, wherein the first mapping table comprises a plurality of duration impact parameters and presentation times respectively corresponding to the plurality of duration impact parameters.

8. The method according to claim 3, further comprising:
in response detecting that the fatigue state parameter obtained when the observation object observes an image q is greater than or equal to a first fatigue threshold, controlling to stop displaying images to be displayed after the image q in the image sequence, and obtaining an image with a recognition probability that is greater than or equal to a first probability threshold in the images to be displayed after the image q, wherein the image q is any image in the image sequence; and
in response to detecting that the fatigue state parameter of the observation object is less than or equal to a second fatigue threshold, controlling to sequentially display the image.

9. The method according to claim 3, wherein the fusing, for the image i in the image sequence, of the computer vision signal and the feedback signal to obtain the target recognition signal of the image i in the image sequence comprises:
determining, for the image i in the image sequence based on at least one of the first recognition probability, the fatigue state parameter, or the presentation time, a first weight corresponding to the image i in the image sequence, wherein the first weight is a weight used when the feedback signal is to determine the target recognition signal, the first weight is inversely correlated with the first recognition probability, the first weight is inversely correlated with the fatigue state parameter, and the first weight is positively correlated with the presentation time; and
fusing, for the image i in the image sequence based on a corresponding first weight, the computer vision signal and a the feedback signal to obtain the target recognition signal of the image i in the image sequence.

10. The method according to claim 1, wherein the fusing, for the image i in the image sequence, of the computer vision signal and the feedback signal to obtain the target recognition signal of the image i in the image sequence comprises:
fusing, for the image i in the image sequence, the computer vision signal, the feedback signal, and at least one additional feedback signal corresponding to the image to obtain the target recognition signal of the image i in the image sequence.

11. The method according to claim 10, wherein the fatigue state parameter comprises at least two fatigue state parameters respectively generated when at least two observation objects observe a same image.

12. The method according to claim 1, wherein the computer vision signal is the first recognition probability determined by using the computer vision algorithm;
before the fusing, for the image i in the image sequence, of the computer vision signal and the feedback signal to obtain the target recognition signal of the image i in the image sequence, the method further comprises:
calculating, for the image i in the image sequence, a second recognition probability of the image i in the image sequence based on the feedback signal, wherein the second recognition probability is to indicate a probability that the observation object determines that the image i comprises the preset image feature; and
wherein the fusing, for the image i in the image sequence, the computer vision signal and the feedback signal to obtain the target recognition signal of the image i in the image sequence comprises:
calculating, for the image i in the image sequence, a target recognition probability of the image i in the image sequence based on the first recognition probability and the second recognition probability.

13. An image recognition device, comprising:
a processor;
a memory; and
an interface circuit, wherein the memory, the interface circuit and the processor are interconnected, wherein the memory stores program instructions, which, when executed by the processor, cause the processor to:
set a presentation time sequence corresponding to an image sequence, wherein the image sequence comprises N images, N is a positive integer, the presentation time sequence comprises a presentation time of an image i, the presentation time of the image i is determined based on a duration impact parameter that comprises at least one of a first recognition probability calculated using a computer vision algorithm or a fatigue state parameter corresponding to the image i, and is to indicate a time period from a presentation start moment of the image i to a presentation start moment of a next adjacent image, the image is any image in the image sequence, the presentation time sequence comprises at least two unequal presentation times, a difference between any two presentation times of the at least two unequal presentation times is k×Δ, k is a positive integer, and Δ is a preset time period value, process the image sequence by using the computer vision algorithm, to obtain a computer vision signal corresponding to the image i in the image sequence, cause the interface circuit to obtain a feedback signal that is generated when an observation object watches the image sequence displayed in the presentation time sequence and that corresponds to the image i in the image sequence, wherein the feedback signal is to indicate a reaction of the observation object to the watched image, and fuse, for the image i in the image sequence, the computer vision signal and the feedback signal to obtain the target recognition signal of the image i in the image sequence for image recognition.

14. The image recognition device according to claim 13, wherein:

the interface circuit is configured to receive M images from a camera device, wherein M is an integer greater than 1; and the processor further is configured to select N images from the M images as the image sequence, wherein N is less than or equal to M.

15. The image recognition device according to claim 13, wherein the first recognition probability is to indicate a probability that the image i comprises a preset image feature, the fatigue state parameter is to indicate a fatigue degree of the observation object when the observation object observes the image i, the presentation time is inversely correlated with the first recognition probability, and the presentation time is positively correlated with the fatigue state parameter.

16. The image recognition device according to claim 15, wherein the duration impact parameter comprises the fatigue state parameter, and the image recognition device further comprises a prediction unit; and wherein the processor is configured to predict, according to a fatigue rule, the fatigue state parameter corresponding to the image i in the image sequence, wherein the fatigue rule is to indicate a change rule of a fatigue degree of the observation object.

17. The image recognition device according to claim 15, wherein the interface circuit is further configured to:

in a process of displaying the image sequence in the presentation time sequence, obtain a fatigue state parameter corresponding to an image j; and adjust, based on the fatigue state parameter corresponding to the image j, a presentation time that is in the presentation time sequence, wherein the image i corresponds to an image to be displayed after the image j in the image sequence, wherein the image j is any image in the image sequence.

18. The image recognition device according to claim 17, wherein the processor is configured to obtain the fatigue state parameter based on fatigue state information that is sent by a sensor and that is obtained when the observation object watches the image j.

19. The image recognition device according to claim 15, wherein the processor is configured to: for the image i in the image sequence, find a presentation time corresponding to the duration impact parameter from a first mapping table, wherein the first mapping table comprises a plurality of duration impact parameters and presentation times respectively corresponding to the plurality of duration impact parameters.

20. A non-transitory computer readable storage medium, wherein the storage medium is configured to store program instructions, which, when executed by a processor, cause the processor to perform operations of recognizing a brain-computer combination image based on image sequence presentation, the operations comprising:

setting a presentation time sequence corresponding to an image sequence, wherein the image sequence comprises N images, N is a positive integer, the presentation time sequence comprises a presentation time of an image i, the presentation time of the image i is determined based on a duration impact parameter that comprises at least one of a first recognition probability calculated using a computer vision algorithm or a fatigue state parameter corresponding to the image i, and is to indicate a time period from a presentation start moment of the image i to a presentation start moment of a next adjacent image, the image i is any image in the image sequence, the presentation time sequence comprises at least two unequal presentation times, a difference between any two presentation times of the at least two unequal presentation times is k×Δ, k is a positive integer, and Δ is a preset time period value;

processing the image sequence by using the computer vision algorithm, to obtain a computer vision signal corresponding to the image i in the image sequence;

obtaining a feedback signal that is generated when an observation object watches the image sequence displayed in the presentation time sequence and that corresponds to the image i in the image sequence, wherein the feedback signal is to indicate a reaction of the observation object to the watched image; and fusing, for the image i in the image sequence, the computer vision signal corresponding to the image i and the feedback signal corresponding to the image i to obtain a target recognition signal of the image i in the image sequence for image recognition.

* * * * *